United States Patent
Noguchi et al.

(10) Patent No.: US 8,210,434 B2
(45) Date of Patent: Jul. 3, 2012

(54) ERROR DETECTING APPARATUS AND METHOD, AND COMPUTER PROGRAM

(75) Inventors: Ryoji Noguchi, Fujimi (JP); Tomoaki Iwai, Adachi (JP); Koichi Ishitoya, Nerima (JP)

(73) Assignee: Pioneer Corporation, Tokyo (JP)

(*) Notice: Subject to any disclaimer, the term of this patent is extended or adjusted under 35 U.S.C. 154(b) by 556 days.

(21) Appl. No.: 12/523,888

(22) PCT Filed: Jan. 24, 2007

(86) PCT No.: PCT/JP2007/051081
§ 371 (c)(1),
(2), (4) Date: Aug. 5, 2009

(87) PCT Pub. No.: WO2008/090607
PCT Pub. Date: Jul. 31, 2008

(65) Prior Publication Data
US 2010/0045636 A1    Feb. 25, 2010

(51) Int. Cl.
*G06K 7/10*    (2006.01)
(52) U.S. Cl. ........................................ 235/454
(58) Field of Classification Search .................. 235/454, 235/462.01, 462.09, 462.1, 462.15
See application file for complete search history.

(56) References Cited

U.S. PATENT DOCUMENTS

| 6,629,635 | B1 * | 10/2003 | Akamine | 235/375 |
| 2002/0121549 | A1 * | 9/2002 | Tatsuta et al. | 235/454 |
| 2007/0023523 | A1 * | 2/2007 | Onishi | 235/454 |
| 2009/0207101 | A1 * | 8/2009 | Noguchi et al. | 345/55 |

FOREIGN PATENT DOCUMENTS

| JP | 07-141104 | 6/1995 |
| JP | 2002-082763 | 3/2002 |
| JP | 2006-243818 | 9/2006 |

OTHER PUBLICATIONS

International Search Report—PCT/JP2007/051081—Mar. 20, 2007.

* cited by examiner

*Primary Examiner* — Seung Lee
(74) *Attorney, Agent, or Firm* — Young & Thompson

(57) ABSTRACT

An error detecting apparatus includes: a reading device obtaining an image read signal by reading a two-dimensional code pattern, which includes information blocks having information and boundary patterns, the information pattern including first/second pattern images (PIs) corresponding to first/second PIs, respectively, in each reading range corresponding to a size≧a size of the information block. A reference point detecting device detects an intersection in the boundary pattern, as a block reference point (P, Q), from the image read signal; an extracting device extracts the first/second information data (ID), based on one portion of the first PIs and the second PIs belonging to an ID extraction area determined according to a position of the block reference point; an error detecting device detects whether any error in the extracted first/second ID based on another portion of the first/second PIs belonging to another area other than the ID extraction area.

12 Claims, 41 Drawing Sheets

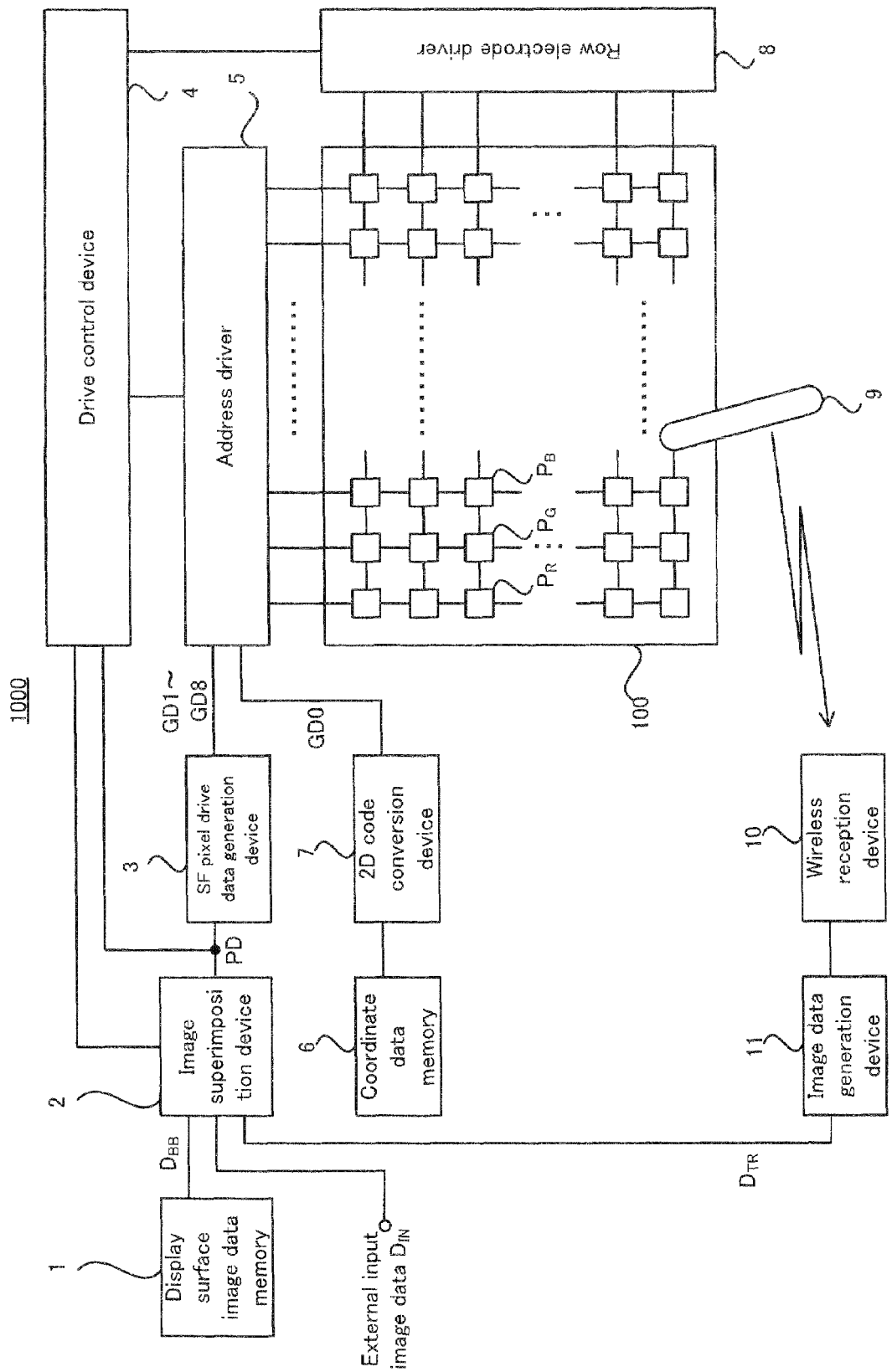
[FIG. 1]

[FIG. 2]
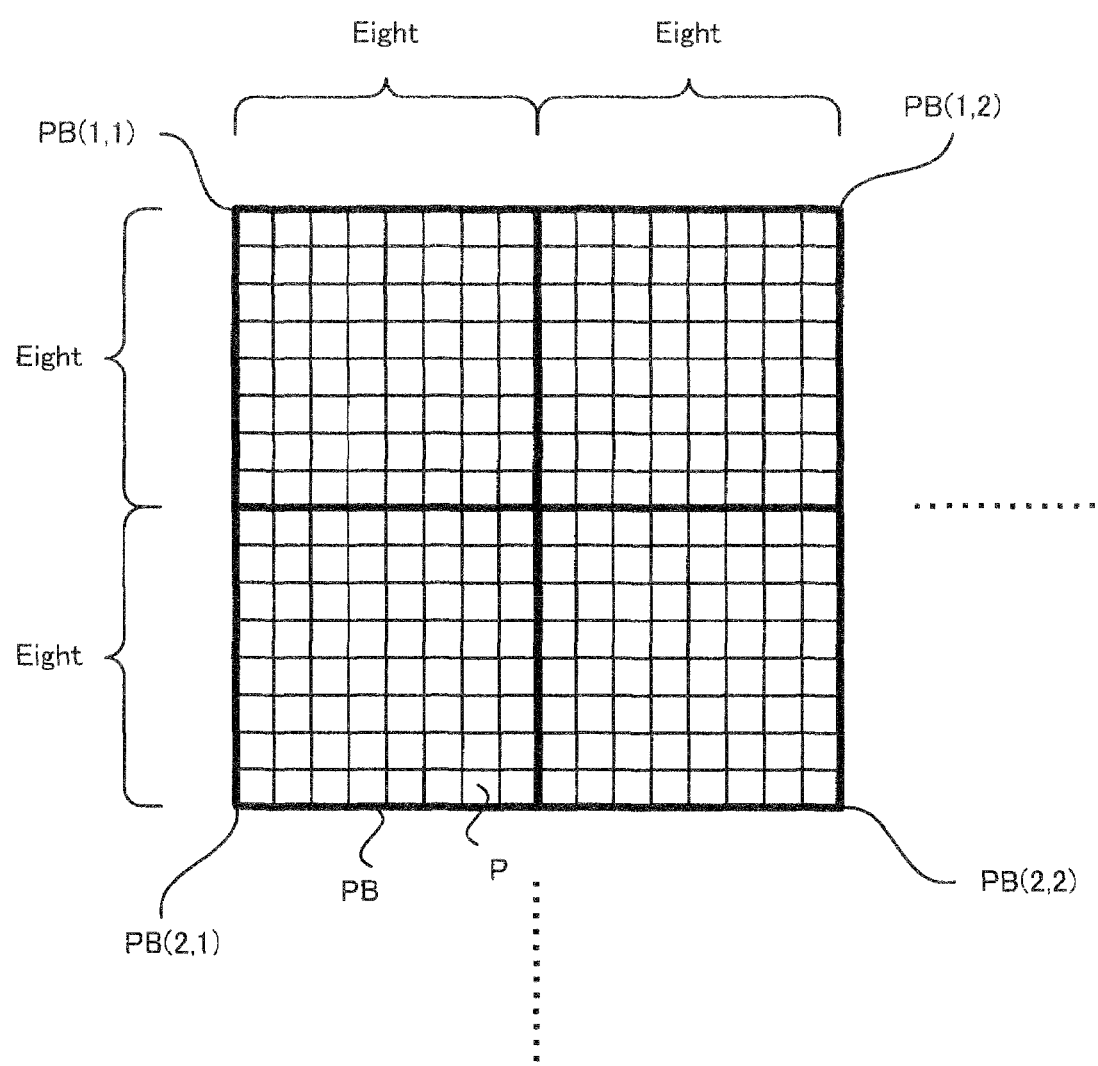

[FIG. 3]
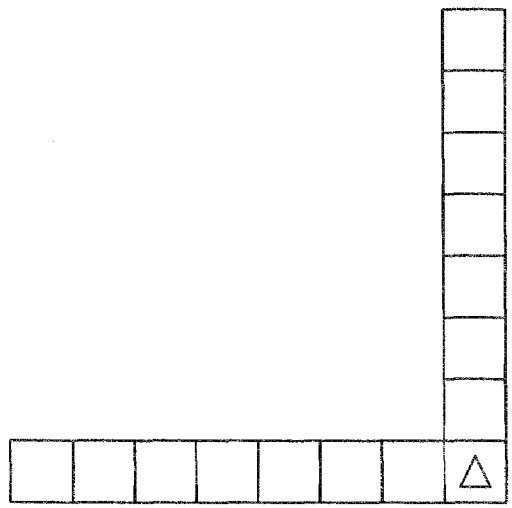
□ Lighting status
■ Extinction status
▨ Lighting / extinction status according to coordinates
△ Block reference point
(a)
(b)　　　(c)
(d)　　　(e)

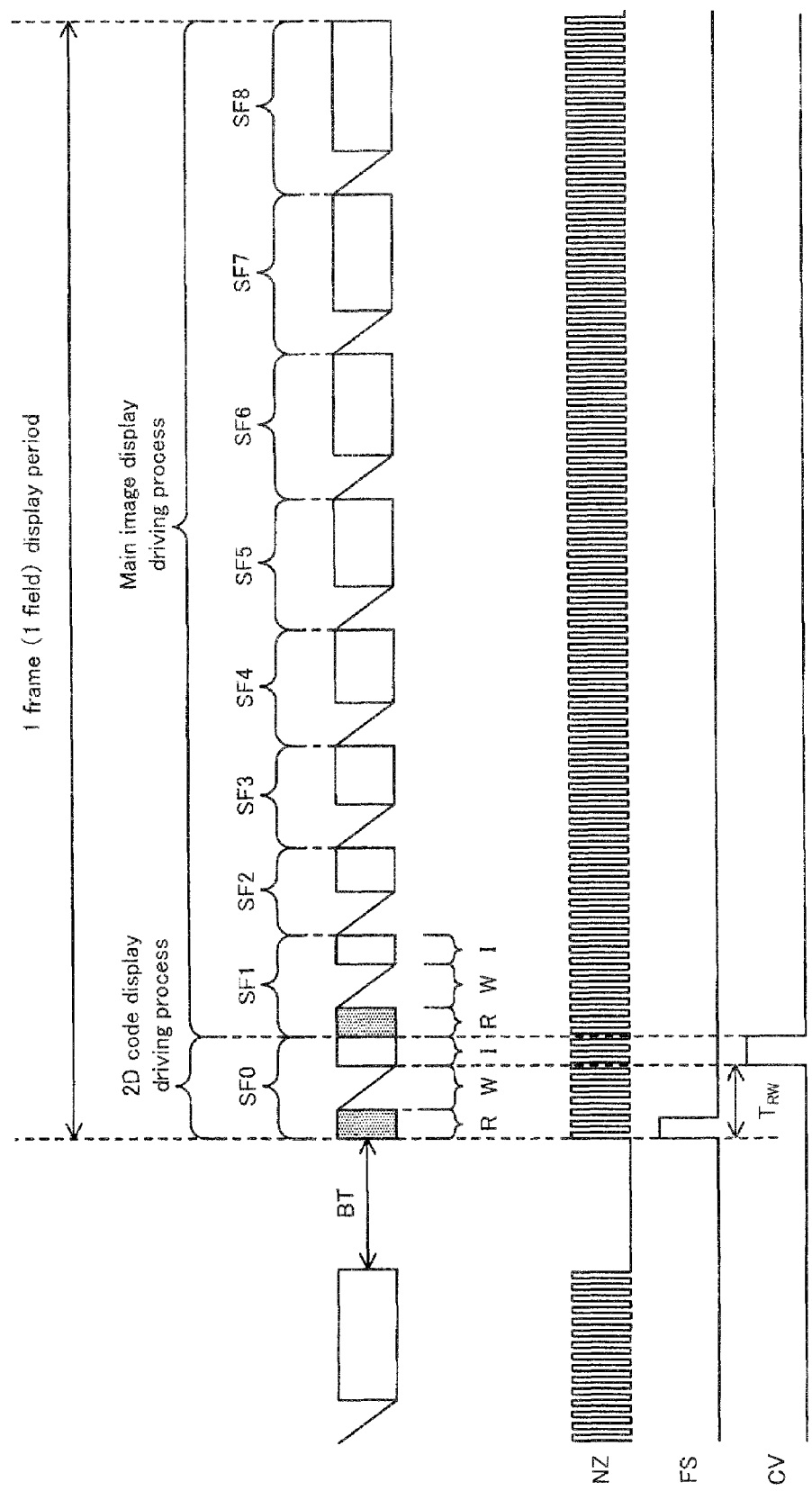
[FIG. 4]

[FIG. 5]
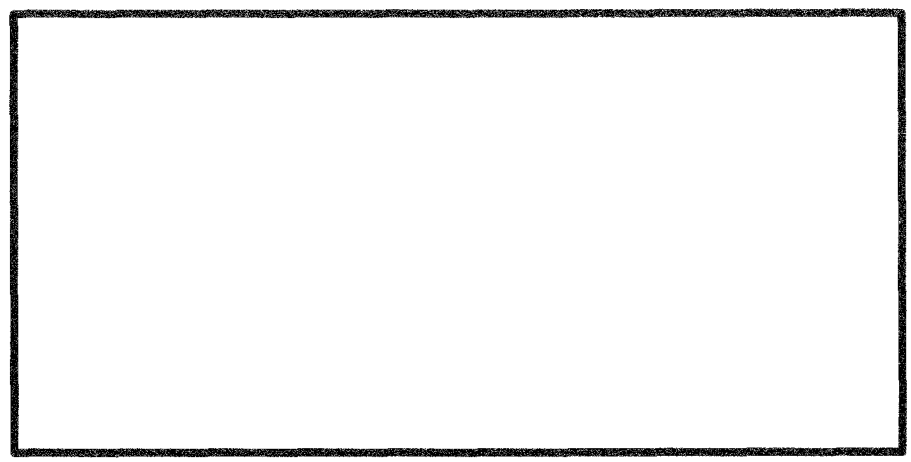
(a)
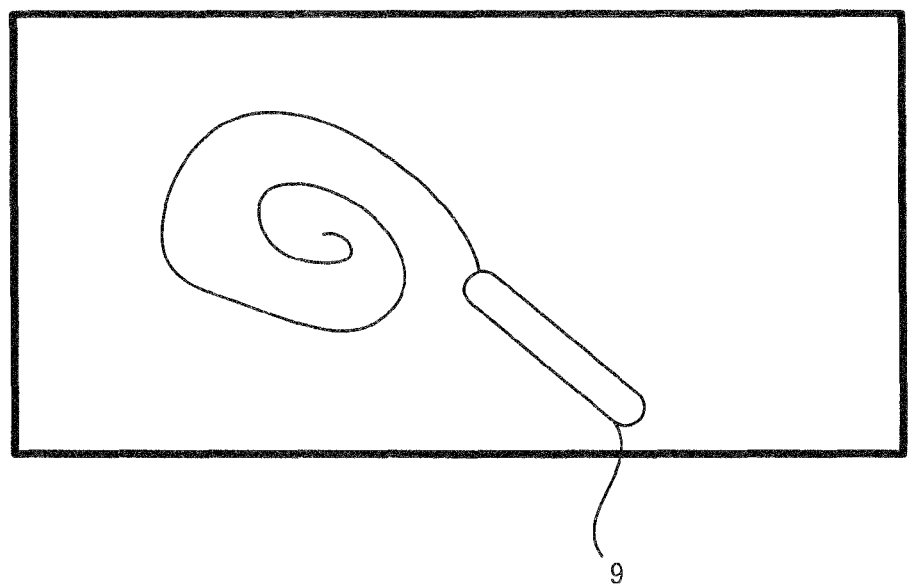
(b)

[FIG. 6]
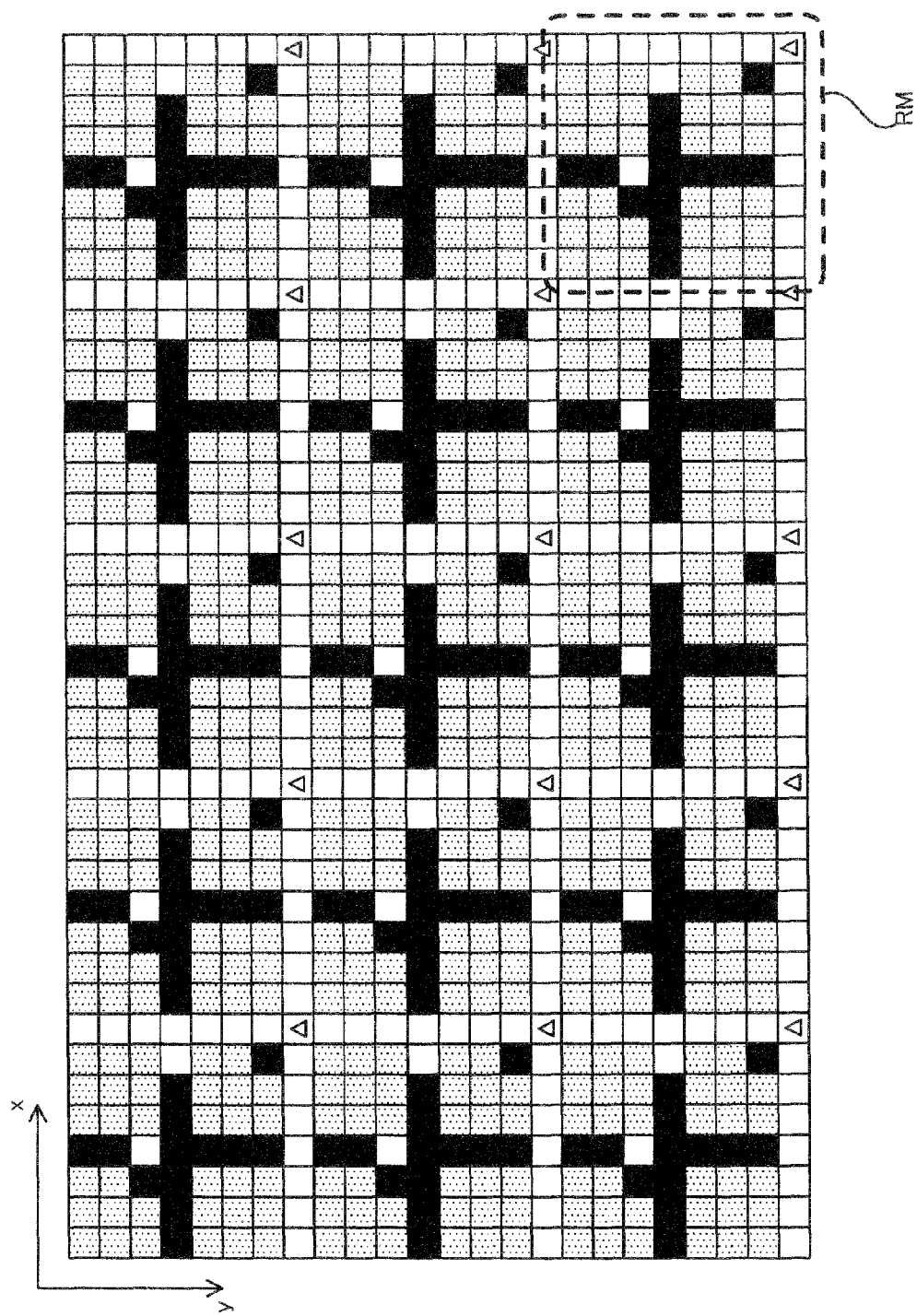

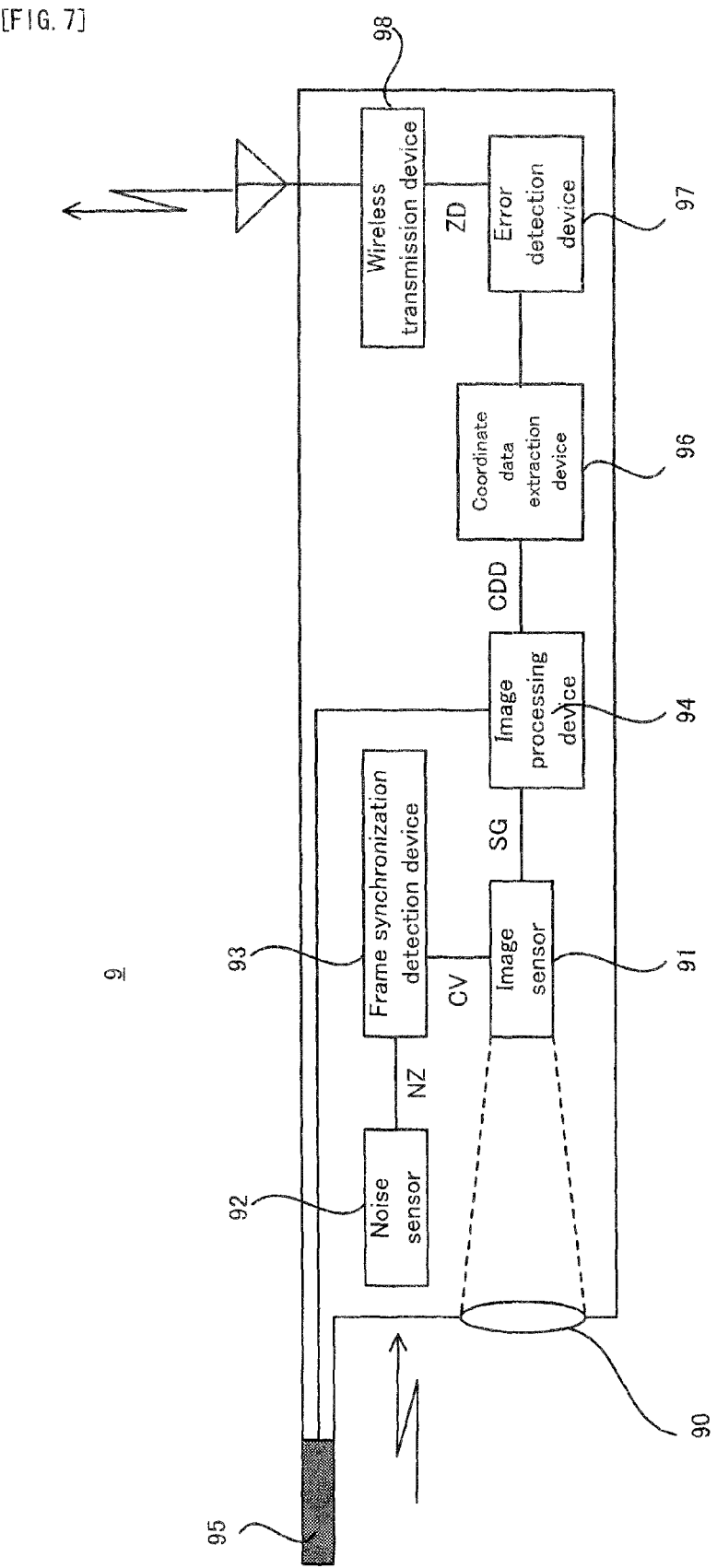
[FIG. 7]

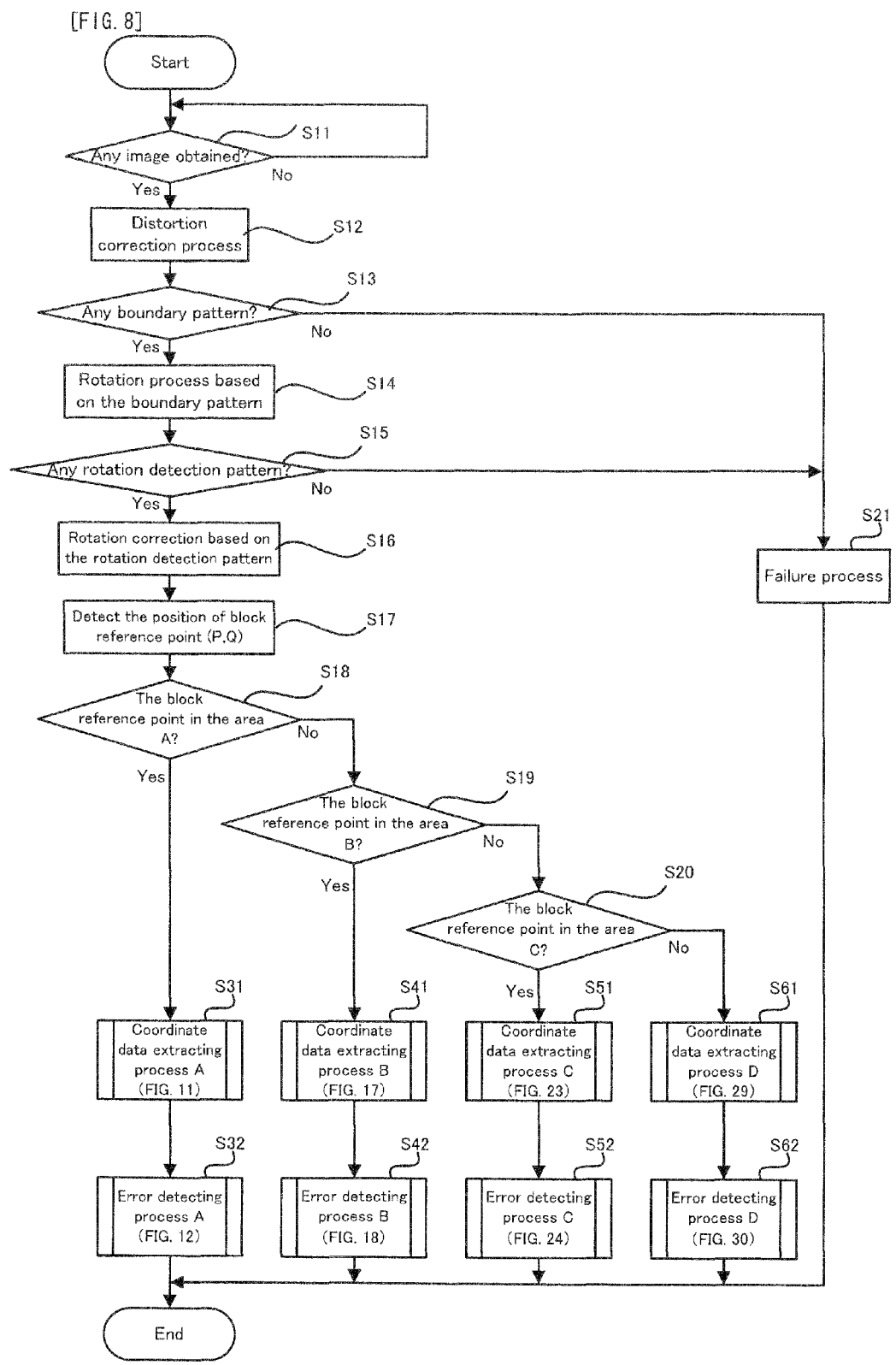

[FIG. 9]
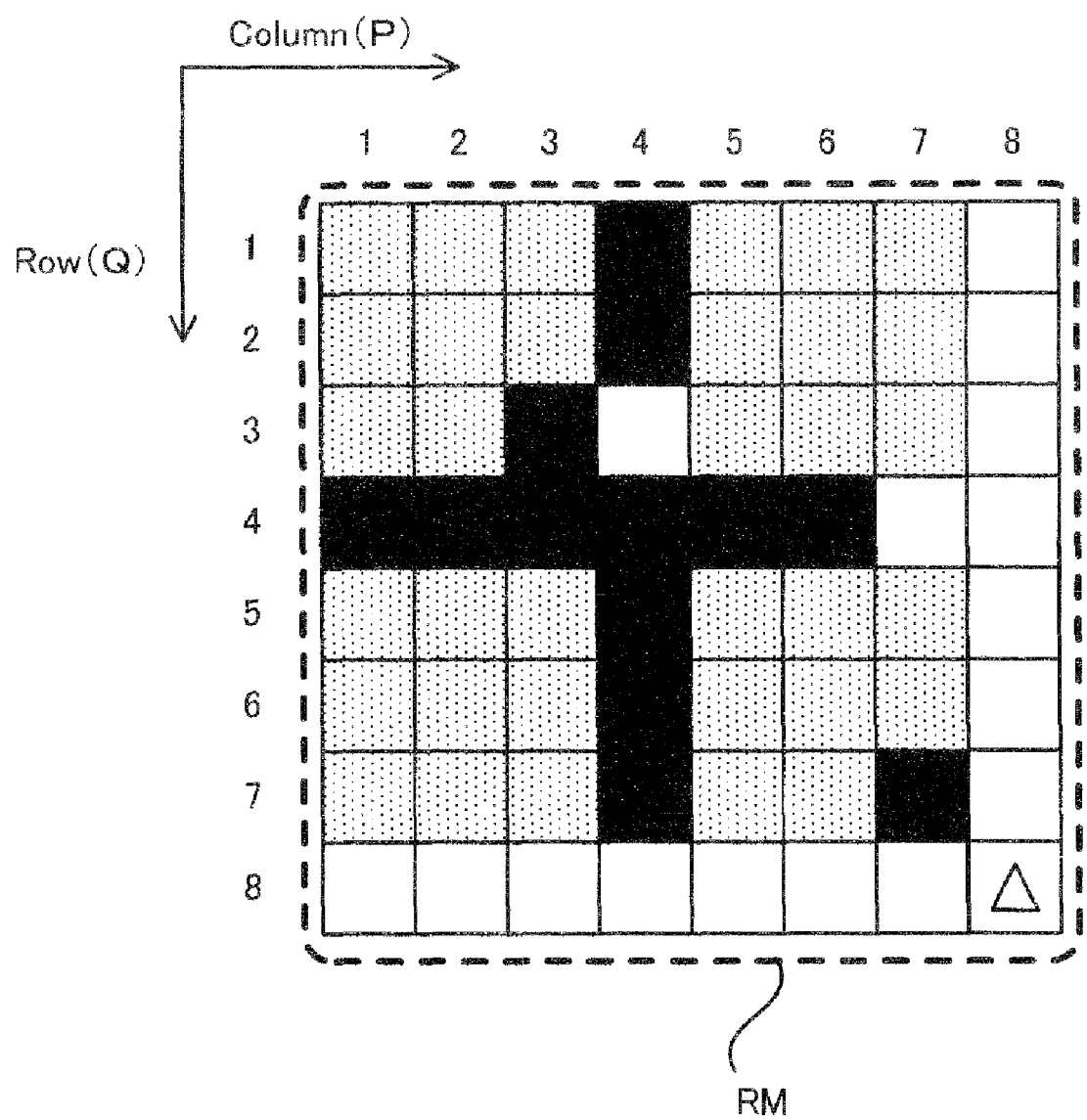

[FIG. 10]
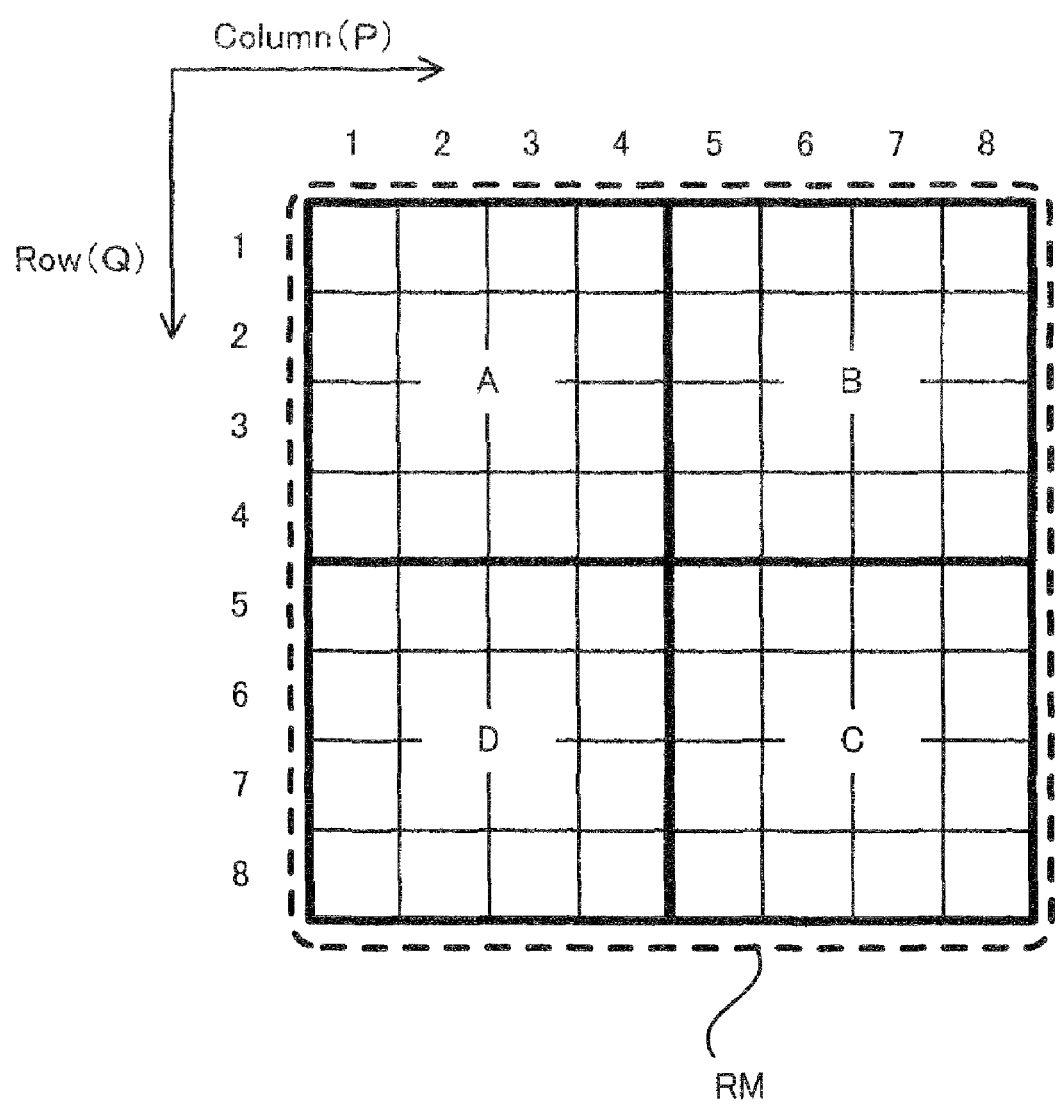

[FIG. 11]
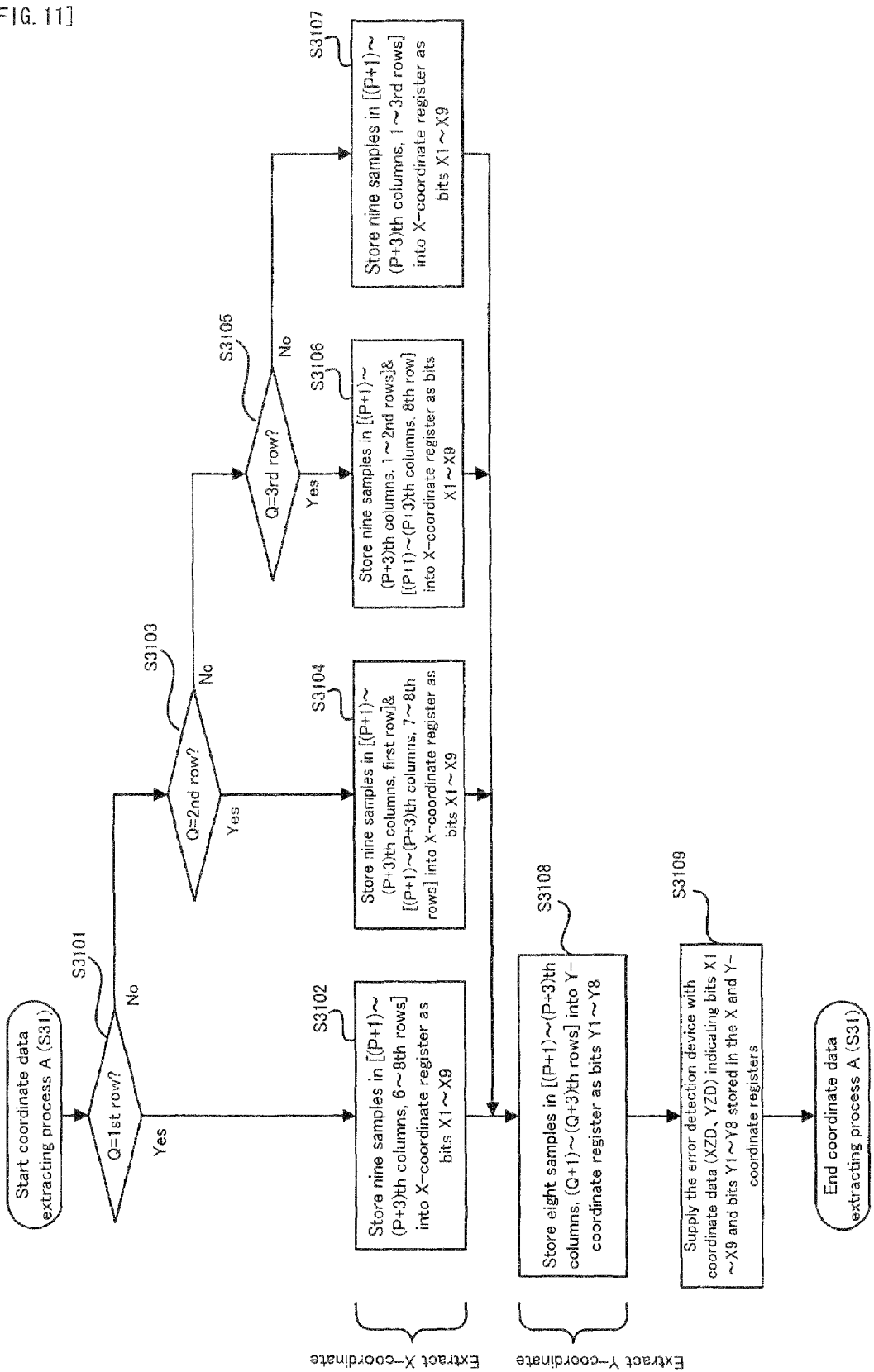

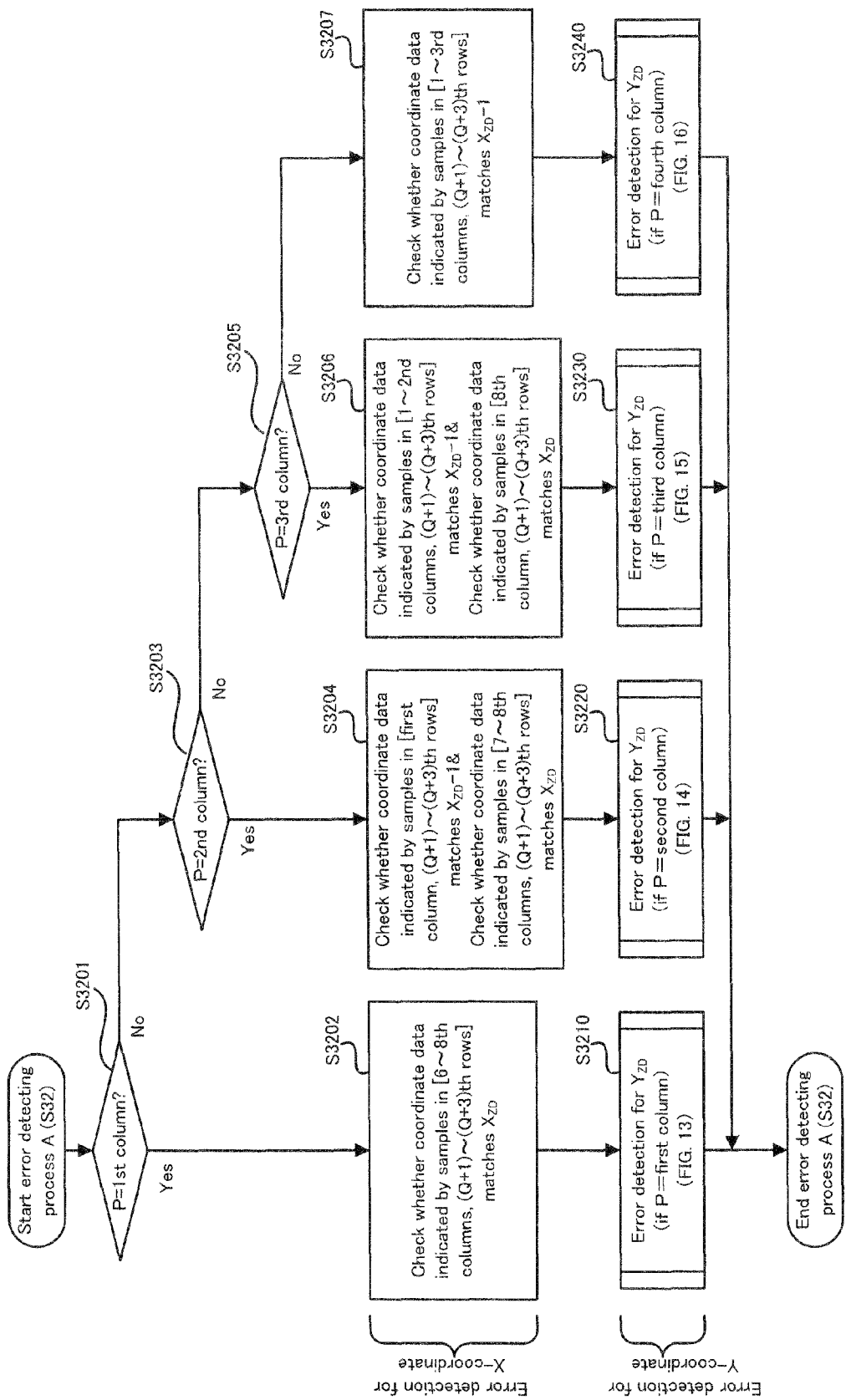
[FIG. 12]

[FIG. 13]
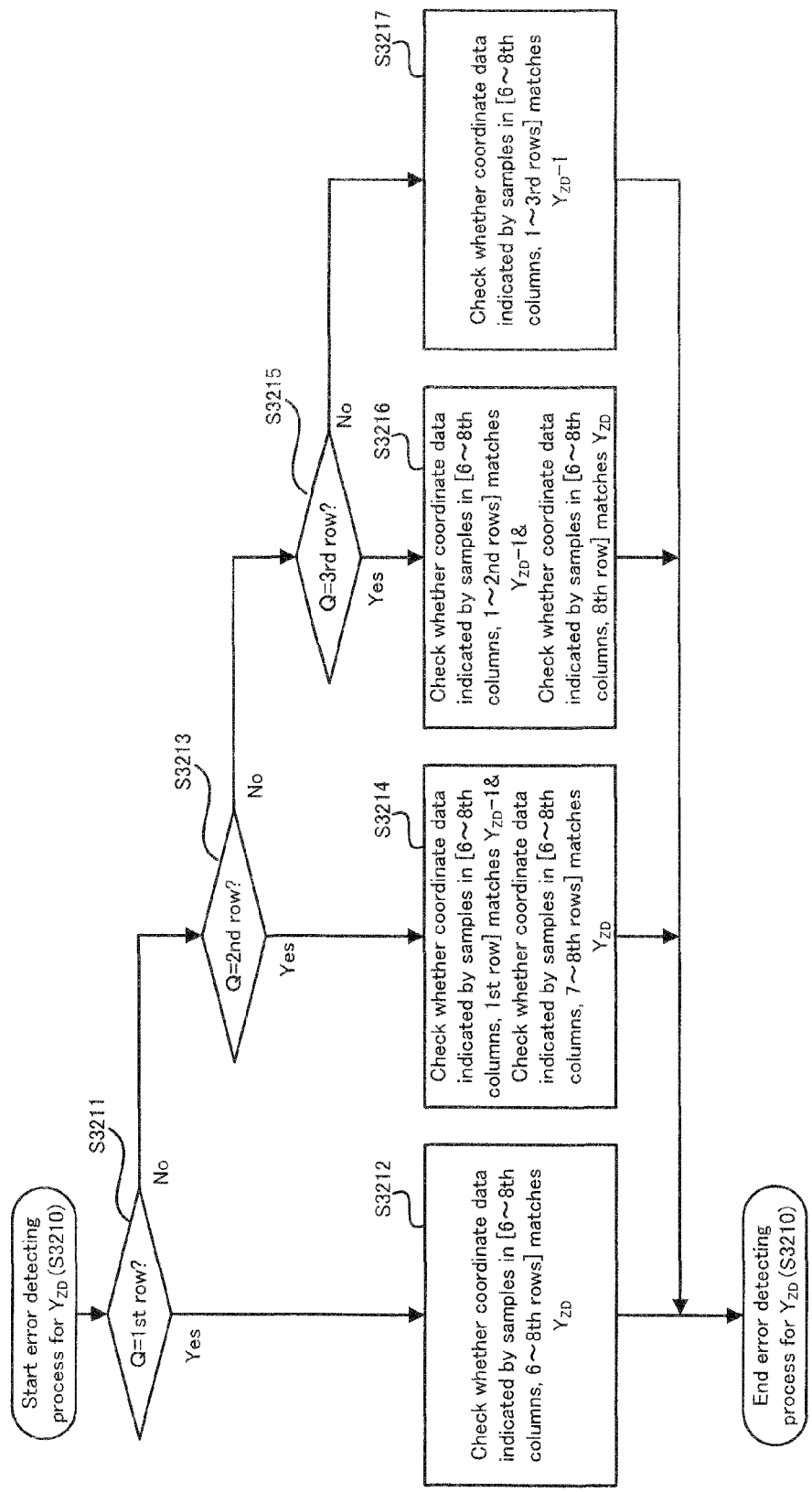

[FIG. 14]
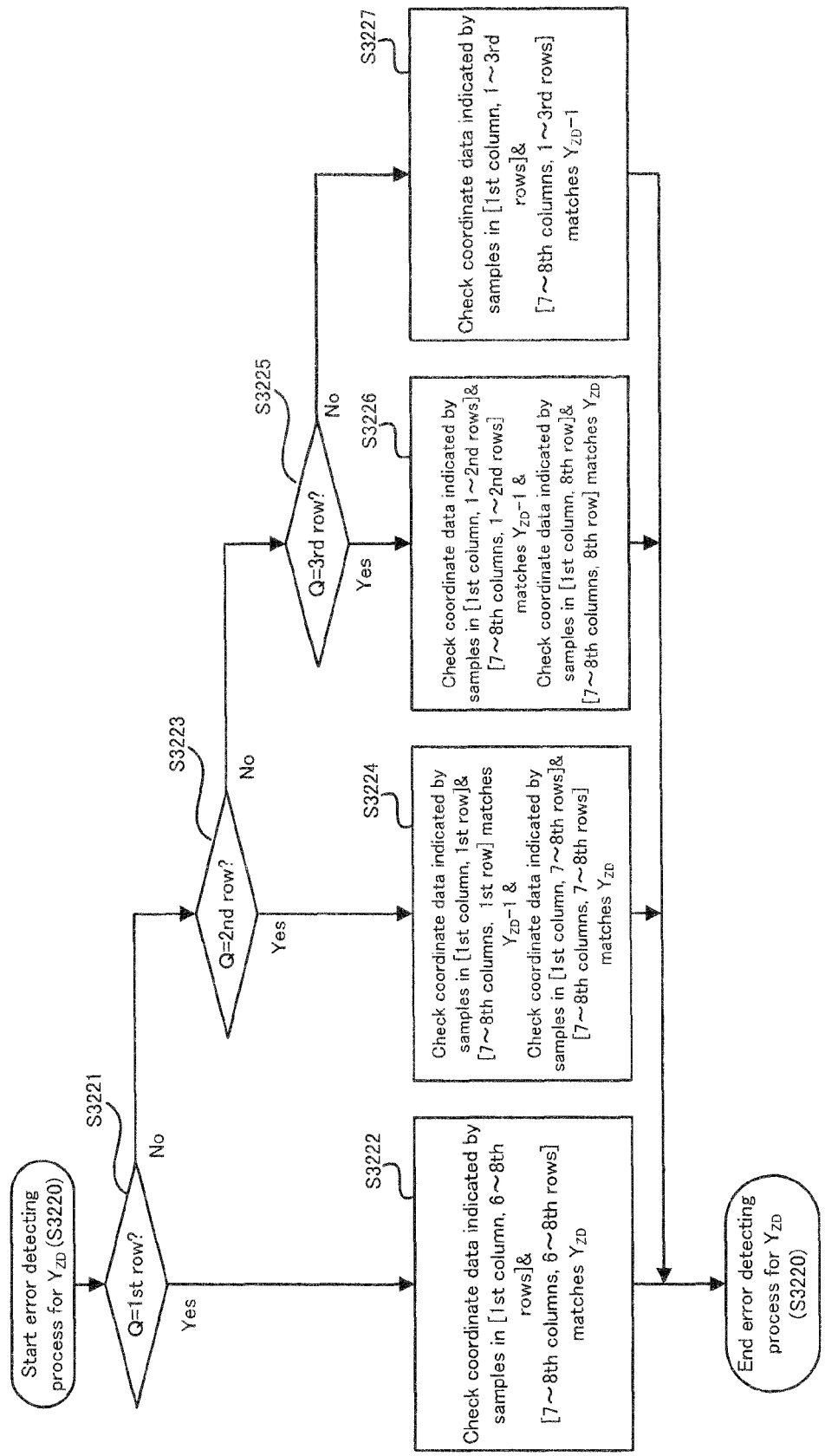

[FIG. 15]
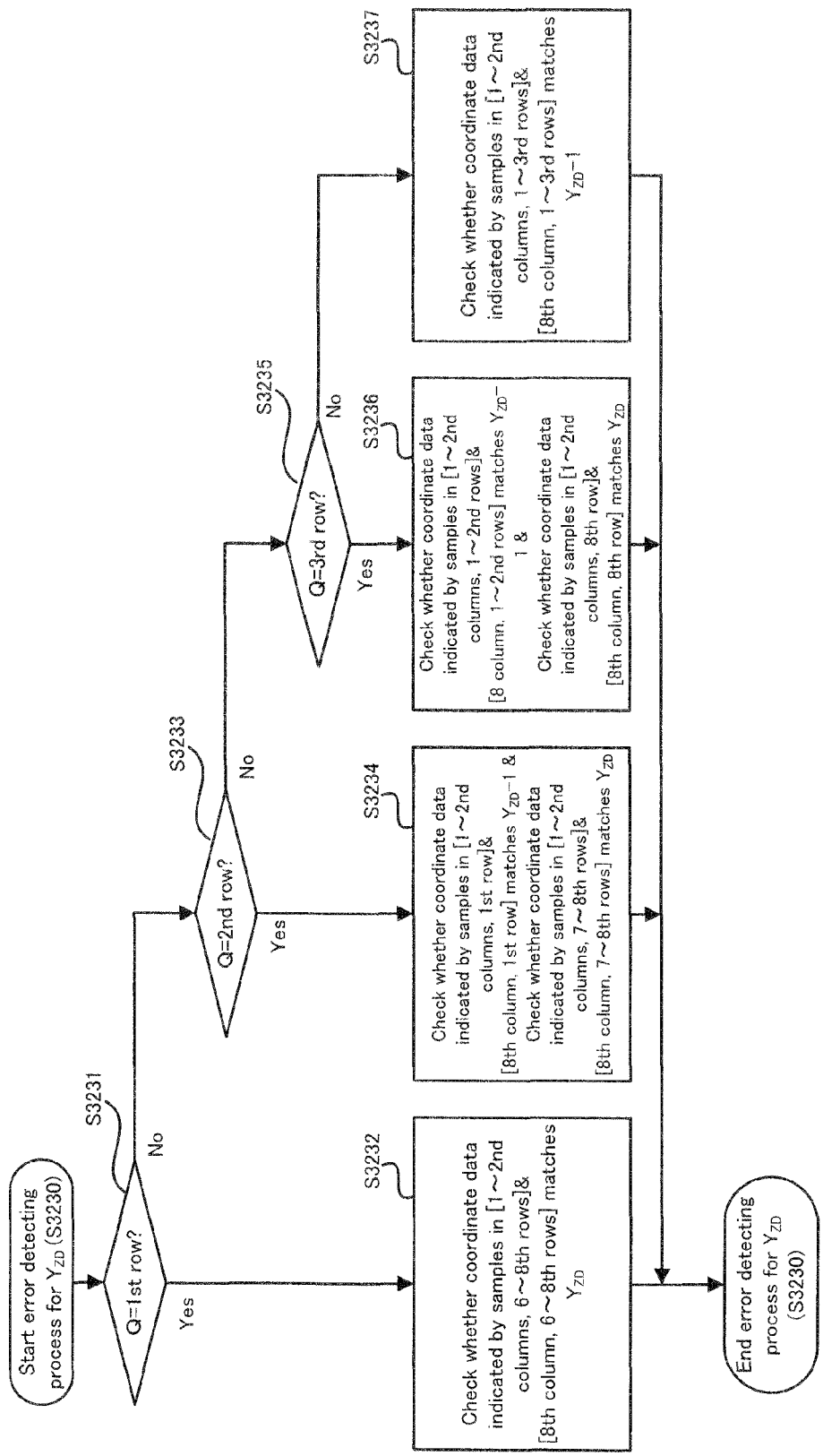

[FIG. 16]
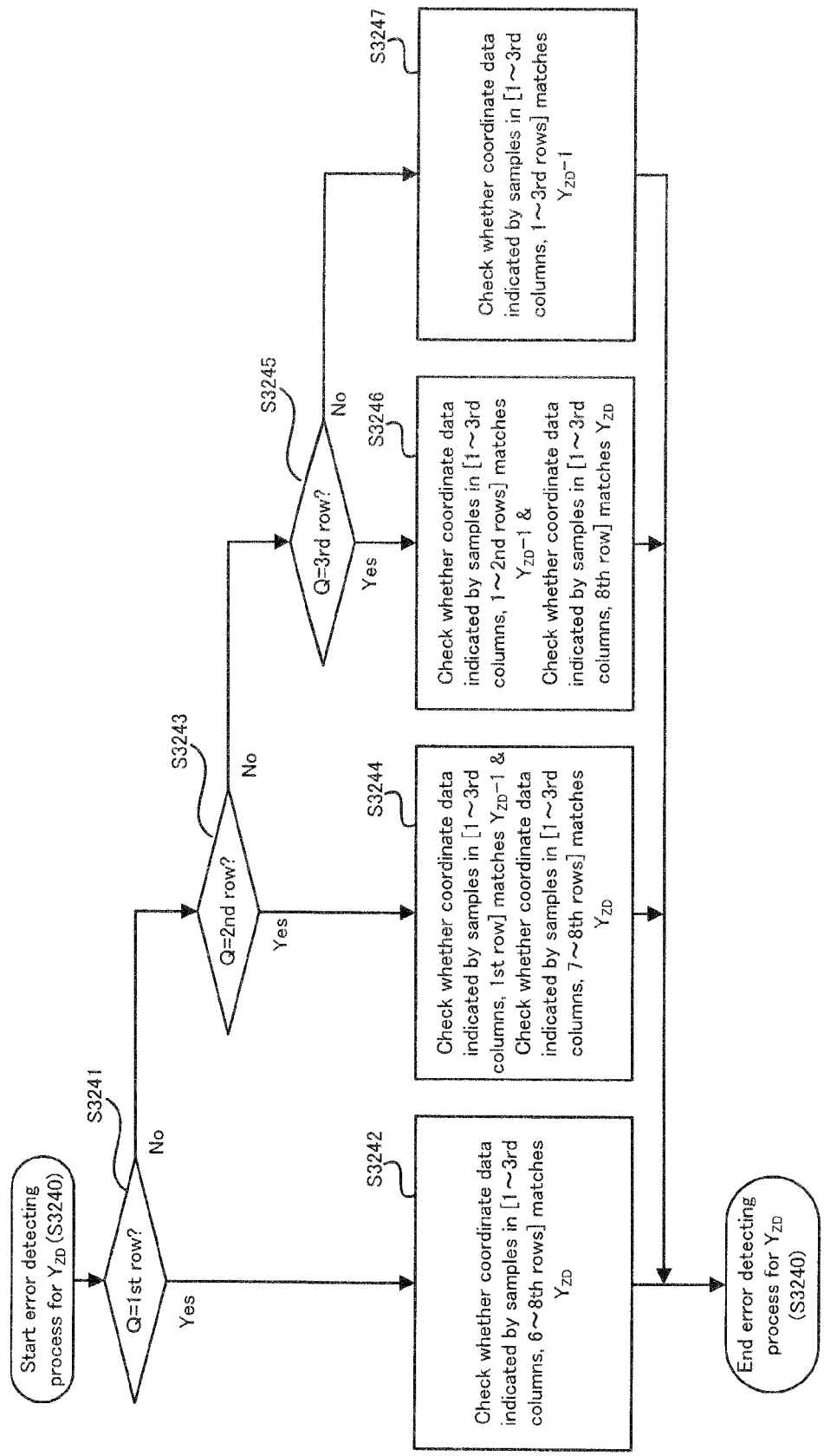

[FIG. 17]
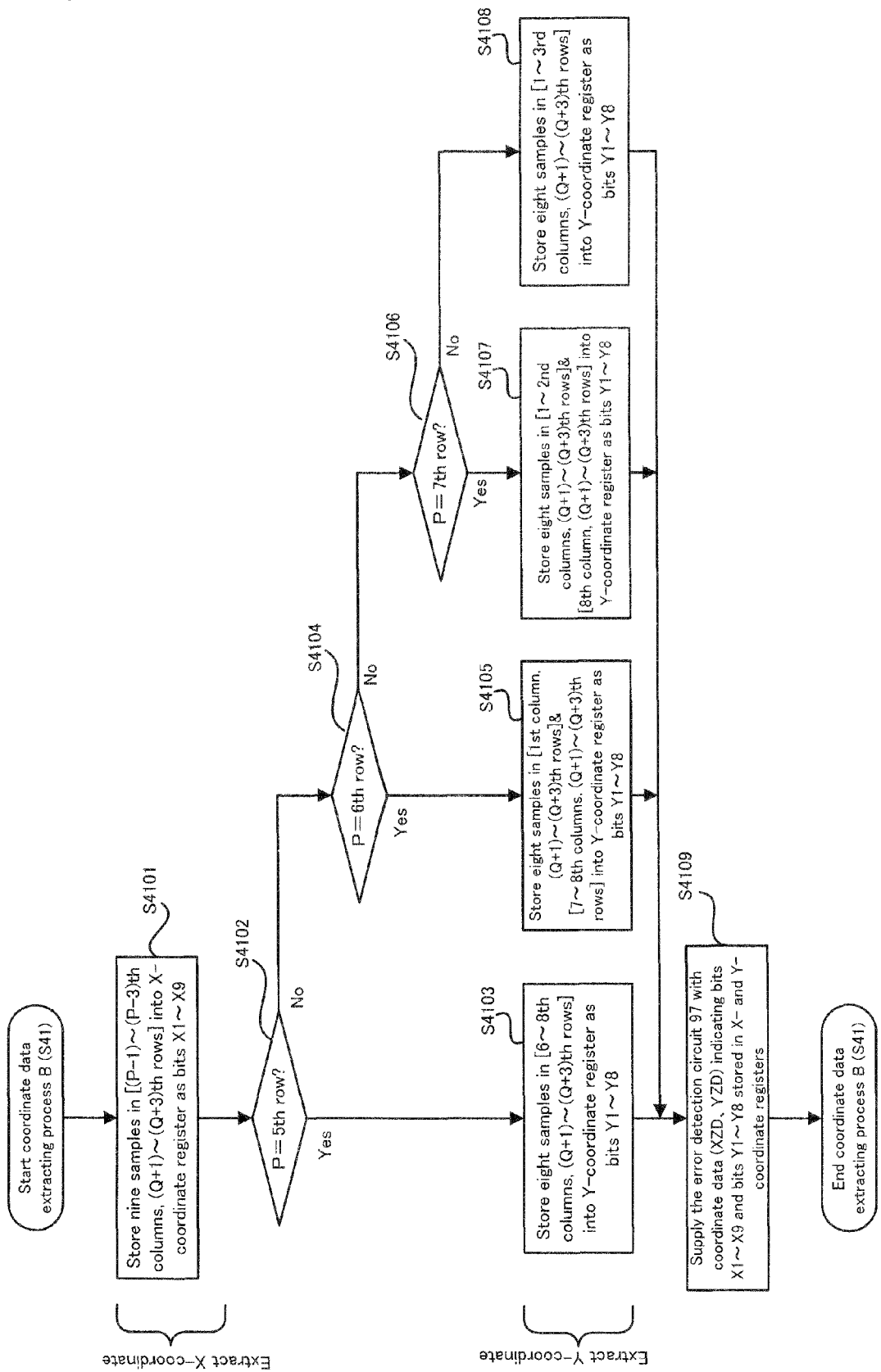

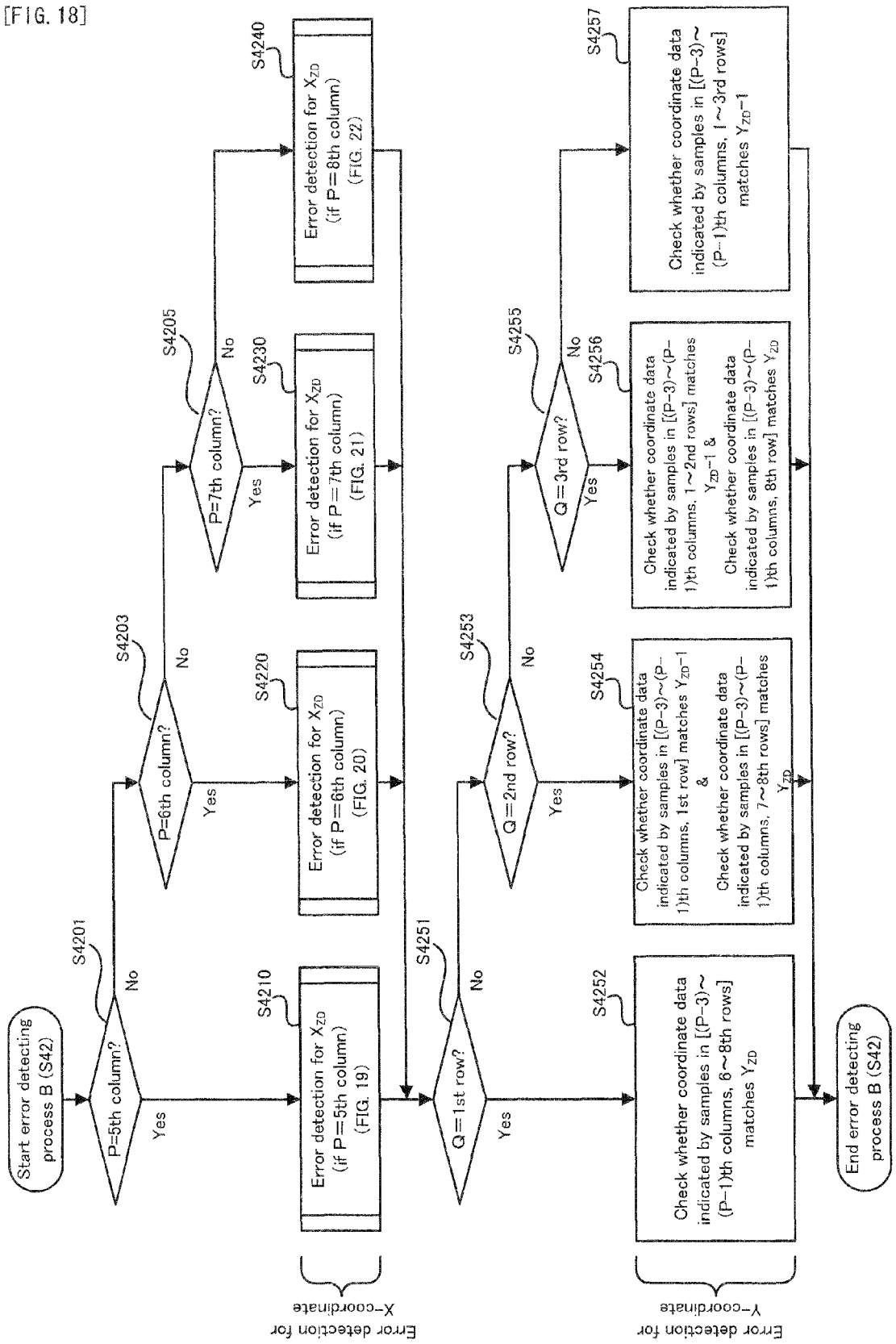
[FIG. 18]

[FIG. 19]
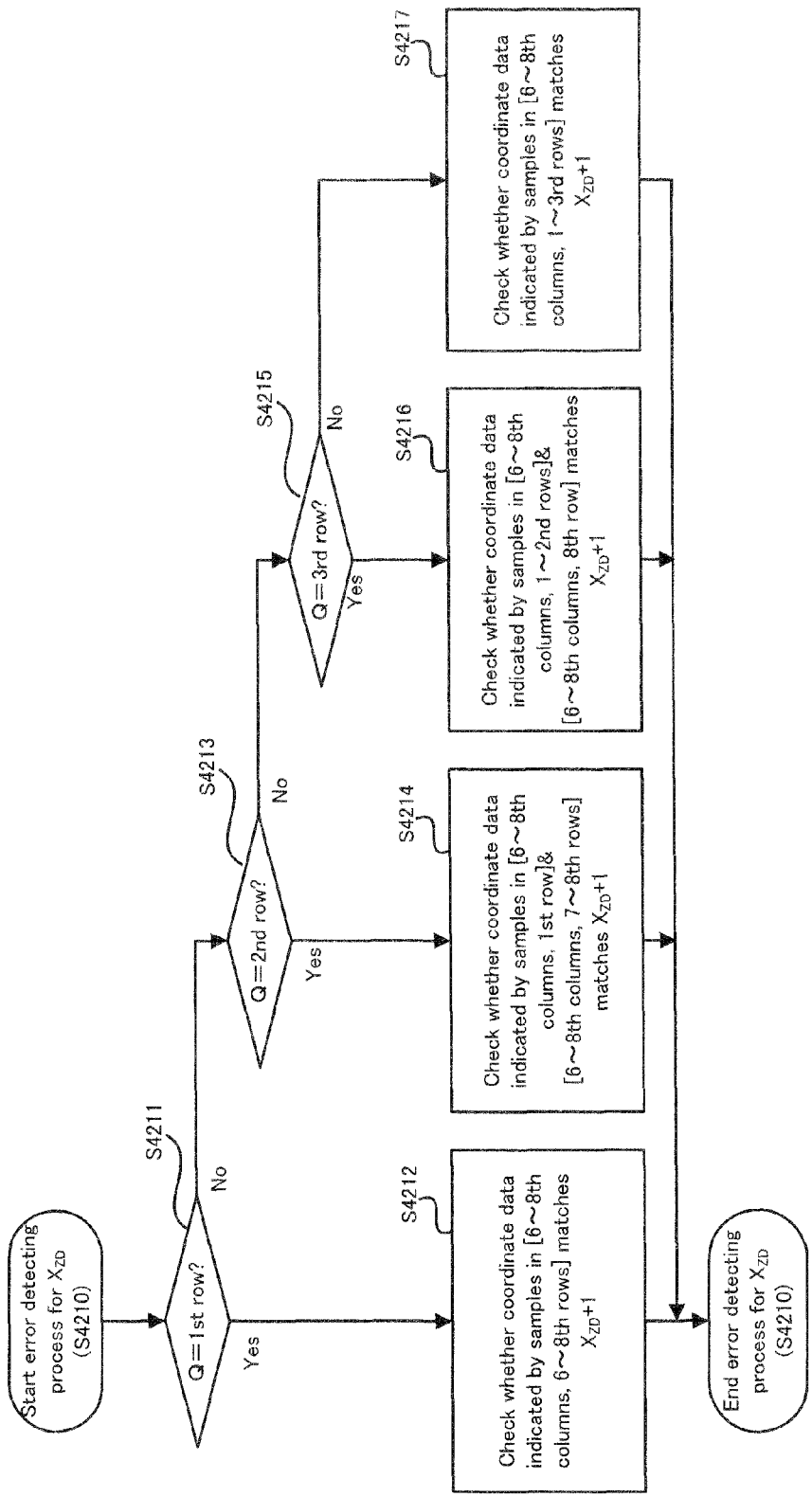

[FIG. 20]
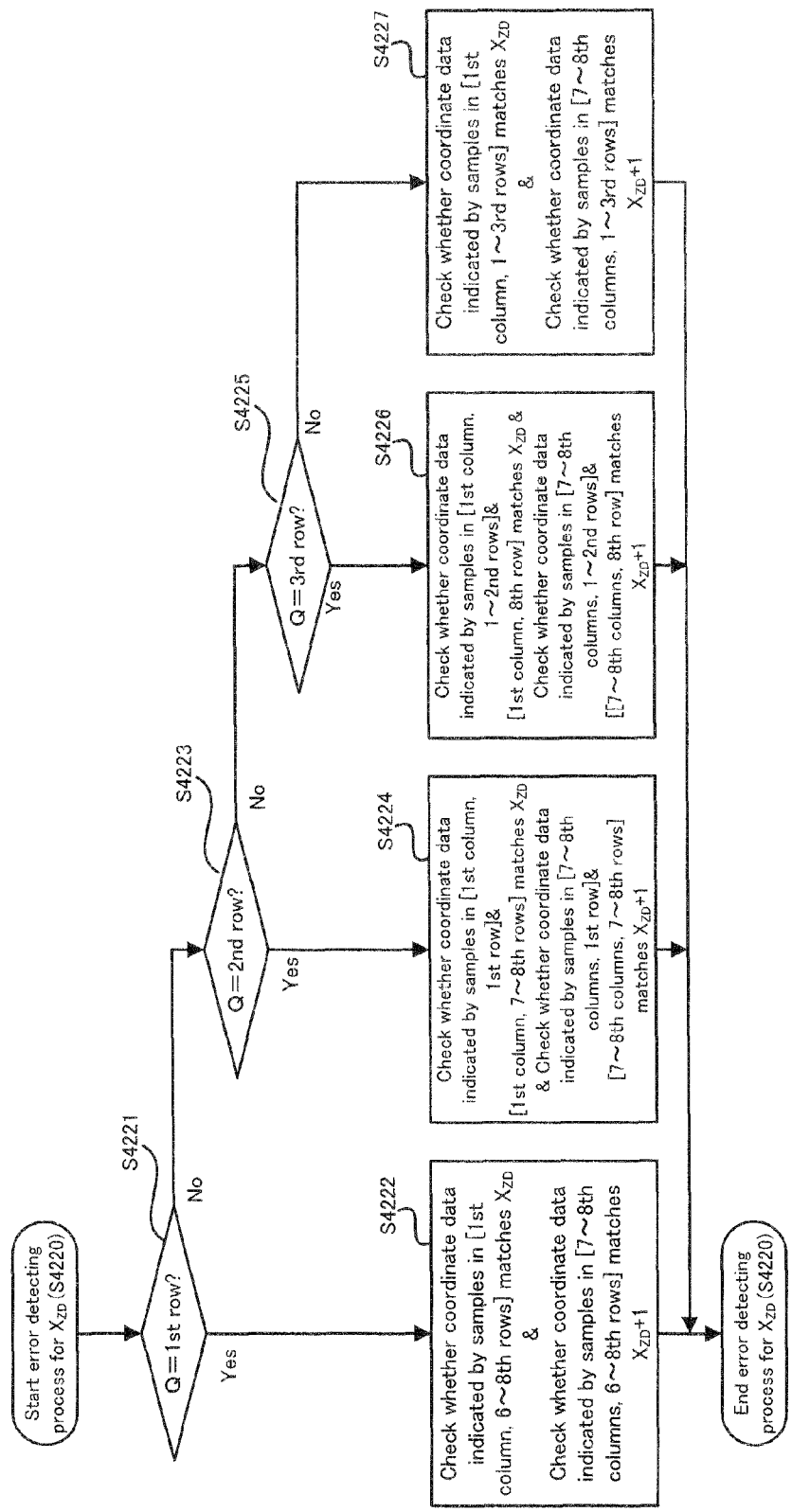

[FIG. 21]
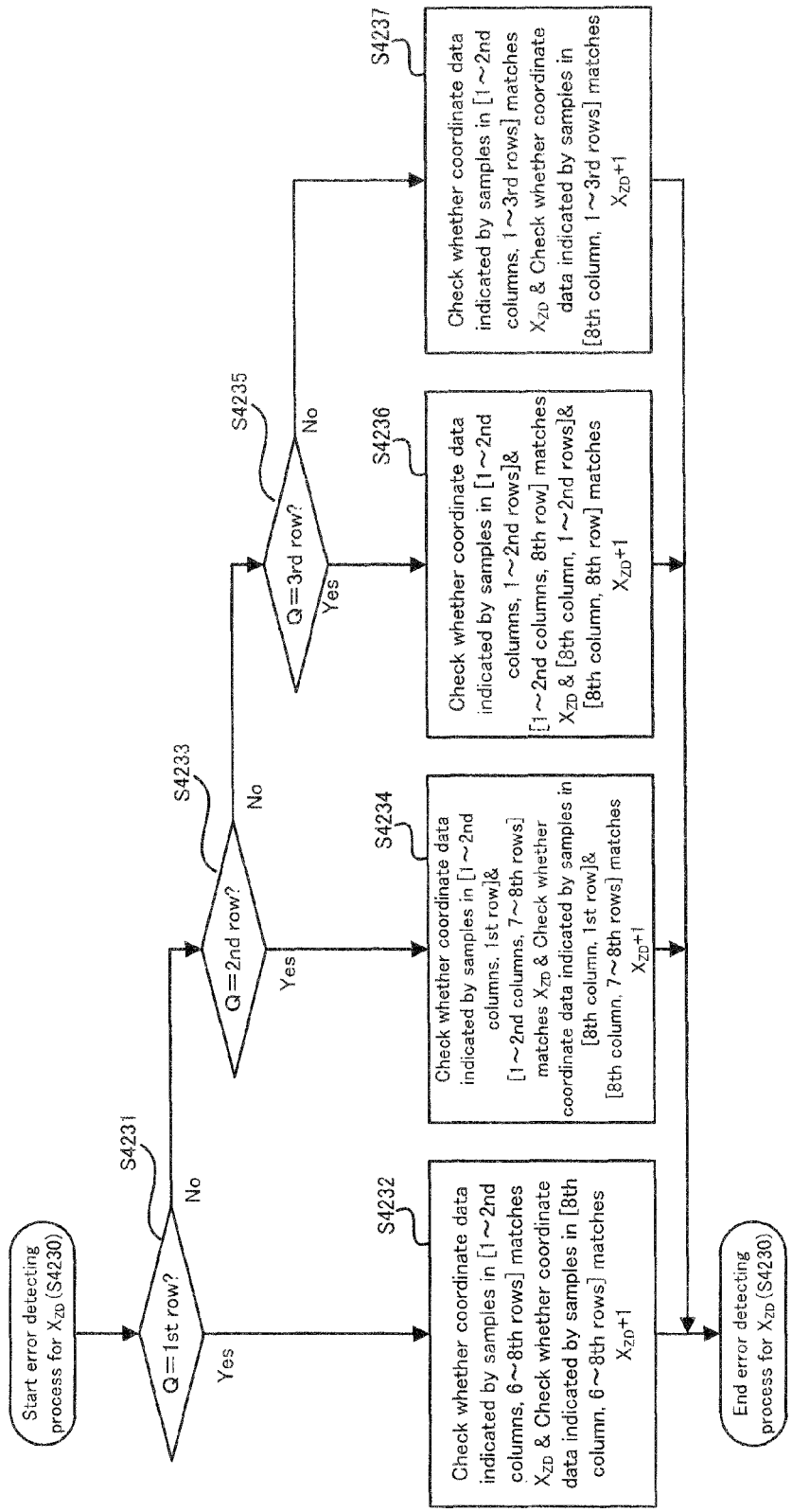

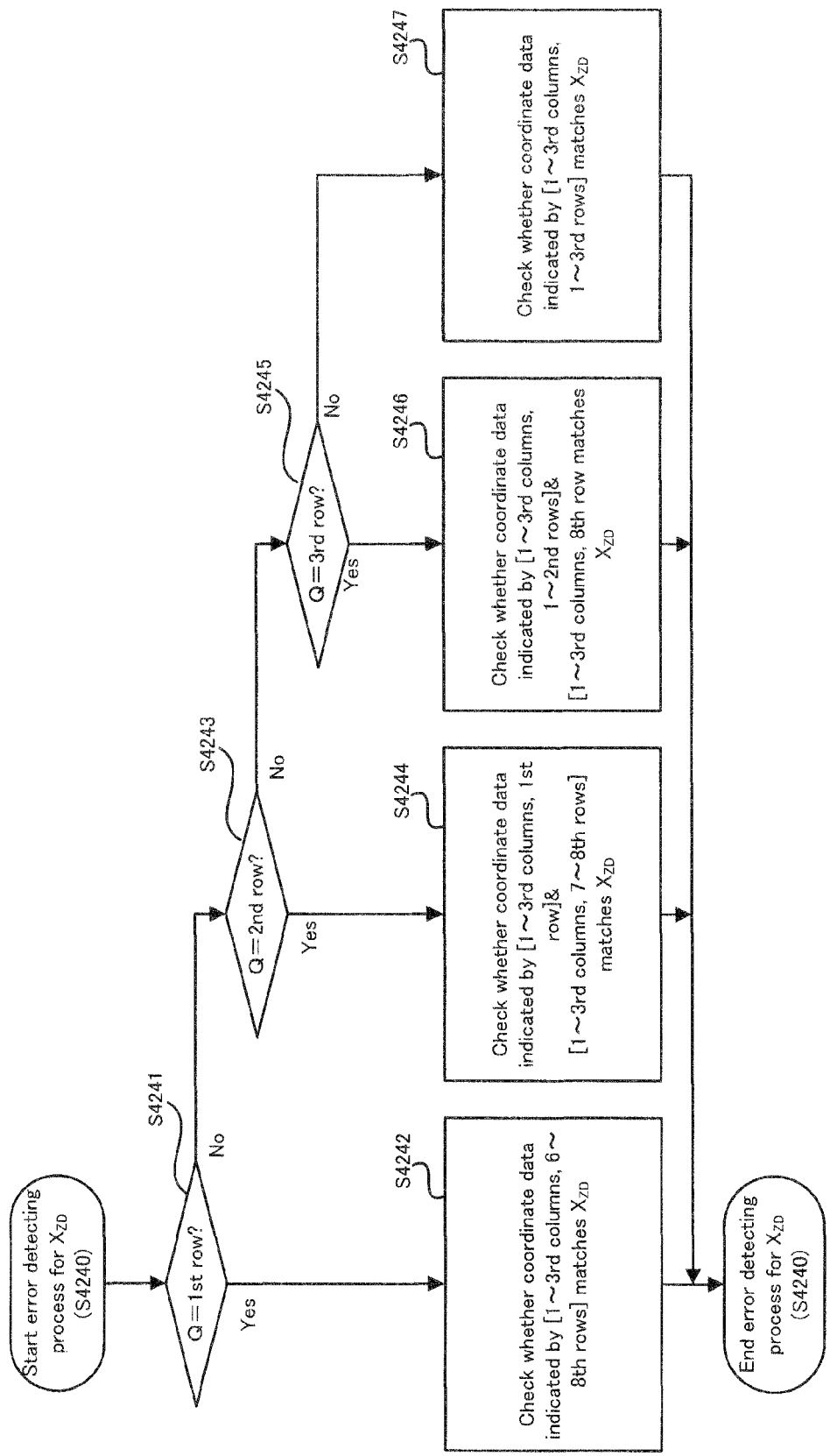
[FIG. 22]

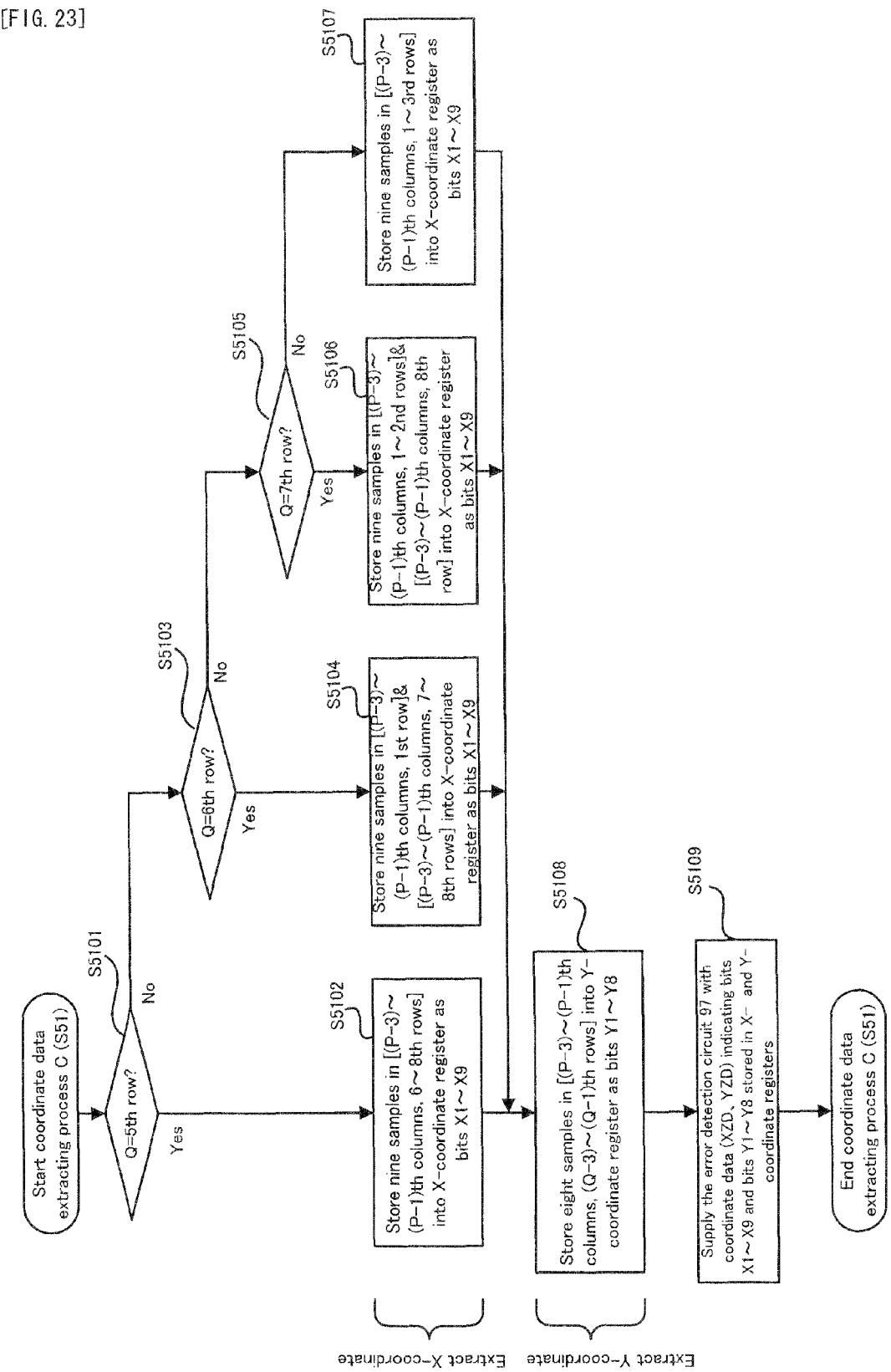
[FIG. 23]

[FIG. 24]
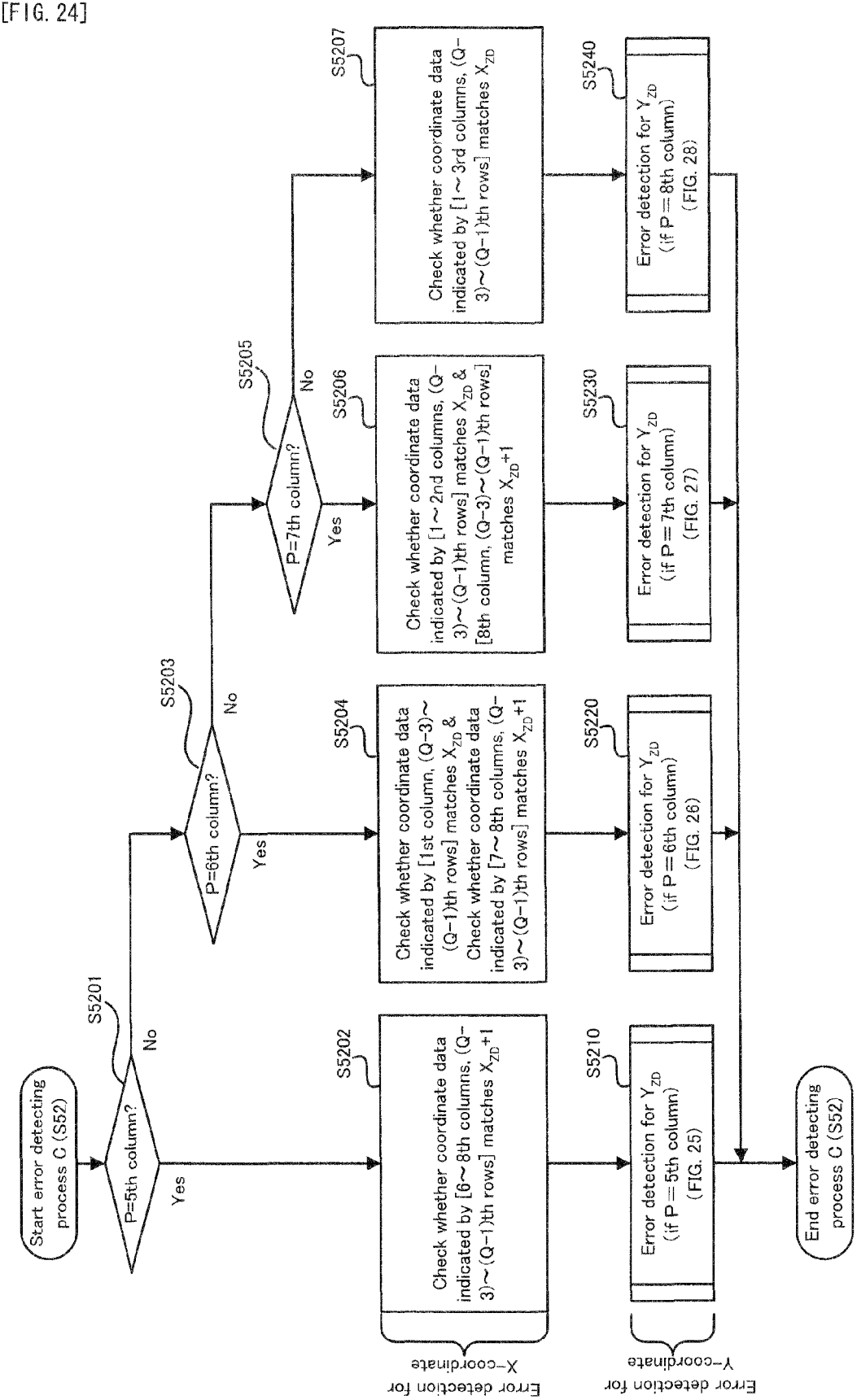

[FIG. 25]
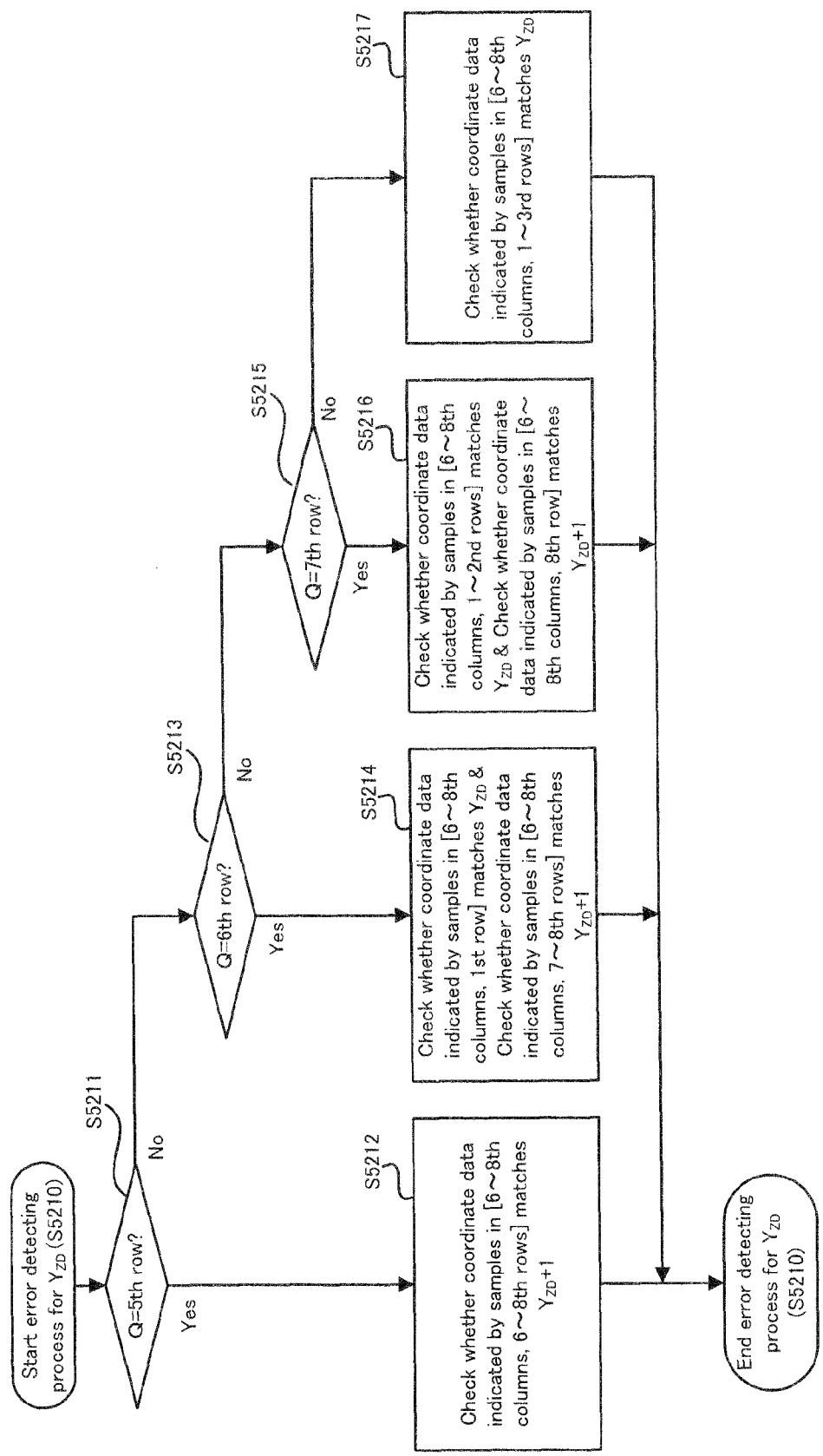

[FIG. 26]
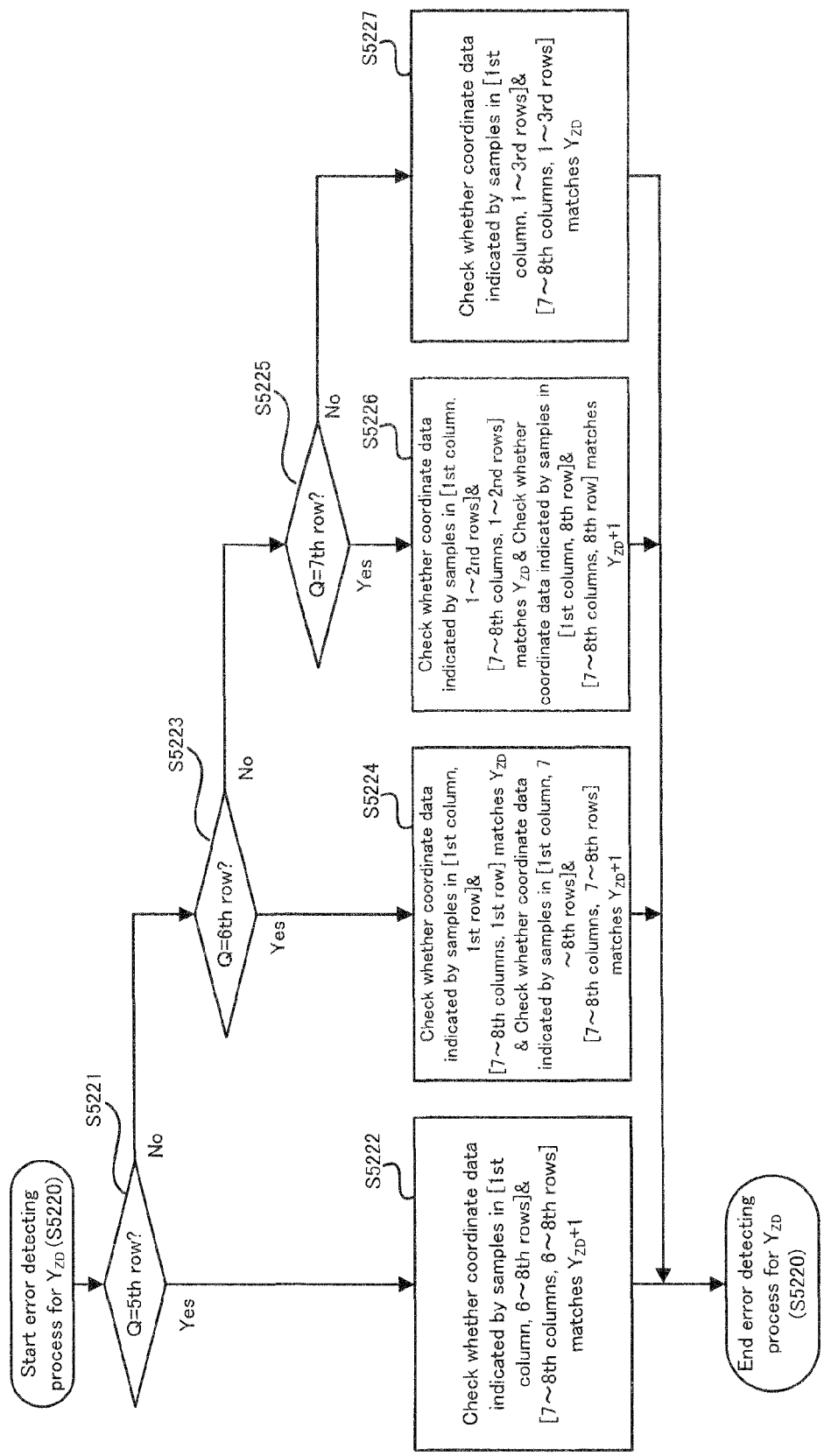

[FIG. 27]
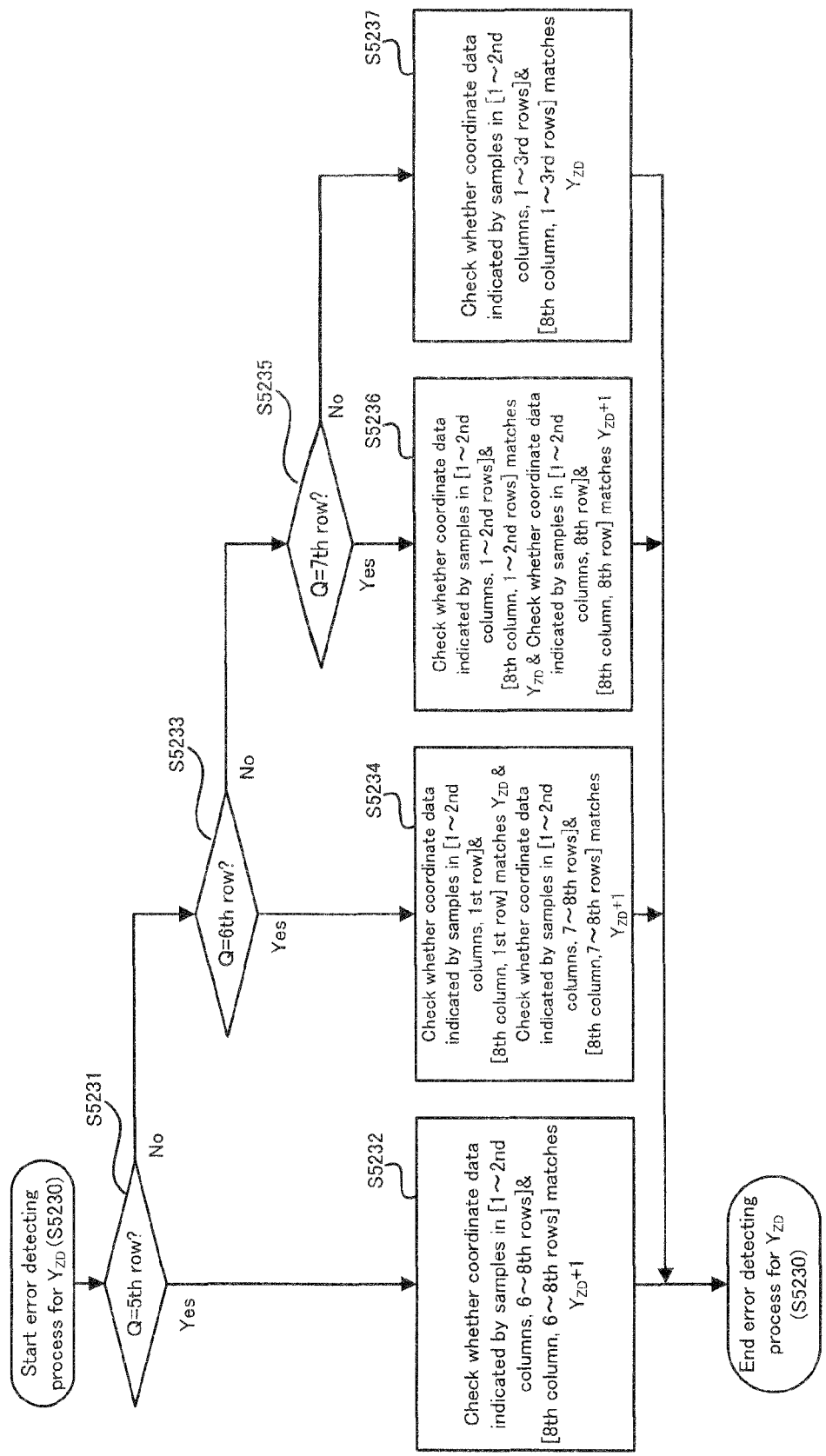

[FIG. 28]
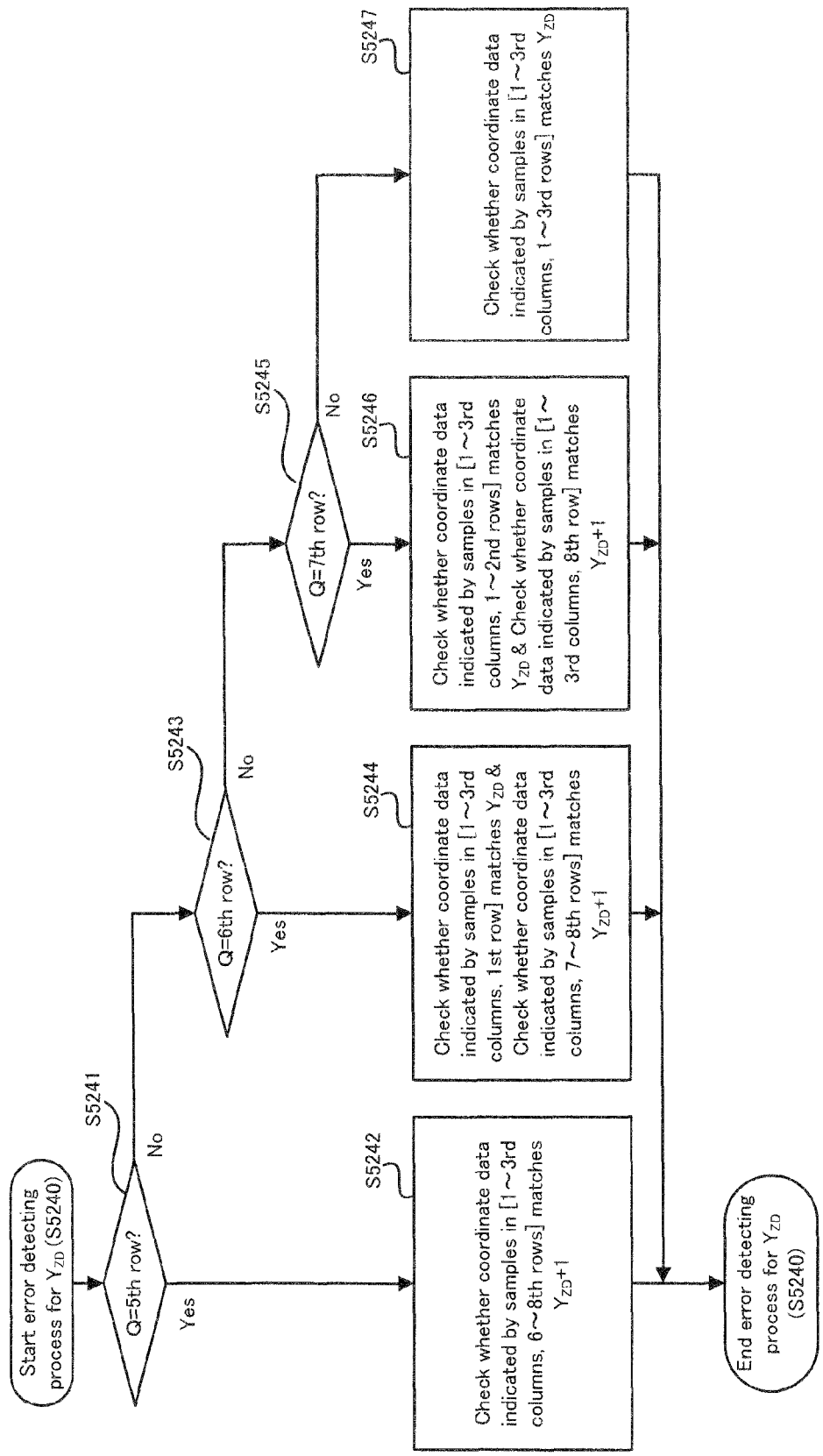

[FIG. 29]
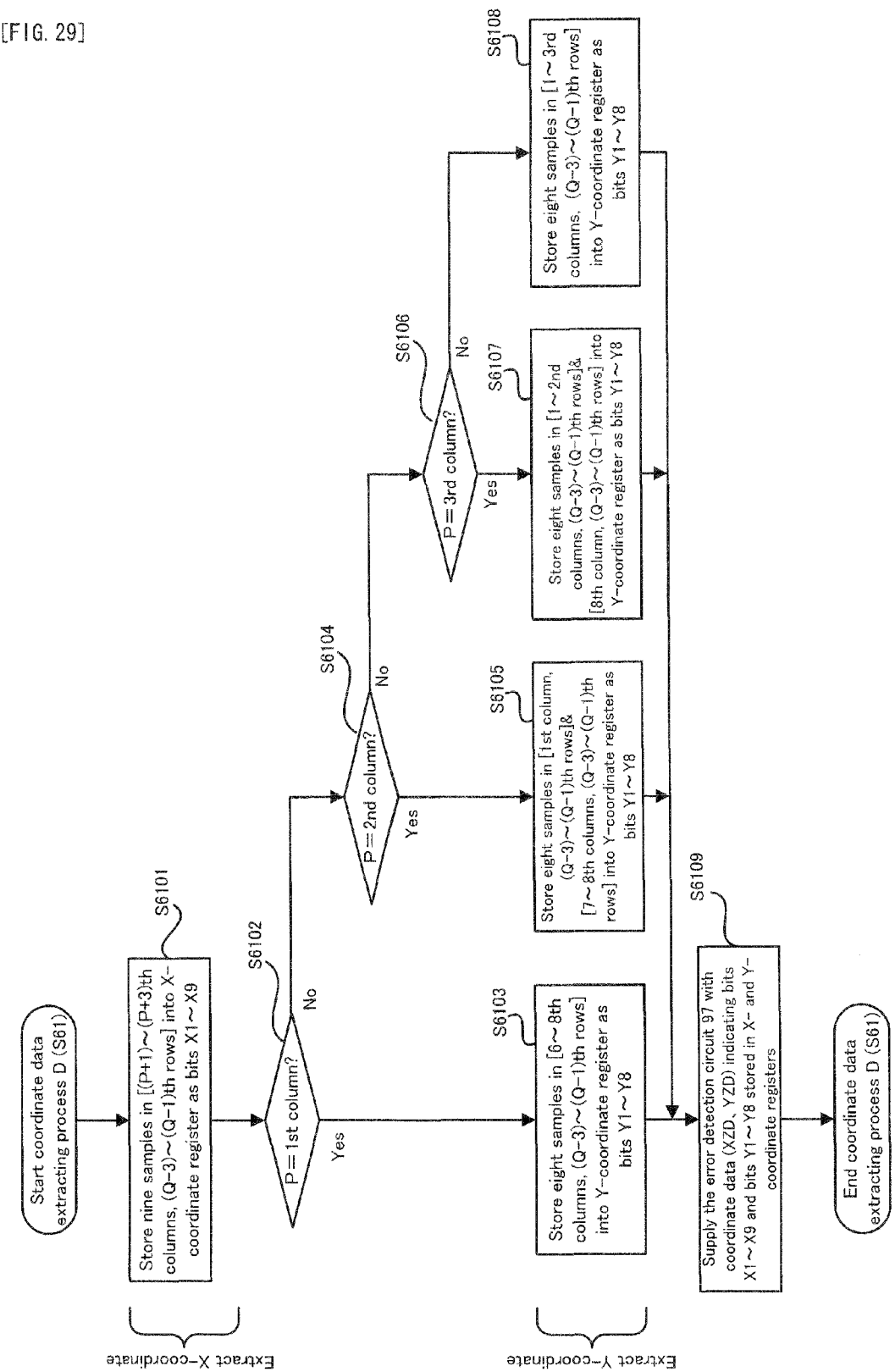

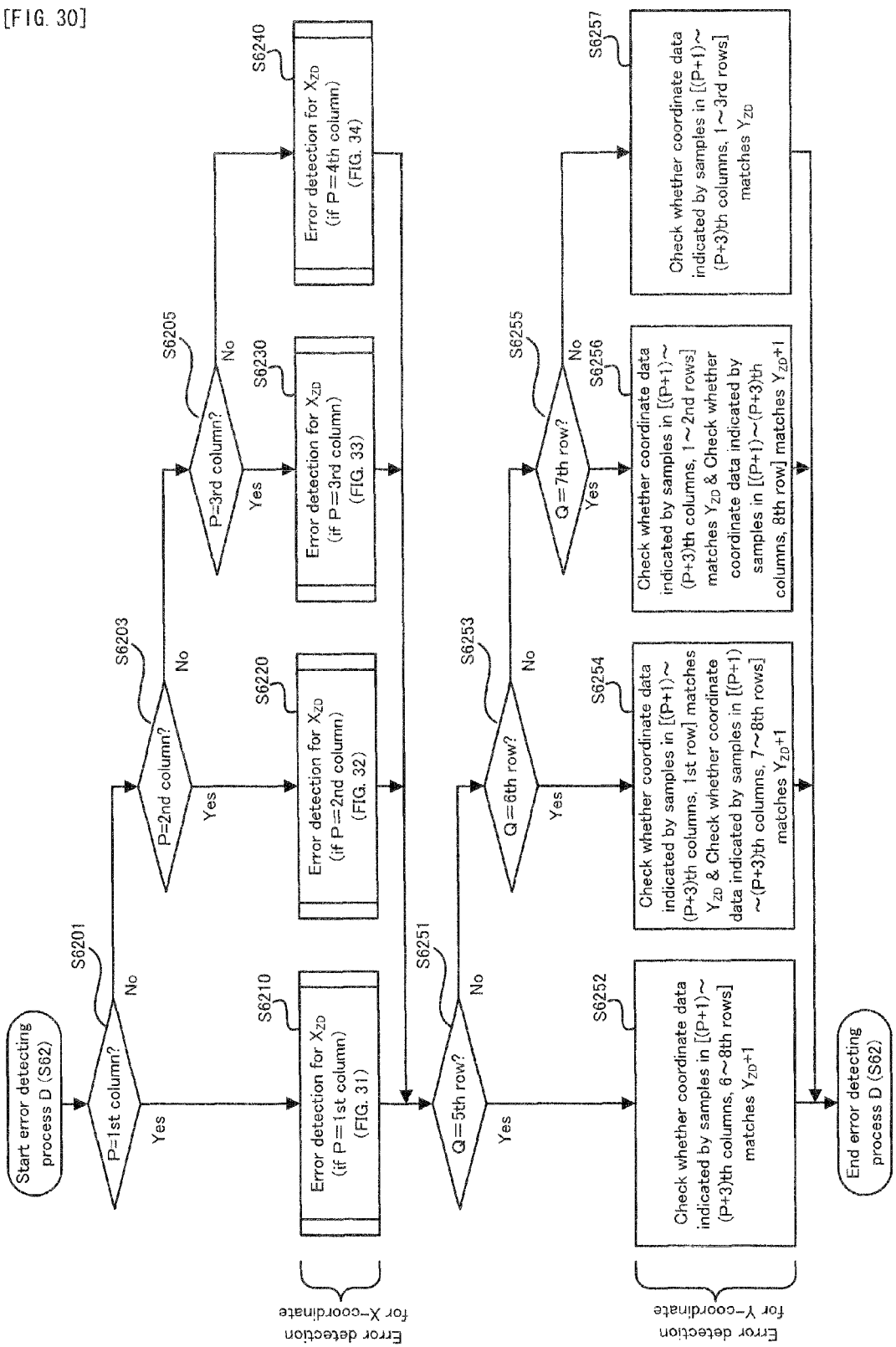

[FIG. 31]
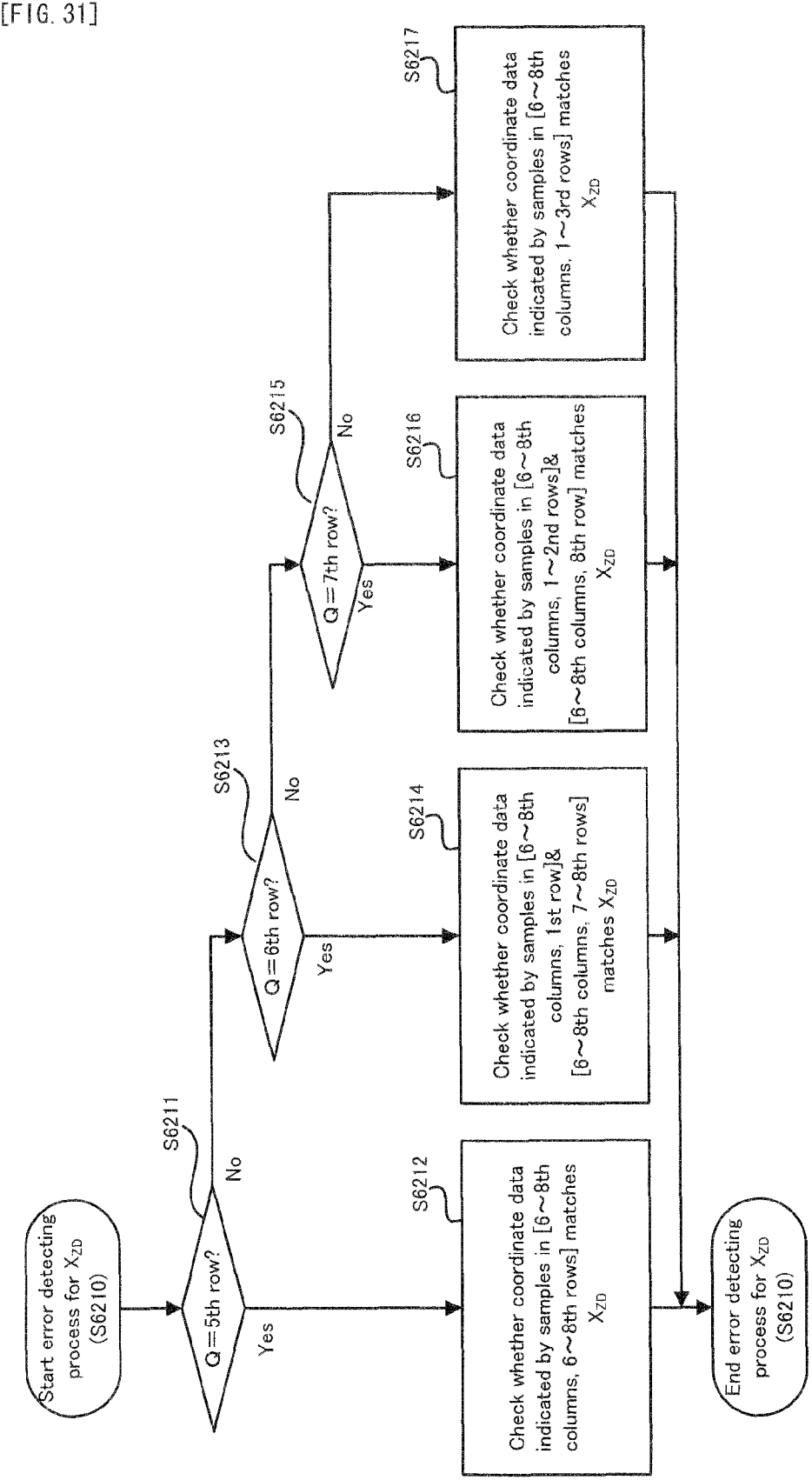

[FIG. 32]
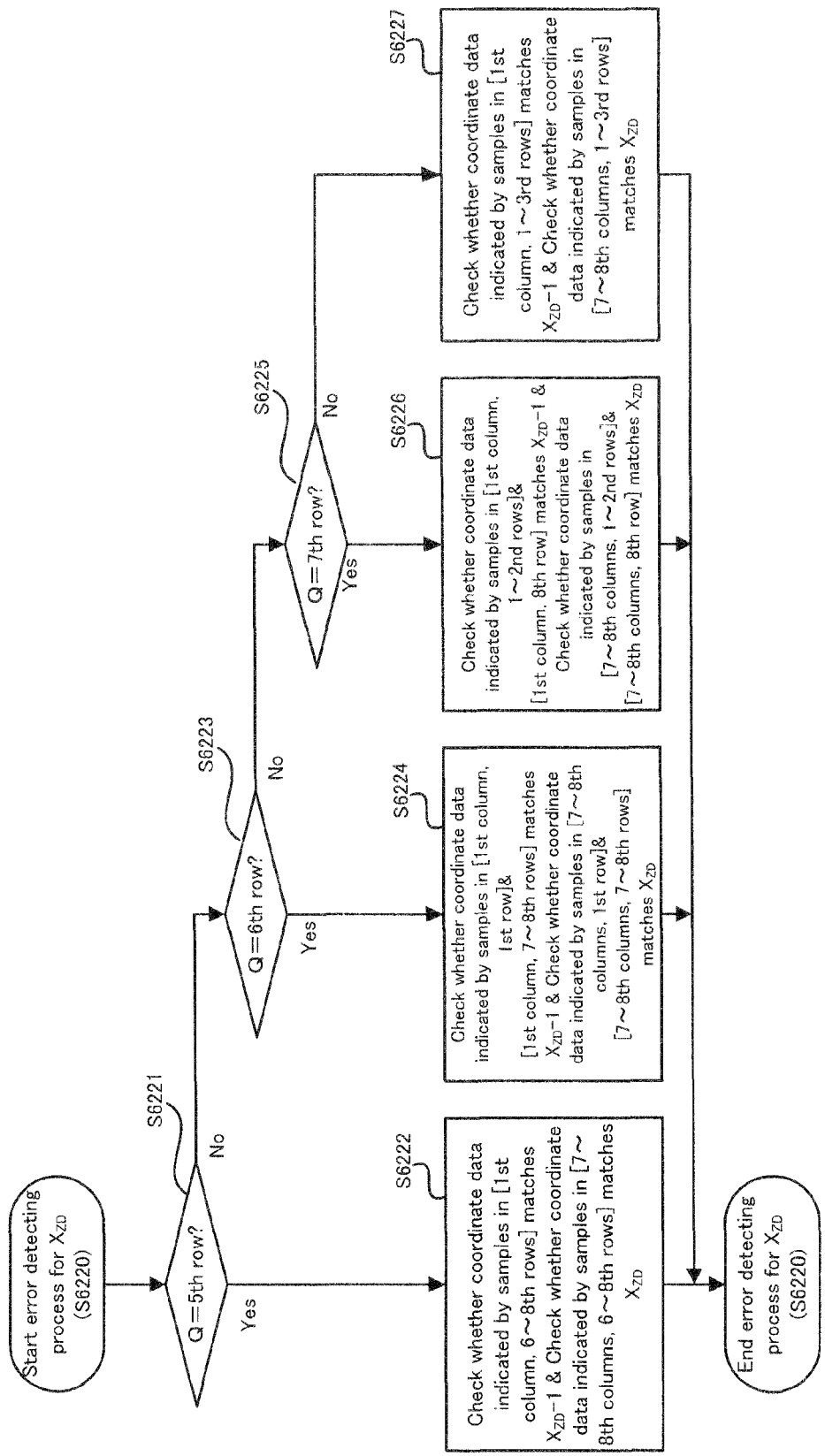

[FIG. 33]
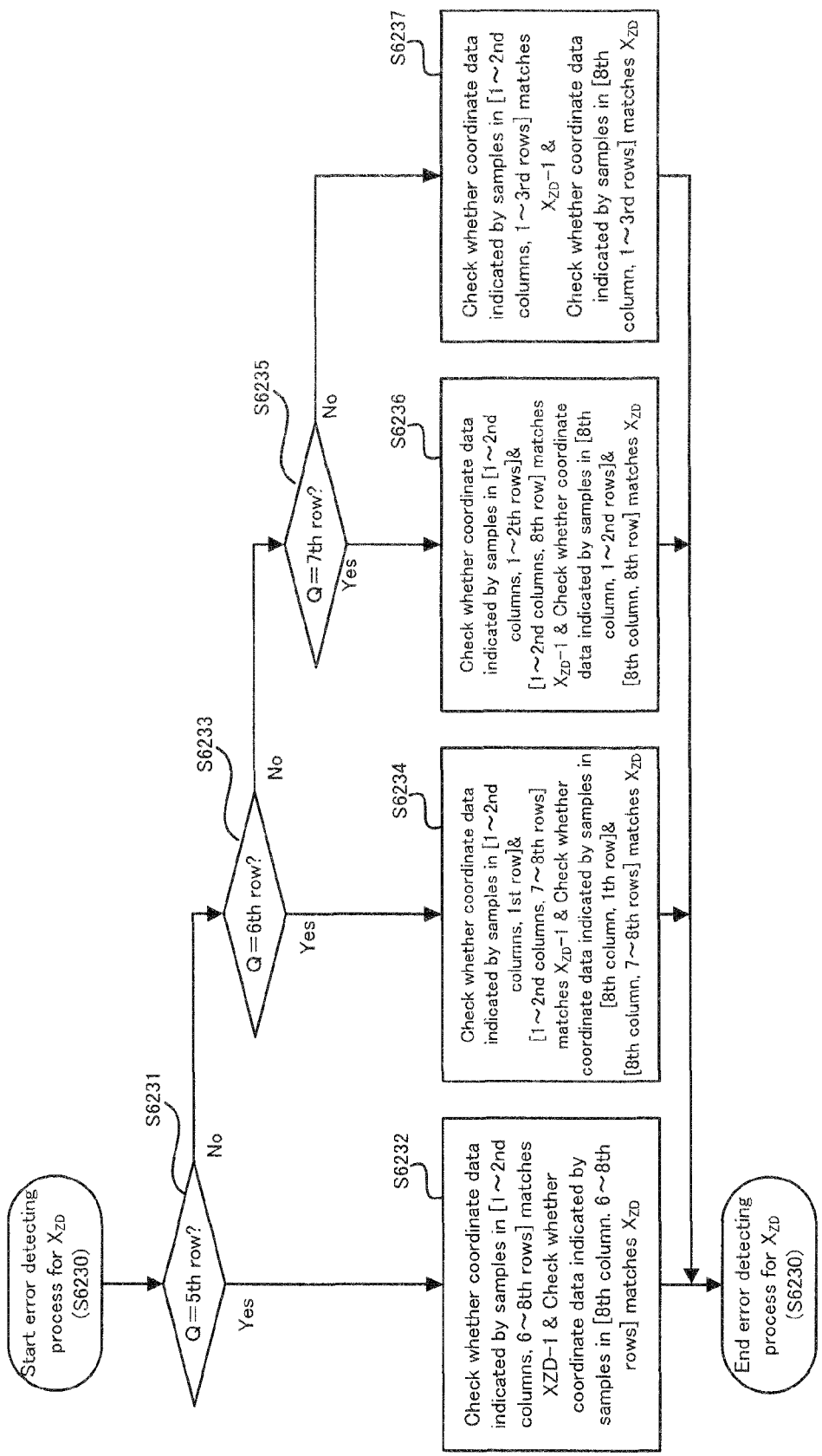

[FIG. 34]
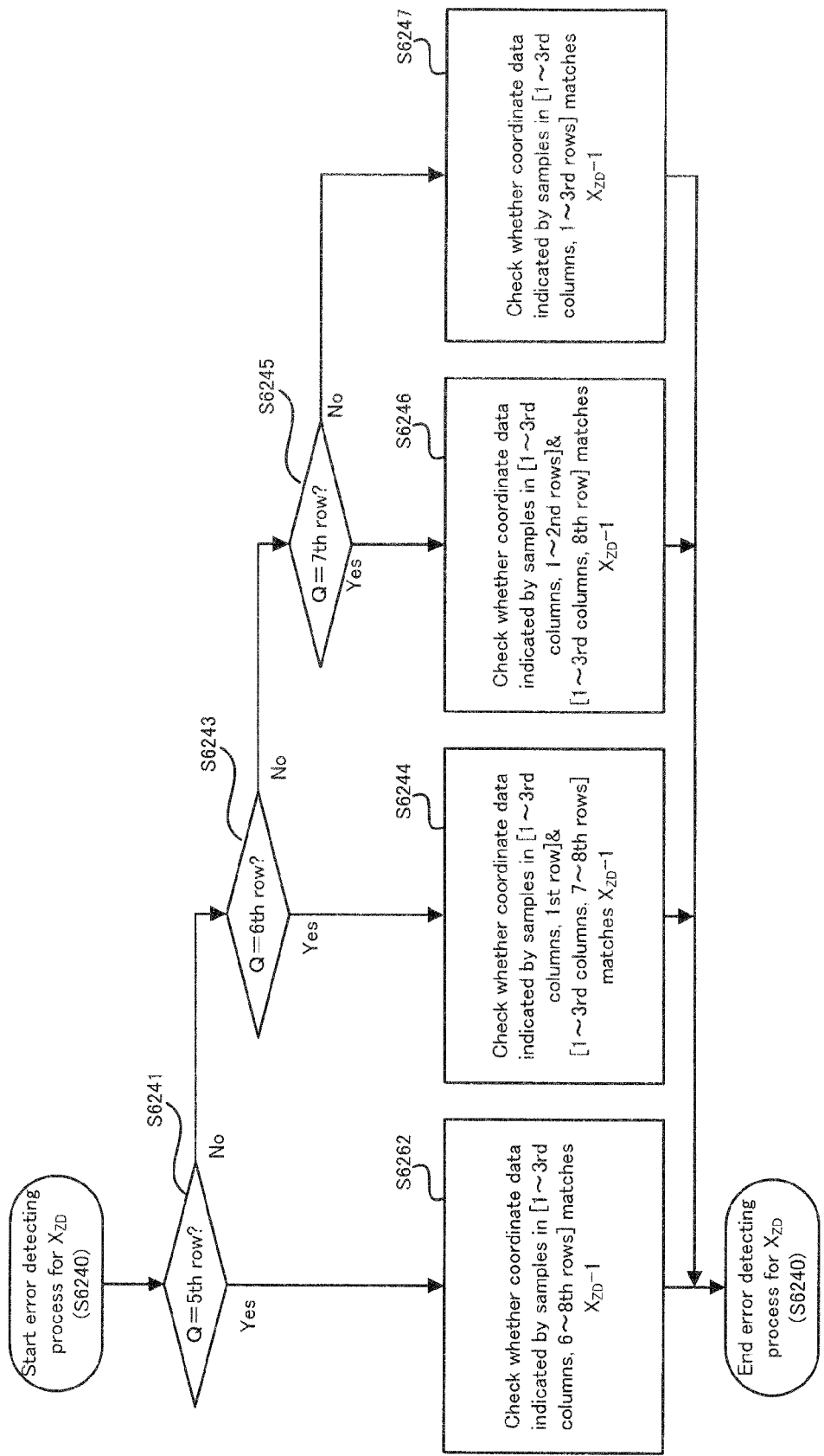

[FIG. 35]
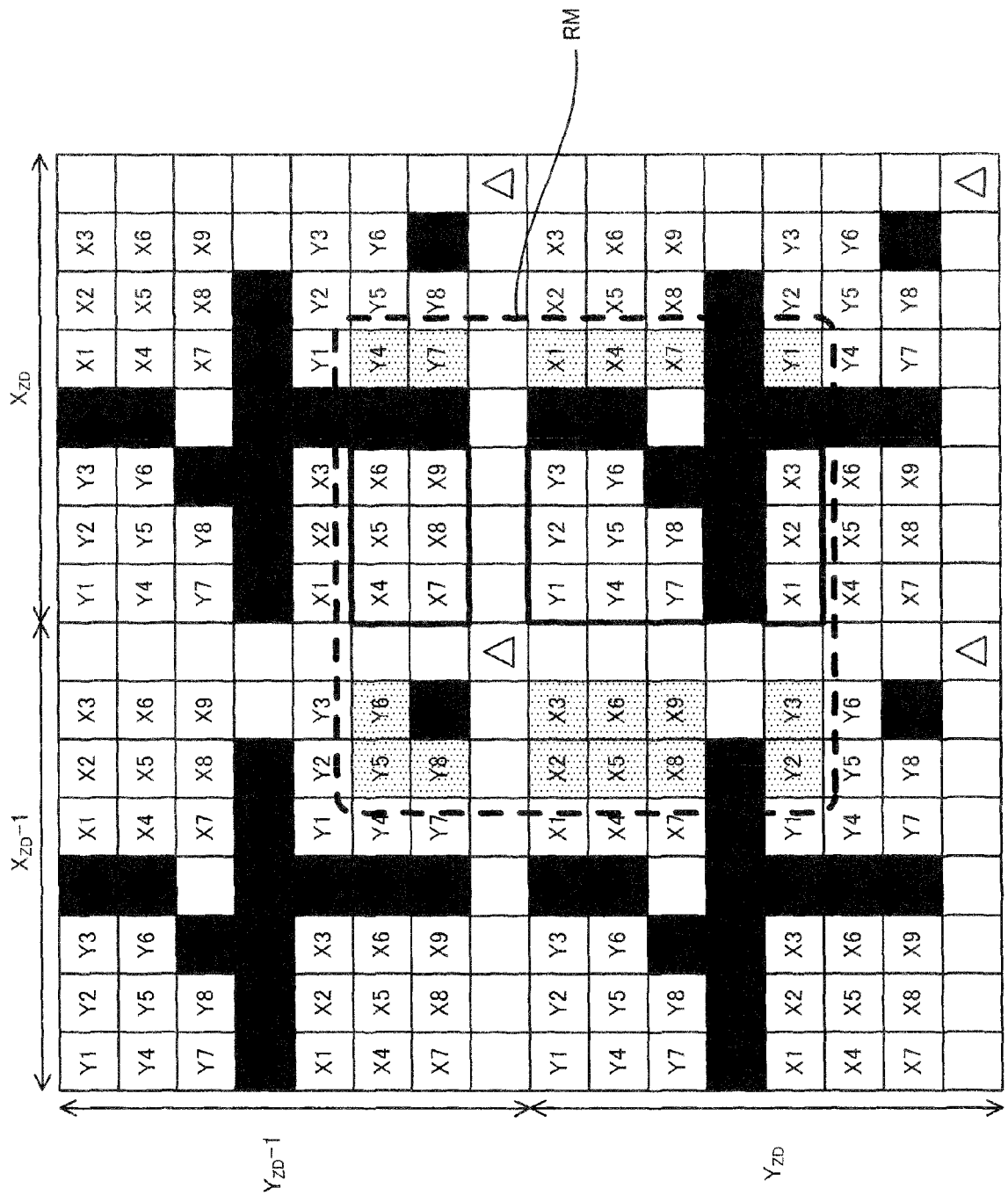

[FIG. 36]
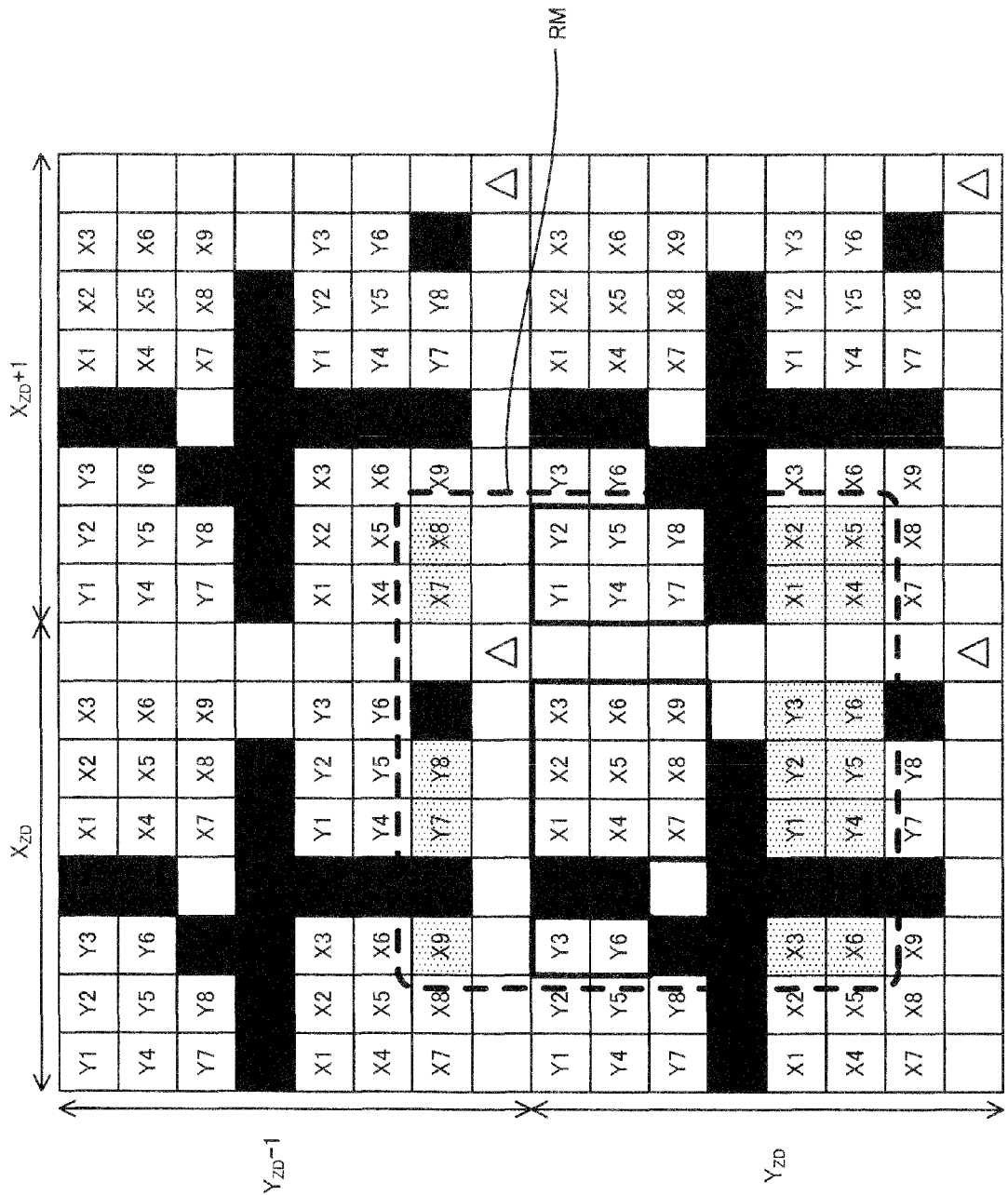

[FIG. 37]
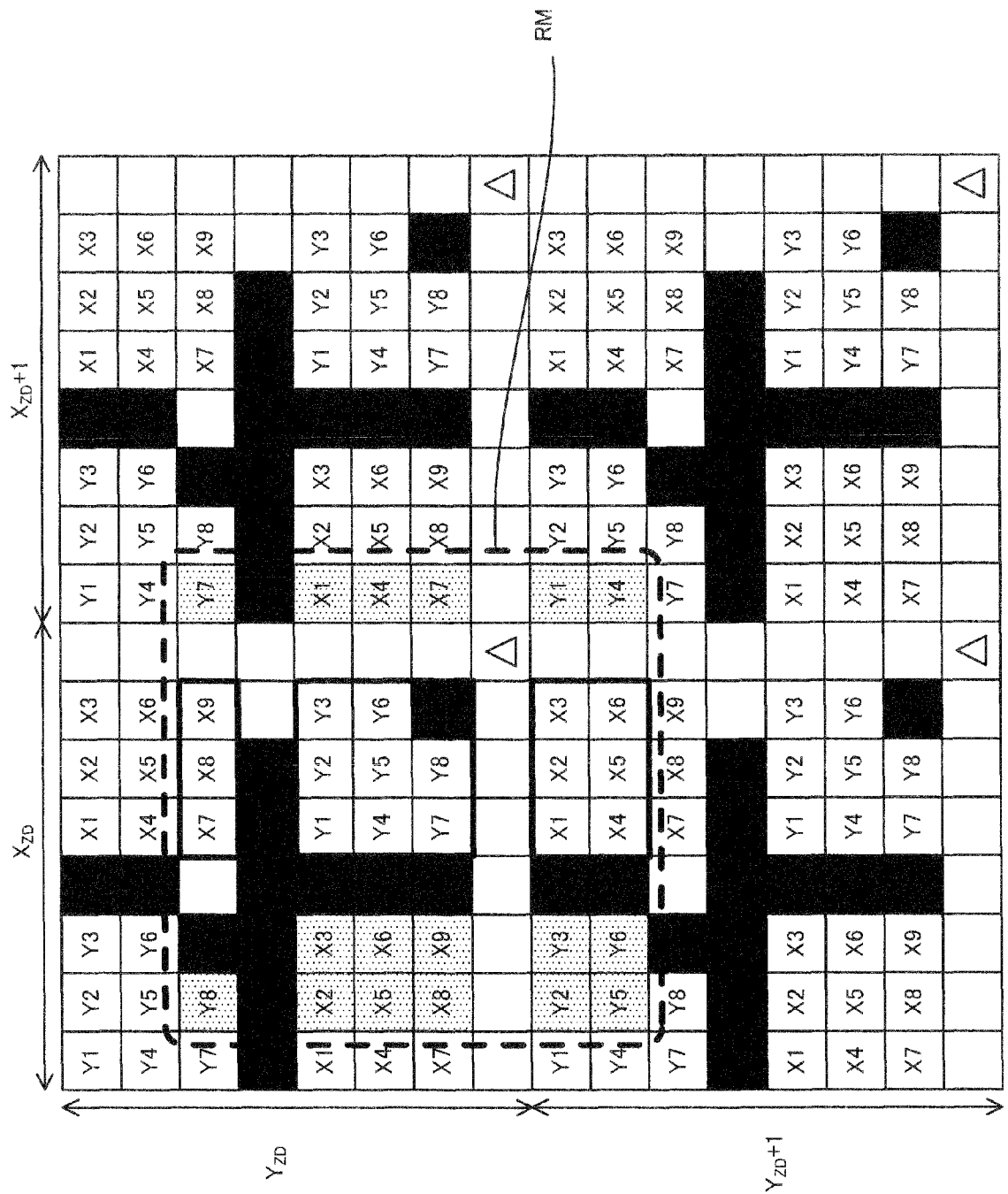

[FIG. 38]
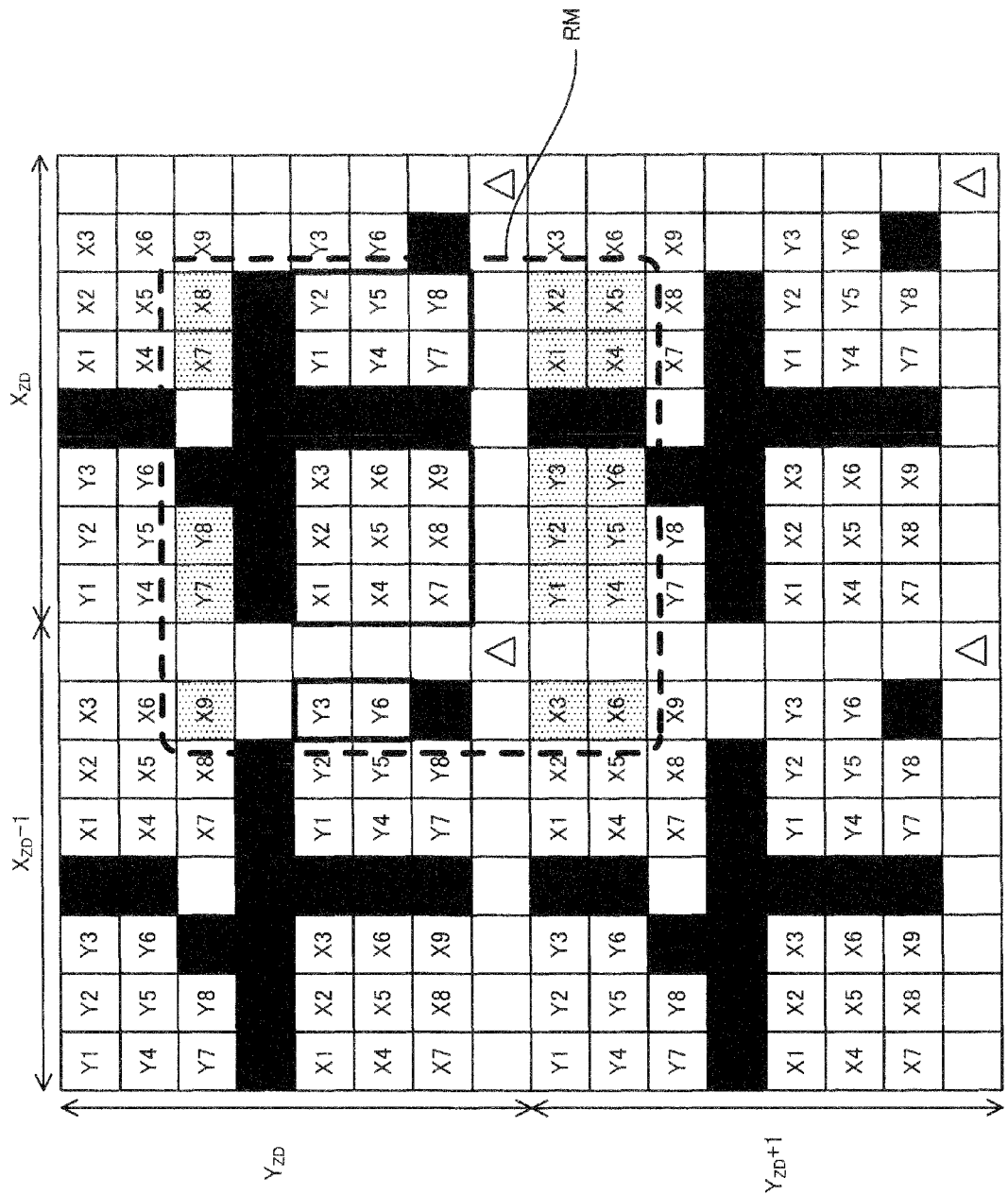

[FIG. 39]
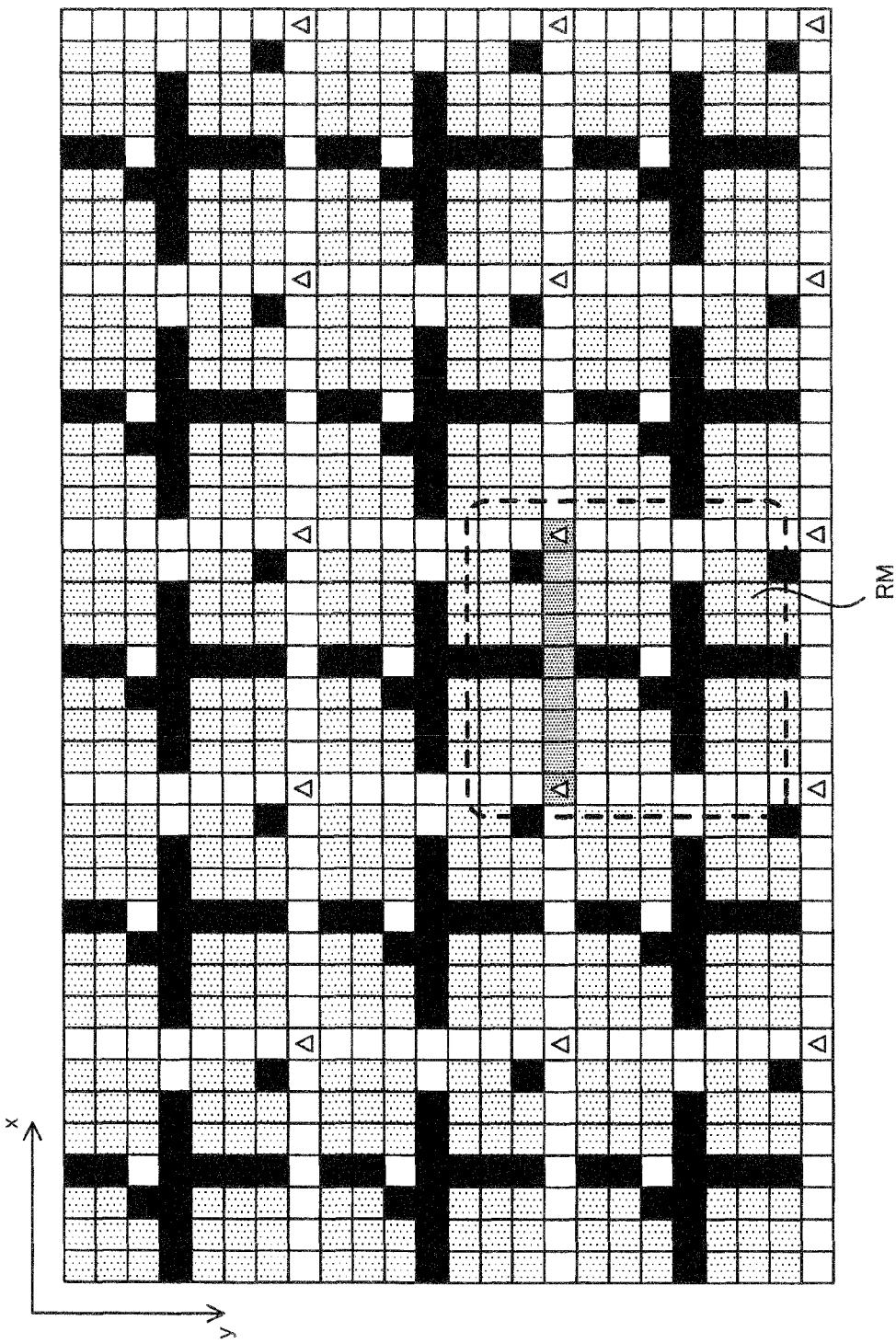

[FIG. 40]
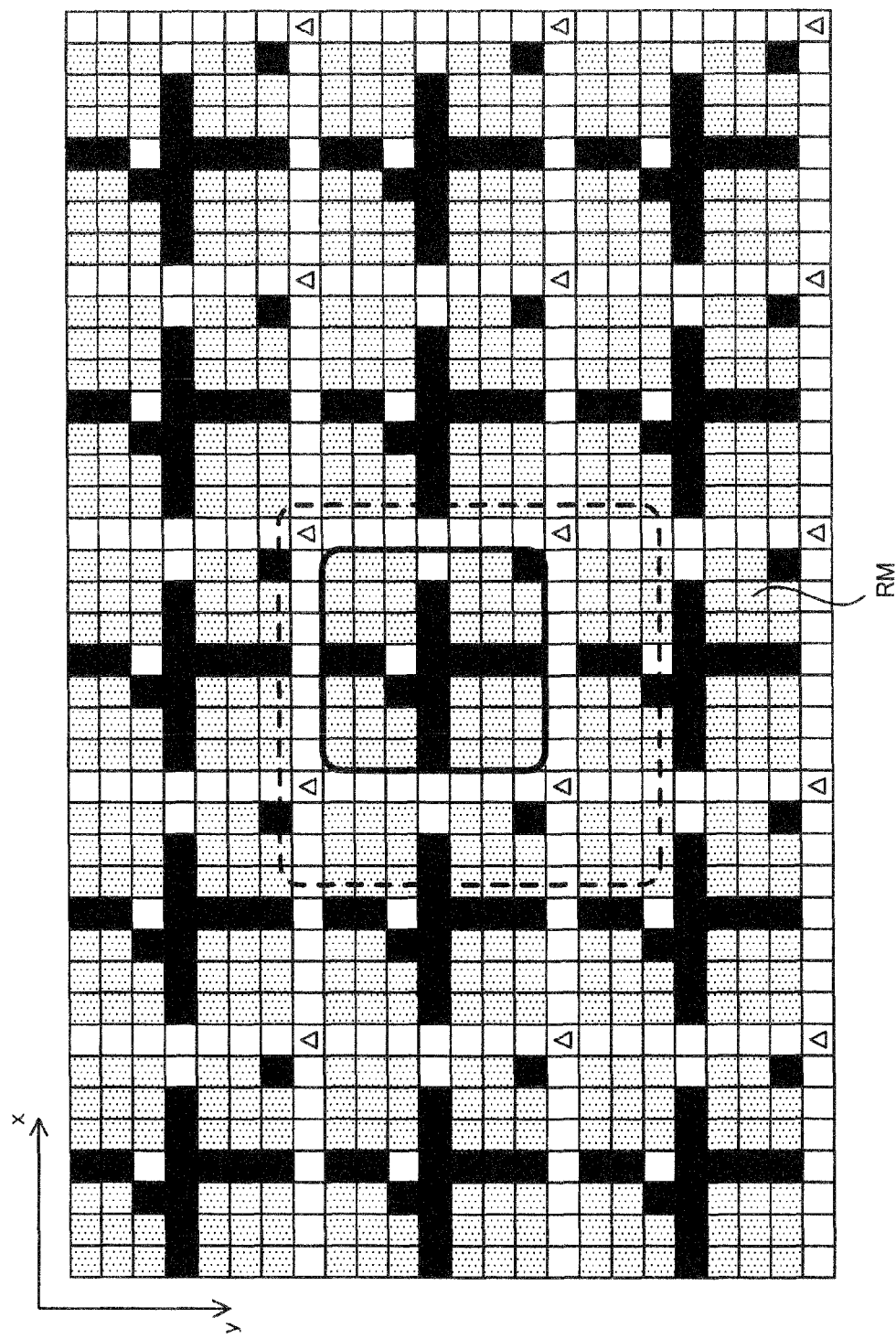

[FIG. 41]
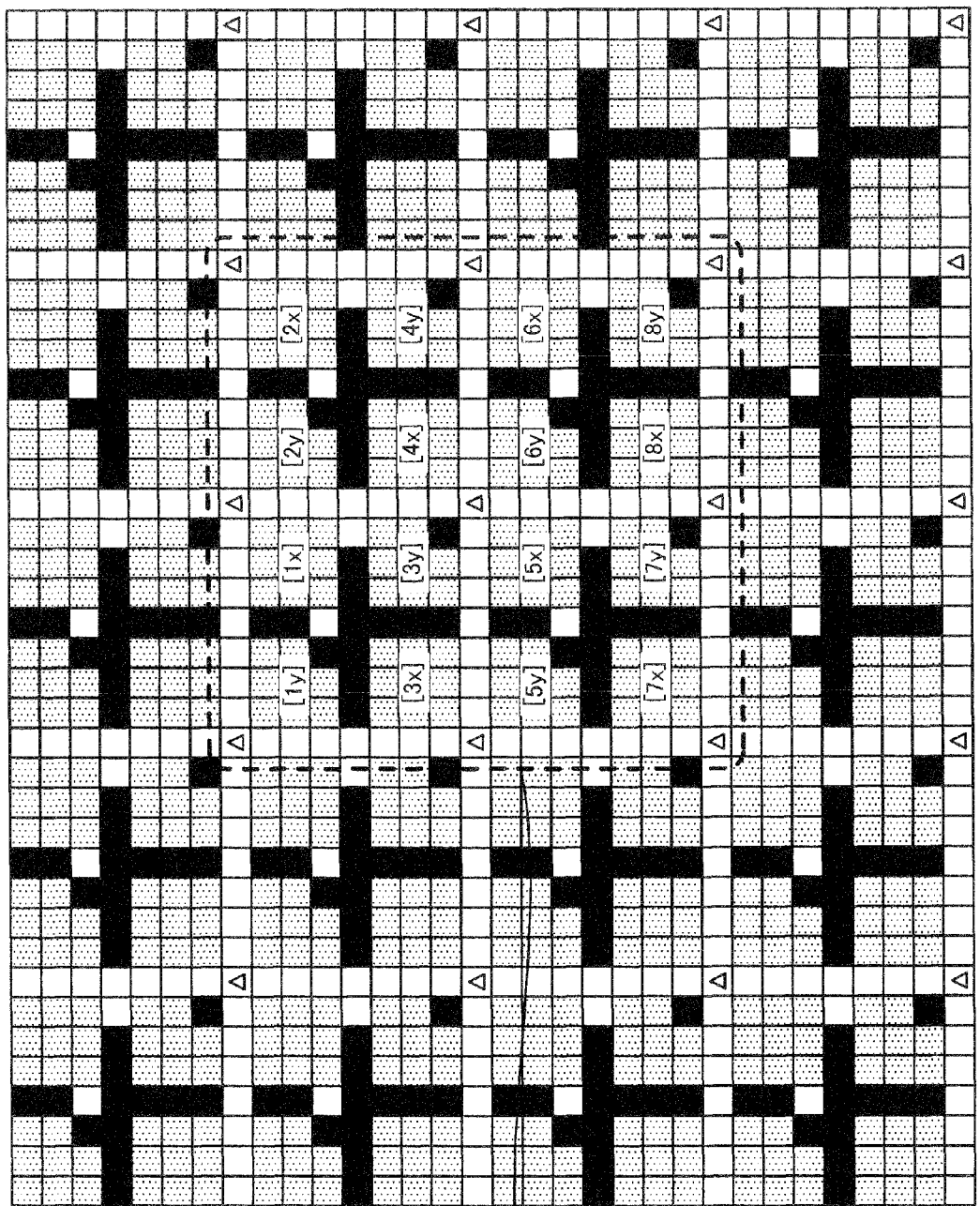

ERROR DETECTING APPARATUS AND METHOD, AND COMPUTER PROGRAM

TECHNICAL FIELD

The present invention relates to an error detecting apparatus for and method of detecting an error in reading a two-dimensional code pattern, which indicates information data as a two-dimensional image pattern, and a computer program which makes a computer function as such an error detecting apparatus. The present invention specifically relates to an error detecting apparatus and method in an input system which can be used as an electronic whiteboard, an electronic blackboard, or the like used in a conference room, as well as a computer program which makes a computer function as such an error detecting apparatus.

BACKGROUND ART

Various codes such as a QR code are used as a two-dimensional (2D) code which indicates information data as a 2D image pattern. Moreover, for example, as disclosed in patent documents 1 and 2, there have been developed systems for detecting a coordinate position in a display surface touched by an optical pen, by displaying the 2D code on the display surface or the like of a display and by bringing the optical pen to contact with the display surface.

The systems disclosed in the patent documents 1 and 2 use a 2D code in which a coordinate pattern of vertical six dots and horizontal six dots indicates one coordinate position. In the systems, the coordinate position is obtained from an image read on a photodetector provided for the optical pen, and then mutual correction and prediction correction are performed, wherein the mutual correction uses the fact that the x-coordinate of one coordinate pattern is equal to the x-coordinate of an another coordinate pattern which is adjacent in a lateral direction and that the y-coordinate of one coordinate pattern is equal to the y-coordinate of an another coordinate pattern which is adjacent in a longitudinal direction, and the prediction correction considers a relation between a coordinate Xn and a coordinate Xn+1 and a relation between a coordinate Yn and a coordinate Yn+1.

Patent document 1: Japanese Patent Application Laid Open No. Hei 5-290795

Patent document 2: Japanese Patent Application Laid Open No. 2001-234509

DISCLOSURE OF INVENTION

Subject to be Solved by the Invention

In the aforementioned systems, the continuity of the X coordinate and the Y coordinate is used to perform the mutual correction and the prediction correction which uses extra-image data that is not included in the read image; however, there is such a conceivable disadvantage that an error cannot be detected even if there is the error at the detected coordinate position and that the mutual correction and the prediction correction are mistakenly performed. Thus, in order to perform the error detection, it is necessary to prepare an error detection pattern separately or to make a comparison with a coordinate position detected in the past.

In view of the aforementioned problems, it is therefore an object of the present invention to provide, for example, an error detecting apparatus and method which allows more preferable detection of whether or not there is an error at the coordinate position detected by reading the coordinate pattern included in the 2D code, and a computer program which makes a computer function as such an error detecting apparatus.

Means for Solving the Subject

The above object of the present invention can be achieved by an error detecting apparatus for detecting an error in reading a two-dimensional code pattern, the two-dimensional code pattern provided with a plurality of information blocks each of which includes an information pattern and a boundary pattern, the information pattern including a plurality of first pattern images each of which corresponds to first information data and a plurality of second pattern images each of which corresponds to second information data, the boundary pattern indicating a boundary position, the error detecting apparatus provided with: a reading device for obtaining an image read signal by reading the two-dimensional code pattern in each reading range corresponding to a size which is equal to or more than a size of the information block; a reference point detecting device for detecting an intersection in the boundary pattern, as a block reference point, from the image read signal; an extracting device for extracting each of the first information data and the second information data, on the basis of one portion of the plurality of first pattern images and the plurality of second pattern images which belongs to an information data extraction area, the information data extraction area being determined in accordance with a position in the reading range at which the block reference point exists, the information data extraction area being referred to in order to extract each of the first information data and the second information data; and an error detecting device for detecting whether or not there is an error in at least one of the first information data and the second information data extracted by the extracting device, on the basis of another portion of the plurality of first pattern images and the plurality of second pattern images which belongs to another area other than the information data extraction area.

The above object of the present invention can be also achieved by an error detecting method of detecting an error in reading a two-dimensional code pattern, the two-dimensional code pattern provided with a plurality of information blocks each of which includes an information pattern and a boundary pattern, the information pattern including a plurality of first pattern images each of which corresponds to first information data and a plurality of second pattern images each of which corresponds to second information data, the boundary pattern indicating a boundary position, the error detecting method provided with: a reading process of obtaining an image read signal by reading the two-dimensional code pattern in each reading range corresponding to a size which is equal to or more than a size of the information block; a reference point detecting process of detecting an intersection in the boundary pattern, as a block reference point, from the image read signal; an extracting process of extracting each of the first information data and the second information data, on the basis of one portion of the plurality of first pattern images and the plurality of second pattern images which belongs to an information data extraction area, the information data extraction area being determined in accordance with a position in the reading range at which the block reference point exists, the information data extraction area being referred to in order to extract each of the first information data and the second information data; and an error detecting process of detecting whether or not there is an error in at least one of the first information data and the second information data extracted by the extracting process, on the basis of another portion of the plurality of first pattern images and the plurality of second pattern images which belongs to another area other than the information data extraction area.

The above object of the present invention can be achieved by a computer program for controlling a computer provided for an error detecting apparatus for detecting an error in reading a two-dimensional code pattern, the two-dimensional code pattern provided with a plurality of information blocks each of which includes an information pattern and a boundary pattern, the information pattern including a plurality of first pattern images each of which corresponds to first information data and a plurality of second pattern images each of which corresponds to second information data, the boundary pattern indicating a boundary position, the error detecting apparatus provided with: a reading device for obtaining an image read signal by reading the two-dimensional code pattern in each reading range corresponding to a size which is equal to or more than a size of the information block; a reference point detecting device for detecting an intersection in the boundary pattern, as a block reference point, from the image read signal; an extracting device for extracting each of the first information data and the second information data, on the basis of one portion of the plurality of first pattern images and the plurality of second pattern images which belongs to an information data extraction area, the information data extraction area being determined in accordance with a position in the reading range at which the block reference point exists, the information data extraction area being referred to in order to extract each of the first information data and the second information data; and an error detecting device for detecting whether or not there is an error in at least one of the first information data and the second information data extracted by the extracting device, on the basis of another portion of the plurality of first pattern images and the plurality of second pattern images which belongs to another area other than the information data extraction area, the computer program making the computer function as at least one portion of the reading device, the reference point detecting device, the extracting device, and the error detecting device.

These operation and other advantages of the present invention will become more apparent from the embodiments explained below.

BRIEF DESCRIPTION OF DRAWINGS

FIG. 1 is a block diagram conceptually showing the basic structure of an electronic display system in an example.

FIG. 2 is a plan view conceptually showing a coordinate position (X, Y) at which a pixel block is located in a display surface of a PDP.

FIG. 3 are plan views conceptually showing a 2D code obtained by converting coordinate data.

FIG. 4 is a timing chart conceptually showing a light emission driving sequence based on a subfield method.

FIG. 5 are plan views showing a display example on the display surface of the PDP by the implementation of a main image display driving process.

FIG. 6 is a plan view showing a display example on the display surface of the PDP by the implementation of a 2D code display driving process.

FIG. 7 is a block diagram on conceptually showing the basic structure of an electromagnetic pen.

FIG. 8 is a flowchart conceptually showing a flow of the operations of the electronic display system in the example.

FIG. 9 is a plan view conceptually showing 64 pixel positions of eight rows×eight columns in the imaging range of an image sensor.

FIG. 10 is a plan view conceptually showing that the 64 pixels of eight rows×eight columns in the imaging range of the image sensor are divided into four areas.

FIG. 11 is a flowchart conceptually showing a flow of the operations of a coordinate data extracting process A in the case where a reference position is included in an area A in the imaging range.

FIG. 12 is a flowchart conceptually showing a flow of the operations of an error detecting process A in the case where the reference position is included in the area A in the imaging range.

FIG. 13 is a flowchart conceptually showing a flow of an error detecting operation for a coordinate position $Y_{ZD}$ in a Y direction in a step S3210 in FIG. 12.

FIG. 14 is a flowchart conceptually showing a flow of an error detecting operation for the coordinate position $Y_{ZD}$ in the Y direction in a step S3220 in FIG. 12.

FIG. 15 is a flowchart conceptually showing a flow of an error detecting operation for the coordinate position $Y_{ZD}$ in the Y direction in a step S3230 in FIG. 12.

FIG. 16 is a flowchart conceptually showing a flow of an error detecting operation for the coordinate position $Y_{ZD}$ in the Y direction in a step S3240 in FIG. 12.

FIG. 17 is a flowchart conceptually showing a flow of the operations of a coordinate data extracting process B in the case where a reference position is included in an area B in the imaging range.

FIG. 18 is a flowchart conceptually showing a flow of the operations of an error detecting process B in the case where the reference position is included in the area B in the imaging range.

FIG. 19 is a flowchart conceptually showing a flow of an error detecting operation for a coordinate position $X_{ZD}$ in an X direction in a step S4210 in FIG. 18.

FIG. 20 is a flowchart conceptually showing a flow of an error detecting operation for the coordinate position $X_{ZD}$ in the X direction in a step S4220 in FIG. 18.

FIG. 21 is a flowchart conceptually showing a flow of an error detecting operation for the coordinate position $X_{ZD}$ in the X direction in a step S4230 in FIG. 18.

FIG. 22 is a flowchart conceptually showing a flow of an error detecting operation for the coordinate position $X_{ZD}$ in the X direction in a step S4240 in FIG. 18.

FIG. 23 is a flowchart conceptually showing a flow of the operations of a coordinate data extracting process C in the case where a reference position is included in an area C in the imaging range.

FIG. 24 is a flowchart conceptually showing a flow of the operations of an error detecting process C in the case where the reference position is included in the area C in the imaging range.

FIG. 25 is a flowchart conceptually showing a flow of an error detecting operation for the coordinate position $Y_{ZD}$ in the Y direction in a step S5210 in FIG. 24.

FIG. 26 is a flowchart conceptually showing a flow of an error detecting operation for the coordinate position $Y_{ZD}$ in the Y direction in a step S5220 in FIG. 24.

FIG. 27 is a flowchart conceptually showing a flow of an error detecting operation for the coordinate position $Y_{ZD}$ in the Y direction in a step S5230 in FIG. 24.

FIG. 28 is a flowchart conceptually showing a flow of an error detecting operation for the coordinate position $Y_{ZD}$ in the Y direction in a step S5240 in FIG. 24.

FIG. 29 is a flowchart conceptually showing a flow of the operations of a coordinate data extracting process D in the case where a reference position is included in an area D in the imaging range.

FIG. 30 is a flowchart conceptually showing a flow of the operations of an error detecting process D in the case where the reference position is included in the area D in the imaging range.

FIG. 31 is a flowchart conceptually showing a flow of an error detecting operation for the coordinate position $X_{ZD}$ in the X direction in a step S6210 in FIG. 30.

FIG. 32 is a flowchart conceptually showing a flow of an error detecting operation for the coordinate position $X_{ZD}$ in the X direction in a step S6220 in FIG. 30.

FIG. 33 is a flowchart conceptually showing a flow of an error detecting operation for the coordinate position $X_{ZD}$ in the X direction in a step S6230 in FIG. 30.

FIG. 34 is a flowchart conceptually showing a flow of an error detecting operation for the coordinate position $X_{ZD}$ in the X direction in a step S6240 in FIG. 30.

FIG. 35 is a plan view conceptually showing a specific example of pixels in the imaging range in the case where the reference position is included in the area A in the imaging range.

FIG. 36 is a plan view conceptually showing a specific example of pixels in the imaging range in the case where the reference position is included in the area B in the imaging range.

FIG. 37 is a plan view conceptually showing a specific example of pixels in the imaging range in the case where the reference position is included in the area C in the imaging range.

FIG. 38 is a plan view conceptually showing a specific example of pixels in the imaging range in the case where the reference position is included in the area D in the imaging range.

FIG. 39 is a plan view conceptually showing a specific example of pixels in the imaging range in the case where the imaging range of the image sensor includes two intersections in a boundary pattern.

FIG. 40 is a plan view conceptually showing a specific example of pixels in the imaging range in the case where the imaging range of the image sensor includes four or more intersections in a boundary pattern.

FIG. 41 is a plan view conceptually showing another specific example of pixels in the imaging range in the case where the imaging range of the image sensor includes four or more intersections in a boundary pattern.

DESCRIPTION OF REFERENCE CODES 1 display surface image data memory
2 image superimposition device
3 SF pixel drive data generation device
4 drive control device
5 address driver
6 coordinate data memory
7 two-dimensional code conversion device
8 row electrode driver
9 electronic pen
10 wireless reception device
11 image data generation device
90 objective lens
91 image sensor
92 noise sensor
93 frame-synchronization detection device
94 image processing device
95 pen pressure sensor
96 coordinate data extraction device
97 error detection device
98 wireless transmission device

BEST MODE FOR CARRYING OUT THE INVENTION

Hereinafter, as the best mode for carrying out the present invention, an explanation will be given on embodiments of the input system and method, and the computer program of the present invention.

(Embodiment of Error Detecting Apparatus)

An embodiment of the error detecting apparatus of the present invention is an error detecting apparatus for detecting an error in reading a two-dimensional code pattern, the two-dimensional code pattern provided with a plurality of information blocks each of which includes an information pattern and a boundary pattern, the information pattern including a plurality of first pattern images each of which corresponds to first information data and a plurality of second pattern images each of which corresponds to second information data, the boundary pattern indicating a boundary position, the error detecting apparatus provided with: a reading device for obtaining an image read signal by reading the two-dimensional code pattern in each reading range corresponding to a size which is equal to or more than a size of the information block; a reference point detecting device for detecting an intersection in the boundary pattern, as a block reference point, from the image read signal; an extracting device for extracting each of the first information data and the second information data, on the basis of one portion of the plurality of first pattern images and the plurality of second pattern images which belongs to an information data extraction area, the information data extraction area being determined in accordance with a position in the reading range at which the block reference point exists, the information data extraction area being referred to in order to extract each of the first information data and the second information data; and an error detecting device for detecting whether or not there is an error in at least one of the first information data and the second information data extracted by the extracting device, on the basis of another portion of the plurality of first pattern images and the plurality of second pattern images which belongs to another area other than the information data extraction area.

According to the embodiment of the error detecting apparatus of the present invention, the two-dimensional code pattern including the plurality of information blocks is read (specifically, imaged) by the operation of the reading device, and as a result, the image read signal is obtained. Each information block includes the information pattern and the boundary pattern. The information pattern redundantly includes the first pattern images and the second pattern images. Moreover, the boundary pattern indicates the boundary of the information block and thereby one information block is defined. From the obtained image read signal, the block reference point which is the intersection in the boundary pattern is detected by the operation of the reference point detecting device. Then, by the operation of the extracting device, each of the first information data and the second information data is extracted on the basis of one portion of the plurality of first pattern images and one portion of the second pattern images which belong to the information data extraction area.

In the embodiment, in particular, by the operation of the error detecting device, it is detected whether or not there is an error in the extracted first information data and second information data, on the basis of another portion of the plurality of first pattern images (e.g. another portion itself of the first pattern images, or information indicated by another portion of the first pattern images) and another portion of the plurality of second pattern images (e.g. another portion itself of the second pattern images, or information indicated by another portion of the second pattern images) which belong to another area other than the information data extraction area. In other words, the error detection is performed, using another portion of the pattern images other than one portion of the pattern images used to extract the first information data and the second information data.

Here, in the embodiment, the information pattern in one information block redundantly includes the first pattern images corresponding to the first information data and the second pattern images corresponding to the second information data. Moreover, as described in detail later, the information blocks are disposed in a predetermined relation, such as a relation indicating coordinates on a xy plane or a relation indicating a predetermined information pattern. Therefore, another portion of the plurality of first pattern images and another portion of the plurality of second pattern images which belong to another area other than the information data extraction area also include data which allows the validity of the extracted first information data and second information data to be confirmed. For example, another portion of the plurality of first pattern images and/or another portion of the plurality of second pattern images which belong to another area other than the information data extraction area could conceivably include the same pattern image portion as one portion of the plurality of first pattern images and/or one portion of the plurality of second pattern images which belong to the information data extraction area or include a pattern image portion having a predetermined correlation with one portion of the plurality of first pattern images and/or one portion of the plurality of second pattern images which belong to the information data extraction area. In the embodiment, by using this data, it is detected whether or not there is an error in the extracted first information data and second information data. Specifically, for example, if there is no consistency of another portion of the plurality of first pattern images and/or another portion of the plurality of second pattern images which belong to another area other than the information data extraction area, with the extracted first information data and/or second information data, it is conceivable that there is an error (or there is highly likely an error) in the extracted first information data and/or second information data. On the other hand, if there is the consistency of another portion of the plurality of first pattern images and/or another portion of the plurality of second pattern images which belong to another area other than the information data extraction area, with the extracted first information data and/or second information data, it is conceivable that there is highly likely no error (or there is no error) in the extracted first information data and/or second information data.

This allows more preferable detection of whether or not there is an error at the coordinate position detected by reading the coordinate pattern included in the two-dimensional code. Moreover, the error detection can be performed without including a peculiar pattern for performing the error detection in the two-dimensional code.

Moreover, it is possible to match the size of the reading range on the reading device with the size of the information block, only for the coordinate detecting and error detecting operations. Therefore, it is possible to receive the aforementioned various benefits without unnecessarily increasing the reading range on the reading device.

In one aspect of the embodiment of the error detecting apparatus of the present invention, the extracting device extracts the first information data on the basis of one portion of the plurality of first pattern images which belongs to the information data extraction area, and the error detecting device detects whether or not there is an error in the first information data extracted by the extracting device, on the basis of another portion of the plurality of first pattern images which belongs to another area other than the information data extraction area.

According to this aspect, it is possible to preferably detect the first information data, and it is also possible to preferably detect whether or not there is an error in the extracted first information data.

In another aspect of the embodiment of the error detecting apparatus of the present invention, the extracting device extracts the second information data on the basis of one portion of the plurality of second pattern images which belongs to the information data extraction area, and the error detecting device detects whether or not there is an error in the second information data extracted by the extracting device, on the basis of another portion of the plurality of second pattern images which belongs to another area other than the information data extraction area.

According to this aspect, it is possible to preferably detect the second information data, and it is also possible to preferably detect whether or not there is an error in the extracted second information data.

In another aspect of the embodiment of the error detecting apparatus of the present invention, the error detecting device detects whether or not there is an error in at least one of the first information data and the second information data extracted by the extracting device, by comparing one portion of the plurality of first pattern images and the plurality of second pattern images which belongs to the information data extraction area (i.e. the first information data and the second information data) with another portion of the plurality of first pattern images and the plurality of second pattern images which belongs to another area other than the information data extraction area (i.e. data which allows the validity of the first information data and the second information data to be confirmed).

According to this aspect, it is possible to preferably detect whether or not there is an error in the extracted first information data and second information data, on the basis of another portion of the plurality of first pattern images and another portion of the plurality of second pattern images.

In an aspect of the error detecting apparatus in which one portion of the plurality of first pattern images and the plurality of second pattern images is compared with another portion of the plurality of first pattern images and the plurality of second pattern images, as described above, the extracting device may extract the first information data on the basis of one portion of the plurality of first pattern images which belongs to the information data extraction area, and the error detecting device may detect whether or not there is an error in the first information data extracted by the extracting device, by comparing one portion of the plurality of first pattern images which belongs to the information data extraction area with another portion of the plurality of first pattern images which belongs to another area other than the information data extraction area.

By virtue of such construction, it is possible to preferably detect whether or not there is an error in the extracted first information data, on the basis of another portion of the plurality of first patter images.

In an aspect of the error detecting apparatus in which one portion of the plurality of first pattern images and the plurality of second pattern images is compared with another portion of the plurality of first pattern images and the plurality of second pattern images, as described above, the extracting device may extract the second information data on the basis of one portion of the plurality of second pattern images which belongs to the information data extraction area, and the error detecting device may detect whether or not there is an error in the second information data extracted by the extracting device, by comparing one portion of the plurality of second pattern images which belongs to the information data extraction area with another portion of the plurality of second pattern images which belongs to another area other than the information data extraction area.

By virtue of such construction, it is possible to preferably detect whether or not there is an error in the extracted second information data, on the basis of another portion of the plurality of second patter images.

In an aspect of the error detecting apparatus in which one portion of the plurality of first pattern images and the plurality of second pattern images is compared with another portion of the plurality of first pattern images and the plurality of second pattern images, as described above, the error detecting device may detect whether or not there is an error in at least one of the first information data and the second information data extracted by the extracting device, by judging whether or not one portion of the plurality of first pattern images and the plurality of second pattern images which belongs to the information data extraction area matches another portion of the plurality of first pattern images and the plurality of second pattern images which belongs to another area other than the information data extraction area, if the one portion of the plurality of first pattern images and the plurality of second pattern images which belongs to the information data extraction area and the another portion of the plurality of first pattern images and the plurality of second pattern images which belongs to another area other than the information data extraction area are included in the same information pattern.

If one portion of the plurality of first pattern images which belongs to the data extraction area and another portion of the plurality of first pattern images which belongs to another area other than the data extraction area are included in the same information pattern, the first information data indicated by them is the same. In other words, one portion of the plurality of first pattern images and another portion of the plurality of first pattern images indicate different portions or the same portion in the same first pattern image. In the same manner, if one portion of the plurality of second pattern images which belongs to the data extraction area and another portion of the plurality of second pattern images which belongs to another area other than the data extraction area are included in the same information pattern, the second information data indicated by them is the same. In other words, one portion of the plurality of second pattern images and another portion of the plurality of second pattern images indicate different portions or the same portion in the same second pattern image.

Therefore, by virtue of such construction, it is possible to preferably detect whether or not there is an error in the extracted first information data and/or second information data, by judging whether or not one portion of the plurality of first pattern images which belongs to the data extraction area matches another portion of the plurality of first pattern images which belong to another area other than the data extraction area.

For example, if one portion of the plurality of first pattern images which belongs to the data extraction area does not match another portion of the plurality of first pattern images which belongs to another area other than the data extraction area (or if one portion of the plurality of second pattern images which belongs to the data extraction area does not match another portion of the plurality of second pattern images which belongs to another area other than the data extraction area), it is conceivable that there is an error (or there is highly likely an error) in the extracted first information data (or second information data). On the other hand, if one portion of the plurality of first pattern images which belongs to the data extraction area matches another portion of the plurality of first pattern images which belongs to another area other than the data extraction area (or if one portion of the plurality of second pattern images which belongs to the data extraction area matches another portion of the plurality of second pattern images which belongs to another area other than the data extraction area), it is conceivable that there is highly likely no error (or there is no error) in the extracted first information data (or second information data.

In an aspect of the error detecting apparatus in which one portion of the plurality of first pattern images and the plurality of second pattern images is compared with another portion of the plurality of first pattern images and the plurality of second pattern images, as described above, the error detecting device may detect whether or not there is an error in at least one of the first information data and the second information data extracted by the extracting device, by judging whether or not one portion of the plurality of first pattern images and the plurality of second pattern images which belongs to the information data extraction area and another portion of the plurality of first pattern images and the plurality of second pattern images which belongs to another area other than the information data extraction area have a predetermined correlation, if the one portion of the plurality of first pattern images and the plurality of second pattern images which belongs to the information data extraction area and the another portion of the plurality of first pattern images and the plurality of second pattern images which belongs to another area other than the information data extraction area are included in different information patterns.

By virtue of such construction, it is possible to detect whether or not there is an error in the first information data and/or the second information data, by using the predetermined correlation to be satisfied by the adjacent or close information blocks even if the one portion and the another portion are not included in the same information block.

In an aspect of the error detecting apparatus in which it is judged whether or not one portion of the plurality of first pattern images and the plurality of second pattern images and another portion of the plurality of first pattern images and the plurality of second pattern images have the predetermined correlation, as described above, each of the first information data and the second information data may indicate a coordinate position of the information block, and the predetermined correlation may be a relation which indicates adjacent coordinate values.

By virtue of such construction, by using the correlation that the coordinate positions indicated by the adjacent information blocks should be different by a unit coordinate value (typically, by 1), it is possible to detect whether or not there is an error in the first information data and/or the second information data.

In an aspect of the error detecting apparatus in which it is judged whether or not one portion of the plurality of first pattern images and the plurality of second pattern images and another portion of the plurality of first pattern images and the plurality of second pattern images have the predetermined correlation, as described above, the predetermined correlation may be a relation shown by an information pattern layout table which indicates layout of the information pattern.

By virtue of such construction, by using the correlation to be satisfied by the adjacent or close information blocks and described on the information pattern layout table, it is possible to detect whether or not there is an error in the first information data and the second information data.

In another aspect of the embodiment of the error detecting apparatus of the present invention, the information block is provided with pixels arranged in M rows and N columns, the information block includes the first pattern images in a first quadrant area and a third quadrant area in the information block, and the information block includes the second pattern images in a second quadrant area and a fourth quadrant area in the information block.

According to this aspect, the first pattern images and the second pattern images are arranged in a checkered pattern in the information block, and as described in detail using the drawings later, it is possible to perform the coordinate detection and the error detection, preferably and relatively easily.

(Embodiment of Error Detecting Method)

An embodiment of the error detecting method of the present invention is an error detecting method of detecting an error in reading a two-dimensional code pattern, the two-dimensional code pattern provided with a plurality of information blocks each of which includes an information pattern and a boundary pattern, the information pattern including a plurality of first pattern images each of which corresponds to first information data and a plurality of second pattern images each of which corresponds to second information data, the boundary pattern indicating a boundary position, the error detecting method provided with: a reading process of obtaining an image read signal by reading the two-dimensional code pattern in each reading range corresponding to a size which is equal to or more than a size of the information block; a reference point detecting process of detecting an intersection in the boundary pattern, as a block reference point, from the image read signal; an extracting process of extracting each of the first information data and the second information data, on the basis of one portion of the plurality of first pattern images and the plurality of second pattern images which belongs to an information data extraction area, the information data extraction area being determined in accordance with a position in the reading range at which the block reference point exists, the information data extraction area being referred to in order to extract each of the first information data and the second information data; and an error detecting process of detecting whether or not there is an error in at least one of the first information data and the second information data extracted by the extracting process, on the basis of another portion of the plurality of first pattern images and the plurality of second pattern images which belongs to another area other than the information data extraction area.

According to the embodiment of the error detecting method of the present invention, it is possible to receive the same various benefits as those of the embodiment of the error detecting apparatus of the present invention described above.

Incidentally, in response to the various aspects in the embodiment of the error detecting apparatus of the present invention described above, the embodiment of the error detecting method of the present invention can also adopt various aspects.

(Embodiment of Computer Program)

An embodiment of the computer program of the present invention is a computer program for controlling a computer provided for an error detecting apparatus for detecting an error in reading a two-dimensional code pattern, the two-dimensional code pattern provided with a plurality of information blocks each of which includes an information pattern and a boundary pattern, the information pattern including a plurality of first pattern images each of which corresponds to first information data and a plurality of second pattern images each of which corresponds to second information data, the boundary pattern indicating a boundary position, the error detecting apparatus provided with: a reading device for obtaining an image read signal by reading the two-dimensional code pattern in each reading range corresponding to a size which is equal to or more than a size of the information block; a reference point detecting device for detecting an intersection in the boundary pattern, as a block reference point, from the image read signal; an extracting device for extracting each of the first information data and the second information data, on the basis of one portion of the plurality of first pattern images and the plurality of second pattern images which belongs to an information data extraction area, the information data extraction area being determined in accordance with a position in the reading range at which the block reference point exists, the information data extraction area being referred to in order to extract each of the first information data and the second information data; and an error detecting device for detecting whether or not there is an error in at least one of the first information data and the second information data extracted by the extracting device, on the basis of another portion of the plurality of first pattern images and the plurality of second pattern images which belongs to another area other than the information data extraction area (in other words, the aforementioned embodiment of the error detecting apparatus of the present invention (including its various aspects)), the computer program making the computer function as at least one portion of the reading device, the reference point detecting device, the extracting device, and the error detecting device.

According to the embodiment of the computer program of the present invention, the aforementioned embodiment of the error detecting apparatus of the present invention can be embodied relatively readily, by loading the computer program from a recording medium for storing the computer program, such as a ROM, a CD-ROM, a DVD-ROM, a hard disk or the like, into the computer, or by downloading the computer program, which may be a carrier wave, into the computer via a communication device.

Incidentally, in response to the various aspects of in the embodiment of the error detecting apparatus of the present invention described above, the embodiment of the computer program of the present invention can adopt various aspects.

(Embodiment of Computer Program Product)

The above object of the present invention can be also achieved by an embodiment of a computer program product in a computer-readable medium for tangibly embodying a program of instructions which is executed by an error detecting apparatus for detecting an error in reading a two-dimensional code pattern, the two-dimensional code pattern provided with a plurality of information blocks each of which includes an information pattern and a boundary pattern, the information pattern including a plurality of first pattern images each of which corresponds to first information data and a plurality of second pattern images each of which corresponds to second information data, the boundary pattern indicating a boundary position, the error detecting apparatus provided with: a reading device for obtaining an image read signal by reading the two-dimensional code pattern in each reading range corresponding to a size which is equal to or more than a size of the information block; a reference point detecting device for detecting an intersection in the boundary pattern, as a block reference point from the image read signal; an extracting device for extracting each of the first information data and the second information data, on the basis of one portion of the plurality of first pattern images and the plurality of second pattern images which belongs to an information data extraction area, the information data extraction area being determined in accordance with a position in the reading range at which the block reference point exists, the information data extraction area being referred to in order to extract each of the first information data and the second information data; and an error detecting device for detecting whether or not there is an error in at least one of the first information data and the second information data extracted by the extracting device, on the basis of another portion of the plurality of first pattern images and the plurality of second pattern images which belongs to another area other than the information data extraction area (in other words, the aforementioned embodiment of the error detecting apparatus of the present invention (including its various aspects)), the computer program product making the computer function as at least one portion of the reading device, the reference point detecting device, the extracting device, and the error detecting device.

According to the embodiment of the computer program product of the present invention, the aforementioned embodiment of the error detecting apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned embodiment of the error detecting apparatus of the present invention.

Incidentally, in response to the various aspects in the aforementioned embodiment of the error detecting apparatus of the present invention, the embodiment of the computer program product of the present invention can also employ various aspects.

These operation and other advantages of the present invention will become more apparent from the example explained below.

As explained above, according to the embodiment of the error detecting apparatus of the present invention, it is provided with the reading device, the reference point detecting device, the extracting device, and the error detecting device. According to the embodiment of the error detecting method of the present invention, it is provided with the reading process, the reference point detecting process, the extracting process, and the error detecting process. Therefore, it is possible to preferably detect whether or not there is an error at the coordinate position detected by reading the coordinate pattern included in the two-dimensional code.

EXAMPLE

Hereinafter, an example of the present invention will be described with reference to the drawings. Incidentally, in the example below, an explanation will be given on an electronic display system to which the example of the error detecting apparatus of the present invention is applied.

(1) Basic Structure

Firstly, with reference to FIG. 1, an explanation will be given on an electronic display system 1000 to which the example of the error detecting apparatus of the present invention is applied. FIG. 1 is a block diagram conceptually showing the basic structure of the electronic display system 1000 in the example.

As shown in FIG. 1, the electronic display system 1000 is provided with: a display surface image data memory 1, an image superimposition device 2, a SF pixel drive data generation device 3, a drive control device 4, an address driver 5, a coordinate data memory 6, a two-dimensional (2D) code conversion device 7, a row electrode driver 8, an electronic pen 9, a reception device 10, an image data generation device 11, and a plasma display panel 100.

The electronic display system 1000 in the example can display a movement trajectory when a user brings the tip of the electronic pen 9 to contact with the display surface of the plasma display panel 100, on the display surface without change.

The plasma display panel 100 (hereinafter referred to as a "PDP 100" as occasion demands) is provided with a front substrate and a rear substrate not illustrated, wherein a discharge space with a discharge gas enclosed is between the front and rear substrates. On the front substrate, a plurality of row electrodes are formed, extending in a horizontal direction (or lateral direction) of the display surface. On the rear substrate, a plurality of column electrodes are formed, extending in a perpendicular direction (or longitudinal direction) of the display surface. At respective intersections between the row electrodes and the column electrodes, three types of image cells are formed: a pixel cell $P_R$, which emits red light; a pixel cell $P_G$, which emits green light; and a pixel cell $P_B$, which emits blue light.

The display surface image data memory 1 stores therein display surface image data which indicates an image to be displayed on the entire screen of the PDP 100. The stored display surface image data is sequentially read and outputted to the image superimposition device 2 as display surface image data $D_{BB}$.

The image superimposition device 2 generates pixel data PD which shows, in each pixel cell P, an image obtained by superimposing a display surface image indicated by the display surface image data $D_{BB}$, an external input image indicated by external input image data $D_{IN}$, and an electronic pen trajectory image indicated by electronic pen trajectory image data $D_{TR}$, described later. The generated pixel data PD is outputted to each of the SF pixel drive data generation device 3 and the drive control device 4.

The SF pixel drive data generation device 3 generates pixel drive data GD1 to GD8 which are to set the status of each pixel cell P in respective one of subfields SF1 to SF8 described later to either a lighting mode or an extinction mode, in each pixel data PD generated in respective one of the pixel cells P, in accordance with a brightness level indicated by the pixel data PD. The generated pixel drive data GD1 to GD8 are outputted to the address driver 5.

The coordinate data memory 6 stores therein coordinate data which indicates a coordinate position (X, Y) at which a pixel block is located in the display surface of the PDP 100, in each pixel block which consists of a plurality of adjacent pixel cells P. The stored coordinate data is outputted to the 2D code conversion device 7.

Now, with reference to FIG. 2, an explanation will be given on the coordinate position (X, Y) at which the pixel block is located in the display surface of the PDP 100. FIG. 2 is a plan view conceptually showing the coordinate position (X, Y) at which the pixel block is located in the display surface of the PDP 100.

As shown in FIG. 2, for example, the coordinate data memory 6 stores therein the coordinate data which indicates the coordinate position (i.e. a position in an X direction and a position in a Y direction) at which the pixel block PB is located in the display surface of the PDP 100, in association with each pixel block PB which consists of pixel cells P of eight rows×eight columns (i.e. 64 pixel cells P). For example, the coordinate data memory 6 stores therein the coordinate data which defines the coordinate position of a pixel block located on the upper left of FIG. 2 as (1, 1), which defines the coordinate position of a pixel block located on the lower left of FIG. 2 as (2, 1), which defines the coordinate position of a pixel block located on the upper right of FIG. 2 as (1, 2), and which defines the coordinate position of a pixel block located on the lower right of FIG. 2 as (2, 2).

Back in FIG. 1 again, the 2D code conversion device 7 converts the coordinate data outputted from the coordinate data memory 6, into a 2D code.

Now, with reference to FIG. 3, the 2D code obtained by converting the coordinate data will be described. FIG. 3 are plan views conceptually showing the 2D code obtained by converting the coordinate data.

As shown in FIG. 3(*a*), the coordinate data which indicates the coordinate position of one pixel block PB is converted into the 2D code, which is provided with a coordinate reading unit block, which consists of the pixel cells P of eight rows×eight columns. The coordinate reading unit block is a base unit (one unit) when the coordinate position is shown on the display surface of the PDP 100. The coordinate reading unit includes a boundary pattern shown in FIG. 3(*b*), a rotation detection pattern shown in FIG. 3(*c*), an X-coordinate pattern shown in FIG. 3(*d*), and a Y-coordinate pattern shown in FIG. 3(*e*).

As shown in FIG. 3(*b*), in the boundary pattern, a pixel group of one row on the lowest edge (i.e. eight pixel cells P on the lowest edge) of the coordinate reading unit block, which is a block of pixels of eight rows×eight columns, and a pixel group of one column on the right edge (i.e. eight pixel cells P on the right edge) are both in a lighting mode. At this time, the pixel cell P denoted by a triangular mark, located at the intersection between the pixel group of one row on the lowest edge and the pixel group of one column on the right edge, is a block reference point.

As shown in FIG. 3(*c*), in the rotation detection pattern, a pixel group of one row (i.e. seven pixel cells P due to the exclusion of the pixel cell P included in the boundary pattern) and a pixel group of one column (i.e. seven pixel cells P due to the exclusion of the pixel cell P included in the boundary pattern), with the pixel groups being arranged in a cross shape, are both in a predetermined lighting mode or extinction mode.

As shown in FIG. 3(*d*), in the X-coordinate pattern, each pixel cell P in a pixel group of three rows×three columns is in a status according to each of bits X1 to X9 (i.e. in the lighting mode or extinction mode), which is 9-bit information for showing the X-coordinate indicated by the coordinate data.

As shown in FIG. 3(*e*), in the Y-coordinate pattern, each pixel cell P in a pixel group of three rows×three columns is in a status according to each of bits Y1 to Y8 (i.e. in the lighting mode or extinction mode), which is 8-bit information for indicating the Y-coordinate shown by the coordinate data.

Therefore, as shown in FIG. 3(*a*), the coordinate reading unit block is formed by combining the boundary pattern shown in FIG. 3(*b*) and the rotation detection pattern shown in FIG. 3(*c*), by disposing the X-coordinate pattern which indicates the same X-coordinate in each of a first quadrant area and a third quadrant area which are formed by the rotation detection pattern, and by disposing the Y-coordinate pattern which indicates the same Y-coordinate in each of a second quadrant area and a fourth quadrant area which are formed by the rotation detection pattern.

Incidentally, any one of the X-coordinate and the Y-coordinate constitutes one specific example of the "first information data" of the present invention, and the other of the X-coordinate and the Y-coordinate constitutes one specific example of the "second information data" of the present invention. In other words, any one of the X-coordinate pattern and the Y-coordinate pattern constitutes one specific example of the "first pattern image" of the present invention, and the other of the X-coordinate pattern and the Y-coordinate pattern constitutes one specific example of the "second pattern image" of the present invention.

Back in FIG. 1 again, the 2D code conversion device 7 generates pixel drive data GD0, which indicates, for example, a high level (logical level 1) for the pixel cell P in the lighting mode and a low level (logical level 0) for the pixel cell P in the extinction mode, in association with the 64 pixel cells P in the coordinate reading unit block. The generated pixel drive data GD0 is outputted to the address driver 5.

The drive control device 4 performs a 2D code display driving process according to the pixel drive data GD0 and a main image display driving process according to the pixel drive data GD1 to GD8, in a display period of one frame (or one field), on the basis of a light emission drive sequence based on a subfield method.

Now, with reference to FIG. 4, an explanation will be given on a light emission driving sequence based on a subfield method. FIG. 4 is a timing chart conceptually showing the light emission driving sequence based on the subfield method.

As shown in FIG. 4, in the main image display driving process, the drive control device 4 sequentially performs an address process W and a sustaining process I in each of the eight subfields SF1 to SF8. The drive control device 4 performs a reset process R before the address process W, only in the subfield SF1. Moreover, in the 2D code display driving process, the drive control device 4 sequentially performs the reset process R, the address process W, and the sustaining process I in a subfield SF0. Incidentally, the main image display driving process is provided before a blanking period BT having a predetermined time length.

The drive control device 4 generates various control signals to drive the PDP 100 as described below, by performing each of the reset process R, the address process W, and the sustaining process I, and it outputs the control signals to each of the address driver 5 and the row electrode driver 8.

At this time, in accordance with the implementation of the reset process R, the row electrode driver 8 applies a reset pulse which is to initiate the status of all the pixel cells P of the PDP 100 into the extinction mode, to all the row electrodes of the PDP 100.

Then, in accordance with the implementation of the address process W, the address driver 5 generates a pixel data pulse having a voltage according to the pixel drive data GD corresponding to the subfield SF to which the address process W belongs. In other words, for example, the address driver 5 generates a pixel data pulse according to the pixel drive data GD1 in the address process in the subfield SF1 and generates a pixel data pulse according to the pixel drive data GD2 in the address process in the subfield SF2. At this time, for example, the address driver 5 generates a high-level pixel data pulse if it is supplied with the pixel drive data GD which indicates the setting of the pixel cell P into the lighting mode status. On the other hand, the address driver 5 generates a low-level pixel data pulse if it is supplied with the pixel drive data GD which indicates the setting of the pixel cell P into the extinction mode status.

During this time, the row electrode driver 8 sequentially applies a scanning pulse to each row electrode of the PDP 100, in synchronization with application timing of a pixel data pulse group in each one display line. By the application of the scanning pulse, each pixel cell P in one display line which belongs to the row electrode to which the scanning pulse is applied, is set to the status according to the pixel data pulse (in the lighting mode or extinction mode).

Then, in accordance with the implementation of the sustaining process I, the row electrode driver 8 applies a sustaining pulse which is to cause only the pixel cell P in the lighting mode status to discharge and emit light, to all the row electrodes of the PDP 100, over a light-emission period assigned to the subfield SF to which the sustaining process I belongs. Incidentally, in the example shown in FIG. 4, the shortest light-emission period and the smallest number of sustaining pulses are assigned to the subfield SF0.

Next, with reference to FIG. 5 and FIG. 6, an explanation will be given on display examples on the display surface of the PDP by the implementation of the main image display driving process and the 2D code display driving process. FIG. 5 are plan views showing a display example on the display surface of the PDP by the implementation of the main image display driving process. FIG. 6 is a plan view showing a display example on the display surface of the PDP by the implementation of the 2D code display driving process.

According to the implementation of the main image display driving process (the subfields SF1 to SF8), each pixel cell P emits light with brightness according to a brightness level indicated by the pixel data PD. Therefore, for example, according to the pixel data PD generated on the basis of the display image data $D_{BB}$ which indicates white-color image data (e.g. image data indicating a white board), as shown in FIG. 5(*a*), an image which indicates a white board (i.e. a white image) is displayed on the display surface of the PDP 100.

On the other hand, according to the implementation of the main image display driving process (the subfields SF1 to SF8), as detailed later, it is possible to display the movement trajectory when a user brings the tip of the electronic pen 9 to contact with the display surface of the PDP 100, on the display surface without change. In other words, as shown in FIG. 5(*b*), an image which indicates the movement trajectory of the electronic pen 9 is displayed on the display surface of the PDP 100.

On the one hand, according to the implementation of the 2D code display driving process (the subfield SF0), each of the pixel cell P emits light which in the subfield SF0 in the sustaining process I in accordance with the pixel drive data GD0 based on the coordinate data. In other words, the 2D code which indicates the coordinate position of each pixel block PB shown in FIG. 2 is formed on the coordinate position of each block PB, as shown in FIG. 6.

Incidentally, the light-emission period assigned to the sustaining process I in the subfield SF0 is set to be short enough not to visually recognize a lighting pattern and an extinction pattern based on the 2D code. Moreover, there is a blanking period BT shown in FIG. 5 immediately before the subfield SF0. This eliminates an influence of afterglow in the subfield SF8 when the light which is emitted with the electronic pen 9.

Back in FIG. 1 again, the electronic pen 9 extracts the lighting pattern and the extinction pattern based on the 2D code, from an image signal obtained by imaging the display surface of the PDP 100 by a pixel block PB unit, and it wirelessly transmits a coordinate signal which indicates the coordinate position corresponding to the lighting pattern and the extinction pattern.

Now, with reference to FIG. 7, the basic structure of the electronic pen 9 will be described. FIG. 7 is a block diagram conceptually showing the basic structure of the electromagnetic pen 9.

As shown in FIG. 7, the electronic pen 9 is provided with an objective lens 90, an image sensor 91, a noise sensor 92, a frame synchronization detection device 93, an image processing device 94, a pen pressure sensor 95, a coordinate data extraction device 96, an error detection device 97, and a wireless transmission device 98.

The objective lens 90 focuses display light applied from the display surface of the PDP 100, on a light receiving surface of the image sensor 91.

The noise sensor 92 generates a pulse-shaped noise detection signal NZ (refer to FIG. 4) which is at a high level when detecting noise (e.g. infrared rays, ultraviolet rays, or electromagnetic waves) emitted from the display surface of the PDP 100 along with the discharge occurring in each pixel cell P in the PDP 100. The generated noise detection signal NZ is outputted to the frame synchronization detection device 93. Here, in the display period of one frame (or one field), various discharges occur in a period of implementing the subfields SF0 to SF8, so that as shown in FIG. 4, the pulse-shaped noise detection signal NZ is generated which is at a high level every time the discharge occurs. However, the discharge does not occur in the blanking period BT after the subfield SF8 is ended, so that as shown in FIG. 4, the noise detection signal NZ is at a low level.

The frame synchronization detection device 93 generates an image retrieval signal CV (refer to FIG. 4) which is at a high level in the period of performing the sustaining process I in the subfield SF0 and which is at a low level in the other periods, in accordance with the noise detection signal NZ. The generated image retrieval signal CV is outputted to the image sensor 91.

The image sensor 91 constitutes one specific example of the "reading device" of the present invention, and it has the light receiving surface which receives, in each imaging range RM shown by a dashed line in FIG. 6, the display light focused by the objective lens 90. Incidentally, the imaging range RM is a range which allows the reading of only the light applied from one pixel block PB which consists of the pixel cells P of eight rows×eight columns, as shown in FIG. 6. The image sensor 91 obtains the display light received on the light receiving surface, only while the image retrieval signal CV at a high level is outputted from the frame synchronization detection device 93. The image signal corresponding to the obtained display light is outputted to the image processing device 94, as an image signal SG. In other words, the image sensor 91 outputs the image signal SG corresponding to the lighting pattern and the extinction pattern (i.e. the 2D code pattern which indicates the coordinate position of the pixel block PB) displayed by performing the 2D code display driving process (the subfield SF0), to the image processing device 94.

The pen pressure sensor 95 is disposed at the tip of the electronic pen 9 and generates a drawing signal which indicates that it is drawing on the display surface, while the tip of the electronic pen 9 is pressed on the display surface of the PDP 100. The generated drawing signal is outputted to the image processing device 94.

The image processing device 94 obtains the image signal SG outputted from the image sensor 91, only while the drawing signal is outputted from the pen pressure sensor 95. Then, the image processing device 94 samples only a signal level obtained at a position of light-emission center-of-gravity of each pixel cell P, from the obtained image signal SG. A data series formed of the sampled sample values is outputted to the coordinate data extraction device 96, as a 2D code data CDD. At this time, the image processing device 94 detects the position of light-emission center-of-gravity, on the basis of the boundary pattern indicated by the image signal SG. The sampling operation as described above allows the image processing device 94 to generate a data series formed of 64 samples corresponding to respective 64 pixel positions of eight rows×eight columns in the imaging range RM, as the 2D code data, and to output it to the coordinate data extraction device 96.

Moreover, the image processing device 94 judges that external light is strong if a brightness level indicated by the image signal SG is biased toward higher brightness than predetermined brightness, and it outputs an offset signal which is to limit or control the bias, to the image sensor 91. At this time, the image sensor 91 performs contrast adjustment according to the offset signal outputted from the image processing device 94, on the image signal SG.

The coordinate data extraction device 96 constitutes one specific example of the "reference point detecting device" and the "extracting device" of the present invention, and it extracts coordinate position information on the display screen based on the 2D code data CDD in each predetermined period. The extracted coordinate position information is outputted to the error detection device 97 as coordinate data ZD.

The error extraction device 97 constitutes one specific example of the "error detecting device" of the present invention, and it detects whether or not there is an error in the coordinate data ZD outputted from the coordinate data extraction device 96. If there is no error, the coordinate data ZD is outputted to the wireless transmission device 98. On the other hand, if there is an error, a predetermined process (e.g. an error correction process or the like) is performed on the coordinate data ZD as needed, and then the coordinate data ZD is outputted to the wireless transmission device 98.

The wireless transmission device 98 transmits the coordinate data ZD to the reception device 10.

Back in FIG. 1 again, the reception device 10 receives the coordinate data ZD transmitted from the electronic pen 9. The received coordinate data ZD is outputted to the image data generation device 11.

The image data generation device 11 generates image data which indicates a straight line or curve to be sequentially traced on the coordinate position indicated by the coordinate data ZD sequentially outputted from the reception device 10. The generated image data is outputted to the image superimposition device 2 as a display image data signal $D_{TR}$.

(2) Operation Principle

Next, with reference to FIG. 8 to FIG. 10, the operation principle of the electronic display system 1000 in the example will be described. FIG. 8 is a flowchart conceptually showing a flow of the operations of the electronic display system 1000 in the example. FIG. 9 is a plan view conceptually showing 64 pixel positions of eight rows×eight columns in the imaging range RM of the image sensor 91. FIG. 10 is a plan view conceptually showing that the 64 pixels of eight rows×eight columns in the imaging range RM of the image sensor 91 are divided into four areas.

As shown in FIG. 8, firstly, it is judged whether or not an image based on the 2D code data CDD obtained in each imaging range RM shown in FIG. 9 is obtained (step S11).

As a result of the judgment in the step S11, if it is judged that the image based on the 2D code data CDD is not obtained (the step S11: No), the operation in the step S11 is repeated again.

On the other hand, if it is judged that the image based on the 2D code data CDD is obtained (the step S11: Yes), for example, a distortion correction process to correct a trapezium distortion caused by the inclined-use of the electronic pen 9 is performed on the obtained image based on the 2D code data CDD (step S12).

Then, it is judged whether or not all or part of the boundary pattern is included in the distortion-corrected image (step S13).

As a result of the judgment in the step S13, if it is judged that all or part of the boundary pattern is not included in the distortion-corrected image (the step S13: No), a failure process is performed whose explanation is omitted (step S21).

On the other hand, as a result of the judgment in the step S13, if it is judged that all or part of the boundary pattern is included in the distortion-corrected image (the step S13: Yes), a rotation process to rotate the distortion-corrected image is performed on the basis of the boundary pattern such that an image rotation angle is any of 0, 90, 180, and 270 degrees (step S14).

Then, it is judged whether or not the rotation detection pattern is included in the rotated image (step S15).

As a result of the judgment in the step S15, if it is judged that the rotation detection pattern is not included in the rotated image (the step S15: No), the failure process is performed whose explanation is omitted (the step S21).

On the other hand, as a result of the judgment in the step S15, if it is judged that the rotation detection pattern is included in the rotated image (the step S15: Yes), a rotation correction process is performed on the rotated image such that the image rotation angle is correct (e.g. 0 degrees) on the basis of the rotation detection pattern (step S16).

Then, the pixel position at which the block reference position denoted by a triangular mark in FIG. 3(b) is located is detected as a reference position (P, Q) from the pixel position at which the boundary pattern appears (step S17). Incidentally, "P" in the reference position (P, Q) indicates a position in the column direction in the imaging range RM shown in FIG. 9, and "Q" indicates a position in the row direction in the imaging range RM shown in FIG. 9.

Then, it is judged whether or not the reference position (P, Q) is included in an area A in the imaging range RM shown in FIG. 10 (i.e. an area in the first row to the fourth row and in the first column to the fourth column in the imaging range RM, and a first quadrant area in the imaging range RM) (step S18).

As a result of the judgment in the step S18, if it is judged that the reference position (P, Q) is included in the area A in the imaging range RM (the step S18: Yes), a coordinate data extracting process A shown in FIG. 11 described later is performed (step S31), and then, an error detecting process A shown, in FIG. 12 described later is performed (step S32).

On the other hand, as a result of the judgment in the step S18, if it is judged that the reference position (P, Q) is not included in the area A in the imaging range RM (the step S18: No), then, it is judged whether or not the reference position (P, Q) is included in an area B in the imaging range RM shown in FIG. 10 (i.e. an area in the first row to the fourth row and in the fifth column to the eighth column in the imaging range RM, and a second quadrant area in the imaging range RM) (step S19).

As a result of the judgment in the step S19, if it is judged that the reference position (P, Q) is included in the area B in the imaging range RM (the step S19: Yes), a coordinate data extracting process B shown in FIG. 17 described later is performed (step S41), and then an error detecting process B shown in FIG. 18 described later is performed (step S42).

On the other hand, as a result of the judgment in the step S19, if it is judged that the reference position (P, Q) is not included in the area B in the imaging range RM (the step S19: No), then, it is judged whether or not the reference position (P, Q) is included in an area C in the imaging range RM shown in FIG. 10 (i.e. an area in the fifth row to the eighth row and in the fifth column to the eighth column in the imaging range RM, and a third quadrant area in the imaging range RM) (step S20).

As a result of the judgment in the step S20, if it is judged that the reference position (P, Q) is included in the area C in the imaging range RM (the step S20: Yes), a coordinate data extracting process C shown in FIG. 23 described later is performed (step S51), and then an error detecting process C shown in FIG. 24 described later is performed (step S52).

On the other hand, as a result of the judgment in the step S20, if it is judged that the reference position (P, Q) is not included in the area C in the imaging range RM (the step S20: No), it is estimated that the reference position (P, Q) is included in an area D in the imaging range RM shown in FIG. 10 (i.e. an area in the fifth row to the eighth row and in the first column to the fifth column in the imaging range RM, and a fourth quadrant area in the imaging range RM). Therefore, a coordinate data extracting process D shown in FIG. 29 described later is performed (step S61), and then an error detecting process D shown in FIG. 30 described later is performed (step S62).

Incidentally, of the operations explained in FIG. 8, the operations in the steps S11 to S21 and in the steps S31, S41, S51, and S61 are performed mainly by the coordinated data extraction device 96. On the other hand, the operations in the steps S32, S42, S52, and S62 are performed mainly by the error detection device 97.

(2-1) Case in which Reference Position (P, Q) is Included in Area A in Imaging Range RM Next, with reference to FIG. 11 and FIG. 12, an explanation will be given on the coordinate data extracting process A and the error detecting process A in the case where the reference position (P, Q) is included in the area A in the imaging range RM. FIG. 11 is a flowchart conceptually showing a flow of the operations of the coordinate data extracting process A in the case where the reference position (P, Q) is included in the area A in the imaging range RM. FIG. 12 is a flowchart conceptually showing a flow of the operations of the error detecting process A in the case where the reference position (P, Q) is included in the area A in the imaging range RM.

Firstly, the coordinate data extracting process A will be described. As shown in FIG. 11, firstly, it is judged whether or not "Q" denoted by the reference position (P, Q) indicates the first row (step S3101).

As a result of the judgment in the step S3101, if it is judged that "Q" denoted by the reference position (P, Q) indicates the first row (the step S3101: Yes), nine samples corresponding to the respective pixel positions in a range of [the (P+1)-th column to the (P+3)-th column, the sixth row to the eighth row] in the imaging range RM are extracted from the rotation-corrected image (step S3102). The extracted nine samples are stored into an X-coordinate register not illustrated, as bits X1 to X9 which indicate the coordinate position in the X direction (step S3102).

On the other hand, as a result of the judgment in the step S3101, if it is judged that "Q" denoted by the reference position (P, Q) does not indicate the first row (the step S3101: No), then, it is judged whether or not "Q" denoted by the reference position (P, Q) indicates the second row (step S3103).

As a result of the judgment in the step S3103, if it is judged that "Q" denoted by the reference position (P, Q) indicates the second row (the step S3103: Yes), nine samples corresponding to the respective pixel positions in a range of [the (P+1)-th column to the (P+3)-th column, the first row] and [the (P+1)-th column to the (P+3)-th column, the seventh row to the eighth row] in the imaging range RM are extracted from the rotation-corrected image (step S3104). The extracted nine samples are stored in the X-coordinate register not illustrated, as bits X1 to X9 which indicate the coordinate position in the X direction (step S3104).

On the other hand, as a result of the judgment in the step S3103, if it is judged that "Q" denoted by the reference position (P, Q) does not indicate the second row (the step S3103: No), then, it is judged whether or not "Q" denoted by the reference position (P, Q) indicates the third row (step S3105).

As a result of the judgment in the step S3105, if it is judged that "Q" denoted by the reference position (P, Q) indicates the third row (the step S3105: Yes), nine samples corresponding to the respective pixel positions in a range of [the (P+1)-th column to the (P+3)-th column, the first row to the second row] and [the (P+1)-th column to the (P+3)-th column, the eighth row] in the imaging range RM are extracted from the rotation-corrected image (step S3106). The extracted nine samples are stored into the X-coordinate register not illustrated, as bits X1 to X9 which indicate the coordinate position in the X direction (step S3106).

On the other hand, as a result of the judgment in the step S3105, if it is judged that "Q" denoted by the reference position (P, Q) does not indicate the third row (the step S3105: No), it is estimated that "Q" denoted by the reference position (P, Q) indicates the fourth row. In this case, nine samples corresponding to the respective pixel positions in a range of [the (P+1)-th column to the (P+3)-th column, the first row to the third row] in the imaging range RM are extracted from the rotation-corrected image (step S3107). The extracted nine samples are stored into the X-coordinate register not illustrated, as bits X1 to X9 which indicate the coordinate position in the X direction (step S3107).

In this manner, the X coordinate of the imaged pixel block PB is extracted in the case where the reference position (P, Q) is included in the area A in the imaging range RM.

After the aforementioned step S3102, S3104, S3106, or S3107 is ended, eight samples corresponding to the respective pixel positions in a range of [the (P+1)-th column to the (P+3)-th column, the (Q+1)-th row to the (Q+3)-th row] in the imaging range RM are extracted from the rotation-corrected image (step S3108). The extracted eight samples are stored into a Y-coordinate register not illustrated, as bits Y1 to Y8 which indicate the coordinate position in the Y direction (step S3108). In this manner, the Y-coordinate of the imaged pixel block PB is extracted in the case where the reference position (P, Q) is included in the area A in the imaging area RM.

Then, the coordinate data ZD is outputted to the error detection device 97, wherein the coordinate data ZD indicates the bits X1 to X9 stored in the X-coordinate register as a coordinate position $X_{ZD}$ in the X direction (or horizontal direction) on the display surface of the PDP 100, and it indicates the bits Y1 to Y8 stored in the Y-coordinate register as a coordinate position $Y_{ZD}$ in the Y direction (or vertical direction) on the display surface of the PDP 100 (step S3109).

Next, the error detecting process A will be described. As shown in FIG. 12, firstly, it is judged whether or not "P" denoted by the reference position (P, Q) indicates the first column (step S3201).

As a result of the judgment in the step S3201, if it is judged that "P" denoted by the reference position (P, Q) indicates the first column (the step S3201: Yes), it is checked whether or not the coordinate position indicated by nine samples corresponding to the respective pixel positions in a range of [the sixth column to the eighth column, the (Q+1)-th row to the (Q+3)-th row] in the imaging range RM matches the coordinate position $X_{ZD}$ in the X direction extracted in the coordinate extracting process A (step S3202). In other words, it is judged whether or not the coordinate position indicated by the nine samples corresponding to the respective pixel positions in a range of [the sixth column to the eighth column, the (Q+1)-th row to the (Q+3)-th row] in the imaging range RM does not conflict with the coordinate position $X_{ZD}$ in the X direction extracted in the coordinate extracting process A.

From the checking, if the coordinate position indicated by the nine samples corresponding to the respective pixel positions in a range of [the sixth column to the eighth column, the (Q+1)-th row to the (Q+3)-th row] in the imaging range RM matches the coordinate position $X_{ZD}$ in the X direction extracted in the coordinate extracting process A, it can be estimated that there is no error in the coordinate position $X_{ZD}$ in the X direction extracted in the coordinate extracting process A. In other words, it can be estimated that the coordinate position $X_{ZD}$ in the X direction can be accurately extracted. On the other hand, if the coordinate position indicated by the nine samples corresponding to the respective pixel positions in a range of [the sixth column to the eighth column, the (Q+1)-th row to the (Q+3)-th row] in the imaging range RM does not match the coordinate position $X_{ZD}$ in the X direction extracted in the coordinate extracting process A, it can be estimated that there is an error (or there is highly possibly an error) in the coordinate position $X_{ZD}$ in the X direction extracted in the coordinate extracting process A. In other words, it can be estimated that the coordinate position $X_{ZD}$ in the X direction cannot be accurately extracted. In a check operation described later, it is also possible to judge whether or not there is an error in the same manner.

Then, error detection is performed on the coordinate position $Y_{ZD}$ in the Y direction shown in FIG. 13 described later (step S3210).

On the other hand, as a result of the judgment in the step S3201, if it is judged that "P" denoted by the reference position (P, Q) does not indicate the first column (the step S3201: No), then, it is judged whether or not "P" denoted by the reference position (P, Q) indicates the second column (step S3203).

As a result of the judgment in the step S3203, if it is judged that "P" denoted by the reference position (P, Q) indicates the second column (the step S3203: Yes), it is checked whether or not the coordinate position indicated by three samples corresponding to the respective pixel positions in a range of [the first column, the (Q+1)-th row to the (Q+3)-th row] in the imaging range RM matches the coordinate position one before the coordinate position $X_{ZD}$ (i.e. $X_{ZD}$–1) in the X direction extracted in the coordinate extracting process A (step S3204). Moreover, it is checked whether or not the coordinate position indicated by six samples corresponding to the respective pixel positions in a range of [the seventh column to the eighth column, the (Q+1)-th row to the (Q+3)-th row] in the imaging range RM matches the coordinate position $X_{ZD}$ in the X direction extracted in the coordinate extracting process A (step S3204).

Incidentally, from the three samples corresponding to the respective pixel positions in a range of [the first column, the (Q+1)-th row to the (Q+3)-th row] in the imaging range RM and the six samples corresponding to the respective pixel positions in a range of [the seventh column to the eighth column, the (Q+1)-th row to the (Q+3)-th row] in the imaging range RM, it is conceivable that the coordinate position in the X direction indicated by the nine samples cannot be known for certain. However, considering a rule for the nine samples indicating the coordinate position in the X direction, the coordinate position in the X direction can be also known from the three samples and the six samples. Moreover, from the three samples and the six samples, it is also possible to make a comparison with the nine samples for indicating the coordinate position in the X direction, at each corresponding pixel position (i.e. in each sample). Therefore, it is possible to preferably check whether or not the coordinate position indicated by the three samples matches the coordinate position one before the coordinate position $X_{ZD}$ (i.e. $X_{ZD}$–1) in the X direction extracted in the coordinate extracting process A and check whether or not the coordinate position indicated by the six samples matches the coordinate position $X_{ZD}$ in the X direction extracted in the coordinate extracting process A. Incidentally, obviously, the sample comparison may be also made at each corresponding pixel position, in the check operation of checking whether or not the coordinate position indicated by the nine samples matches the coordinate position $X_{ZD}$ in the X direction extracted in the coordinate extracting process A, as in the step S3202.

Then, the error detection is performed on the coordinate position $Y_{ZD}$ in the Y direction shown in FIG. 14 described later (step S3220).

On the other hand, as a result of the judgment in the step S3203, if it is judged that "P" denoted by the reference position (P, Q) does not indicate the second column (the step S3203: No), then, it is judged whether or not "P" denoted by the reference position (P, Q) indicates the third column (step S3205).

As a result of the judgment in the step S3205, if it is judged that "P" denoted by the reference position (P, Q) indicates the third column (the step S3205: Yes), it is checked whether or not the coordinate position indicated by six samples corresponding to the respective pixel positions in a range of [the first column to the second column, the (Q+1)-th row to the (Q+3)-th row] in the imaging range RM matches the coordinate position one before the coordinate position $X_{ZD}$ (i.e. $X_{ZD}$–1) in the X direction extracted in the coordinate extracting process A (step S3206). Moreover, it is checked whether or not the coordinate position indicated by three samples corresponding to the respective pixel positions in a range of [the eighth column, the (Q+1)-th row to the (Q+3)-th row] in the imaging range RM matches the coordinate position $X_{ZD}$ in the X direction extracted in the coordinate extracting process A (step S3206).

Then, the error detection is performed on the coordinate position $Y_{ZD}$ in the Y direction shown in FIG. 15 described later (step S3230).

On the other hand, as a result of the judgment in the step S3205, if it is judged that "P" denoted by the reference position (P, Q) does not indicate the third column (the step S3205: No), it is estimated that "P" denoted by the reference position (P, Q) indicates the fourth column. In this case, it is checked whether or not the coordinate position indicated by nine samples corresponding to the respective pixel positions in a range of [the first column to the third column, the (Q+1)-th row to the (Q+3)-th row] in the imaging range RM matches the coordinate position one before the coordinate position $X_{ZD}$ (i.e. $X_{ZD}-1$) in the X direction extracted in the coordinate extracting process A (step S3207).

Then, the error detection is performed on the coordinate position $Y_{ZD}$ in the Y direction shown in FIG. 16 described later (step S3240).

Next, with reference to FIG. 13, an explanation will be given on the error detection on the coordinate position $Y_{ZD}$ in the Y direction in the step S3210 in FIG. 12. FIG. 13 is a flowchart conceptually showing a flow of the error detecting operation for the coordinate position $Y_{ZD}$ in the Y direction in the step S3210 in FIG. 12.

As shown in FIG. 13, firstly, it is judged whether or not "Q" denoted by the reference position (P, Q) indicates the first row (step S3211).

As a result of the judgment in the step S3211, if it is judged that "Q" denoted by the reference position (P, Q) indicates the first row (the step S3211: Yes), it is checked whether or not the coordinate position indicated by nine samples corresponding to the respective pixel positions in a range of [the sixth column to the eighth column, the sixth row to the eighth row] in the imaging range RM matches the coordinate position $Y_{ZD}$ in the Y direction extracted in the coordinate extracting process A (step S3212).

On the other hand, as a result of the judgment in the step S3211, if it is judged that "Q" denoted by the reference position (P, Q) does not indicate the first row (the step S3211: No), then, it is judged whether or not "Q" denoted by the reference position (P, Q) indicates the second row (step S3213).

As a result of the judgment in the step S3213, if it is judged that "Q" denoted by the reference position (P, Q) indicates the second row (the step S3213: Yes), it is checked whether or not the coordinate position indicated by three samples corresponding to the respective pixel positions in a range of [the sixth column to the eighth column, the first row] in the imaging range RM matches the coordinate position one before the coordinate position $Y_{ZD}$ (i.e. $Y_{ZD}-1$) in the Y direction extracted in the coordinate extracting process A (step S3214). Moreover, it is checked whether or not the coordinate position indicated by six samples corresponding to the respective pixel positions in a range of [the sixth column to the eighth column, the seventh row to the eighth row] in the imaging range RM matches the coordinate position $Y_{ZD}$ in the Y direction extracted in the coordinate extracting process A (step S3214).

On the other hand, as a result of the judgment in the step S3213, if it is judged that "Q" denoted by the reference position (P, Q) does not indicate the second row (the step S3213: No), then, it is judged whether or not "Q" denoted by the reference position (P, Q) indicates the third row (step S3215).

As a result of the judgment in the step S3215, if it is judged that "Q" denoted by the reference position (P, Q) indicates the third row (the step S3215: Yes), it is checked whether or not the coordinate position indicated by six samples corresponding to the respective pixel positions in a range of [the sixth column to the eighth column, the first row to the second row] in the imaging range RM matches the coordinate position one before the coordinate position $Y_{ZD}$ (i.e. $Y_{ZD}-1$) in the Y direction extracted in the coordinate extracting process A (step S3216). Moreover, it is checked whether or not the coordinate position indicated by three samples corresponding to the respective pixel positions in a range of [the sixth column to the eighth column, the eighth row] in the imaging range RM matches the coordinate position $Y_{ZD}$ in the Y direction extracted in the coordinate extracting process A (step S3216).

On the other hand, as a result of the judgment in the step S3215, if it is judged that "Q" denoted by the reference position (P, Q) does not indicate the third row (the step S3215: No), it can be estimated that "Q" denoted by the reference position (P, Q) indicates the fourth row. In this case, it is checked whether or not the coordinate position indicated by nine samples corresponding to the respective pixel positions in a range of [the sixth column to the eighth column, the first row to the third row] in the imaging range RM matches the coordinate position one before the coordinate position $Y_{ZD}$ (i.e. $Y_{ZD}-1$) in the Y direction extracted in the coordinate extracting process A (step S3217).

Next, with reference to FIG. 14, an explanation will be given on the error detection on the coordinate position $Y_{ZD}$ in the Y direction in the step S3220 in FIG. 12. FIG. 14 is a flowchart conceptually showing a flow of the error detecting operation for the coordinate position $Y_{ZD}$ in the Y direction in the step S3220 in FIG. 12.

As shown in FIG. 14, firstly, it is judged whether or not "Q" denoted by the reference position (P, Q) indicates the first row (step S3221).

As a result of the judgment in the step S3221, if it is judged that "Q" denoted by the reference position (P, Q) indicates the first row (the step S3221: Yes), it is checked whether or not the coordinate position indicated by nine samples corresponding to the respective pixel positions in a range of [the first column, the sixth row to the eighth row] and [the seventh column to the eighth column, the sixth row to the eighth row] in the imaging range RM matches the coordinate position $Y_{ZD}$ in the Y direction extracted in the coordinate extracting process A (step S3222).

On the other hand, as a result of the judgment in the step S3221, if it is judged that "Q" denoted by the reference position (P, Q) does not indicate the first row (the step S3221: No), then, it is judged whether or not "Q" denoted by the reference position (P, Q) indicates the second row (step S3223).

As a result of the judgment in the step S3213, if it is judged that "Q" denoted by the reference position (P, Q) indicates the second row (the step S3223: Yes), it is checked whether or not the coordinate position indicated by three samples corresponding to the respective pixel positions in a range of [the first column, the first row] and [the seventh column to the eighth column, the first row] in the imaging range RM matches the coordinate position one before the coordinate position $Y_{ZD}$ (i.e. $Y_{ZD}-1$) in the Y direction extracted in the coordinate extracting process A (step S3224). Moreover, it is checked whether or not the coordinate position indicated by six samples corresponding to the respective pixel positions in a range of [the first column, the seventh row to the eighth row] and [the seventh column to the eighth column, the seventh row to the eighth row] in the imaging range RM matches the coordinate position $Y_{ZD}$ in the Y direction extracted in the coordinate extracting process A (step S3224).

On the other hand, as a result of the judgment in the step S3223, if it is judged that "Q" denoted by the reference position (P, Q) does not indicate the second row (the step S3223: No), then, it is judged whether or not "Q" denoted by the reference position (P, Q) indicates the third row (step S3225).

As a result of the judgment in the step S3225, if it is judged that "Q" denoted by the reference position (P, Q) indicates the third row (the step S3225: Yes), it is checked whether or not the coordinate position indicated by six samples corresponding to the respective pixel positions in a range of [the first column, the first row to the second row] and [the seventh column to the eighth column, the first row to the second row] in the imaging range RM matches the coordinate position one before the coordinate position $Y_{ZD}$ (i.e. $Y_{ZD}-1$) in the Y direction extracted in the coordinate extracting process A (step S3226). Moreover, it is checked whether or not the coordinate position indicated by three samples corresponding to the respective pixel positions in a range of [the first column, the eighth row] and [the seventh column to the eighth column, the eighth row] in the imaging range RM matches the coordinate position $Y_{ZD}$ in the Y direction extracted in the coordinate extracting process A (step S3226).

On the other hand, as a result of the judgment in the step S3225, if it is judged that "Q" denoted by the reference position (P, Q) does not indicate the third row (the step S3225: No), it can be estimated that "Q" denoted by the reference position (P, Q) indicates the fourth row. In this case, it is checked whether or not the coordinate position indicated by nine samples corresponding to the respective pixel positions in a range of [the first column, the first row to the third row] and [the seventh column to the eighth column, the first row to the third row] in the imaging range RM matches the coordinate position one before the coordinate position $Y_{ZD}$ (i.e. $Y_{ZD}-1$) in the Y direction extracted in the coordinate extracting process A (step S3227).

Next, with reference to FIG. 15, an explanation will be given on the error detection on the coordinate position $Y_{ZD}$ in the Y direction in the step S3230 in FIG. 12. FIG. 15 is a flowchart conceptually showing a flow of the error detecting operation for the coordinate position $Y_{ZD}$ in the Y direction in the step S3230 in FIG. 12.

As shown in FIG. 15, firstly, it is judged whether or not "Q" denoted by the reference position (P. Q) indicates the first row (step S3231).

As a result of the judgment in the step S3231, if it is judged that "Q" denoted by the reference position (P, Q) indicates the first row (the step S3231: Yes), it is checked whether or not the coordinate position indicated by nine samples corresponding to the respective pixel positions in a range of [the first column to the second column, the sixth row to the eighth row] and [the eighth column, the sixth row to the eighth row] in the imaging range RM matches the coordinate position $Y_{ZD}$ in the Y direction extracted in the coordinate extracting process A (step S3232).

On the other hand, as a result of the judgment in the step S3231, if it is judged that "Q" denoted by the reference position (P, Q) does not indicate the first row (the step S3231: No), then, it is judged whether or not "Q" denoted by the reference position (P, Q) indicates the second row (step S3233).

As a result of the judgment in the step S3233, if it is judged that "Q" denoted by the reference position (P, Q) indicates the second row (the step S3233: Yes), it is checked whether or not the coordinate position indicated by three samples corresponding to the respective pixel positions in a range of [the first column to the second column, the first row] and [the eighth column, the first row] in the imaging range RM matches the coordinate position one before the coordinate position $Y_{ZD}$ (i.e. $Y_{ZD}-1$) in the Y direction extracted in the coordinate extracting process A (step S3234). Moreover, it is checked whether or not the coordinate position indicated by six samples corresponding to the respective pixel positions in a range of [the first column to the second column, the seventh row to the eighth row] and [the eighth column, the seventh row to the eighth row] in the imaging range RM matches the coordinate position $Y_{ZD}$ in the Y direction extracted in the coordinate extracting process A (step S3234).

On the other hand, as a result of the judgment in the step S3233, if it is judged that "Q" denoted by the reference position (P, Q) does not indicate the second row (the step S3233: No), then, it is judged whether or not "Q" denoted by the reference position (P, Q) indicates the third row (step S3235).

As a result of the judgment in the step S3235, if it is judged that "Q" denoted by the reference position (P, Q) indicates the third row (the step S3235' Yes), it is checked whether or not the coordinate position indicated by six samples corresponding to the respective pixel positions in a range of [the first column to the second column, the first row to the second row] and [the eighth column, the first row to the second row] in the imaging range RM matches the coordinate position one before the coordinate position $Y_{ZD}$ (i.e. $Y_{ZD}-1$) in the Y direction extracted in the coordinate extracting process A (step S3236). Moreover, it is checked whether or not the coordinate position indicated by three samples corresponding to the respective pixel positions in a range of [the first column to the second column, the eighth row] and [the eighth column, the eighth row] in the imaging range RM matches the coordinate position $Y_{ZD}$ in the Y direction extracted in the coordinate extracting process A (step S3236).

On the other hand, as a result of the judgment in the step S3235, if it is judged that "Q" denoted by the reference position (P, Q) does not indicate the third row (the step S3235: No), it can be estimated that "Q" denoted by the reference position (P, Q) indicates the fourth row. In this case, it is checked whether or not the coordinate position indicated by nine samples corresponding to the respective pixel positions in a range of [the first column to the second column, the first row to the third row] and [the eighth column, the first row to the third row] in the imaging range RM matches the coordinate position one before the coordinate position $Y_{ZD}$ (i.e. $Y_{ZD}-1$) in the Y direction extracted in the coordinate extracting process A (step S3237).

Next, with reference to FIG. 16, an explanation will be given on the error detection on the coordinate position $Y_{ZD}$ in the Y direction in the step S3240 in FIG. 12. FIG. 16 is a flowchart conceptually showing a flow of the error detecting operation for the coordinate position $Y_{ZD}$ in the Y direction in the step S3240 in FIG. 12.

As shown in FIG. 16, firstly, it is judged whether or not "Q" denoted by the reference position (P, Q) indicates the first row (step S3241).

As a result of the judgment in the step S3241, if it is judged that "Q" denoted by the reference position (P, Q) indicates the first row (the step S3241: Yes), it is checked whether or not the coordinate position indicated by nine samples corresponding to the respective pixel positions in a range of [the first column to the third column, the sixth row to the eighth row] in the imaging range RM matches the coordinate position $Y_{ZD}$ in the Y direction extracted in the coordinate extracting process A (step S3242).

On the other hand, as a result of the judgment in the step S3241, if it is judged that "Q" denoted by the reference position (P, Q) does not indicate the first row (the step S3241: No), then, it is judged whether or not "Q" denoted by the reference position (P, Q) indicates the second row (step S3243).

As a result of the judgment in the step S3243, if it is judged that "Q" denoted by the reference position (P, Q) indicates the second row (the step S3243: Yes), it is checked whether or not the coordinate position indicated by three samples corresponding to the respective pixel positions in a range of [the first column to the third column, the first row] in the imaging range RM matches the coordinate position one before the coordinate position $Y_{ZD}$ (i.e. $Y_{ZD}-1$) in the Y direction extracted in the coordinate extracting process A (step S3244).

Moreover, it is checked whether or not the coordinate position indicated by six samples corresponding to the respective pixel positions in a range of [the first column to the third column, the seventh row to the eighth row] in the imaging range RM matches the coordinate position $Y_{ZD}$ in the Y direction extracted in the coordinate extracting process A (step S3244).

On the other hand, as a result of the judgment in the step S3243, if it is judged that "Q" denoted by the reference position (P, Q) does not indicate the second row (the step S3243: No), then, it is judged whether or not "Q" denoted by the reference position (P, Q) indicates the third row (step S3245).

As a result of the judgment in the step S3245, if it is judged that "Q" denoted by the reference position (P, Q) indicates the third row (the step S3245: Yes), it is checked whether or not the coordinate position indicated by six samples corresponding to the respective pixel positions in a range of [the first column to the third column, the first row to the second row] in the imaging range RM matches the coordinate position one before the coordinate position $Y_{ZD}$ (i.e. $Y_{ZD}-1$) in the Y direction extracted in the coordinate extracting process A (step S3246). Moreover, it is checked whether or not the coordinate position indicated by three samples corresponding to the respective pixel positions in a range of [the first column to the third column, the eighth row] in the imaging range RM matches the coordinate position $Y_{ZD}$ in the Y direction extracted in the coordinate extracting process A (step S3246).

On the other hand, as a result of the judgment in the step S3245, if it is judged that "Q" denoted by the reference position (P, Q) does not indicate the third row (the step S3245: No), it can be estimated that "Q" denoted by the reference position (P, Q) indicates the fourth row. In this case, it is checked whether or not the coordinate position indicated by nine samples corresponding to the respective pixel positions in a range of [the first column to the third column, the first row to the third row] in the imaging range RM matches the coordinate position one before the coordinate position $Y_{ZD}$ (i.e. $Y_{ZD}-1$) in the Y direction extracted in the coordinate extracting process A (step S3247).

(2-2) Case in which Reference Position (P, Q) is Included in Area B in Imaging Range RM Next, with reference to FIG. 17 and FIG. 18, an explanation will be given on the coordinate data extracting process B and the error detecting process B in the case where the reference position (P, Q) is included in the area B in the imaging range RM. FIG. 17 is a flowchart conceptually showing a flow of the operations of the coordinate data extracting process B in the case where the reference position (P, Q) is included in the area B in the imaging range RM. FIG. 18 is a flowchart conceptually showing a flow of the operations of the error detecting process B in the case where the reference position (P, Q) is included in the area B in the imaging range RM.

Firstly, the coordinate data extracting process B will be described. As shown in FIG. 17, firstly, nine samples corresponding to the respective pixel positions in a range of [the (P−3)-th column to the (P−1)-th column, the (Q+1)-th row to the (Q+3)-th row] in the imaging range RM are extracted from the rotation-corrected image (step S4101). The extracted nine samples are stored into the X-coordinate register not illustrated, as bits X1 to X9 which indicate the coordinate position in the X direction (step S4101). In this manner, in the case where the reference position (P, Q) is included in the area B in the imaging range RM, the X coordinate of the imaged pixel block PB is extracted.

Then, it is judged whether or not "P" denoted by the reference position (P, Q) indicates the fifth column (step S4102).

As a result of the judgment in the step S4102, if it is judged that "P" denoted by the reference position (P, Q) indicates the fifth column (the step S4102: Yes), eight samples corresponding to the respective pixel positions in a range of [the sixth column to the eighth column, the (Q+1)-th row to the (Q+3)-th row] in the imaging range RM are extracted from the rotation-corrected image (step S4103). The extracted eight samples are stored into the Y-coordinate register not illustrated, as bits Y1 to Y8 which indicate the coordinate position in the Y direction (step S4103).

On the other hand, as a result of the judgment in the step S4102, if it is judged that "P" denoted by the reference position (P, Q) does not indicate the fifth column (the step S4102: No), then, it is judged whether or not "P" denoted by the reference position (P, Q) indicates the sixth column (step S4104).

As a result of the judgment in the step S4104, if it is judged that "P" denoted by the reference position (P, Q) indicates the sixth column (the step S4104: Yes), eight samples corresponding to the respective pixel positions in a range of [the first column, the (Q+1)-th row to the (Q+3)-th row] and [the seventh column to the eighth column, the (Q+1)-th row to the (Q+3)-th row] in the imaging range RM are extracted from the rotation-corrected image (step S4105). The extracted eight samples are stored into the Y-coordinate register not illustrated, as bits Y1 to Y8 which indicate the coordinate position in the Y direction (step S4105).

On the other hand, as a result of the judgment in the step S4104, if it is judged that "P" denoted by the reference position (P, Q) does not indicate the sixth column (the step S4104: No), then, it is judged whether or not "P" denoted by the reference position (P, Q) indicates the seventh column (step S4106).

As a result of the judgment in the step S4106, if it is judged that "P" denoted by the reference position (P, Q) indicates the seventh column (the step S4106: Yes), eight samples corresponding to the respective pixel positions in a range of [the first column to the second column, the (Q+1)-th row to the (Q+3)-th row] and [the eighth column, the (Q+1)-th row to the (Q+3)-th row] in the imaging range RM are extracted from the rotation-corrected image (step S4107). The extracted eight samples are stored into the Y-coordinate register not illustrated, as bits Y1 to Y8 which indicate the coordinate position in the Y direction (step S4107).

On the other hand, as a result of the judgment in the step S4107, if it is judged that "P" denoted by the reference position (P, Q) does not indicate the seventh column (the step S4107: No), it is estimated that "P" denoted by the reference position (P, Q) indicates the eighth column (step S4106). In this case, eight samples corresponding to the respective pixel positions in a range of [the first column to the third column, the (Q+1)-th row to the (Q+3)-th row] in the imaging range RM are extracted from the rotation-corrected image (step S4108). The extracted eight samples are stored into the Y-coordinate register not illustrated, as bits Y1 to Y8 which indicate the coordinate position in the Y direction (step S4108).

In this manner, in the case where the reference position (P, Q) is included in the area B in the imaging range RM, the Y coordinate of the imaged pixel block PB is extracted.

Then, the coordinate data ZD is outputted to the error detection device 97, wherein the coordinate data ZD indicates the bits X1 to X9 stored in the X-coordinate register as the coordinate position $X_{ZD}$ in the X direction (or horizontal direction) on the display surface of the PDP 100, and it indicates the bits Y1 to Y8 stored in the Y-coordinate register as the coordinate position $Y_{ZD}$ in the Y direction (or vertical direction) on the display surface of the PDP 100 (step S4109).

Next, the error detecting process B will be described. As shown in FIG. 18, firstly, it is judged whether or not "P" denoted by the reference position (P, Q) indicates the fifth column (step S4201).

As a result of the judgment in the step S4201, if it is judged that "P" denoted by the reference position (P, Q) indicates the fifth column (the step S4201: Yes), the error detection is performed on the coordinate position $X_{ZD}$ in the X direction shown in FIG. 19 described later (step S4210).

On the other hand, as a result of the judgment in the step S4201, if it is judged that "P" denoted by the reference position (P, Q) does not indicate the fifth column (the step S4201: No), then, it is judged whether or not "P" denoted by the reference position (P, Q) indicates the sixth column (step S4203).

As a result of the judgment in the step S4203, if it is judged that "P" denoted by the reference position (P, Q) indicates the sixth column (the step S4203: Yes), the error detection is performed on the coordinate position $X_{ZD}$ in the X direction shown in FIG. 20 described later (step S4220).

On the other hand, as a result of the judgment in the step S4203, if it is judged that "P" denoted by the reference position (P, Q) does not indicate the sixth column (the step S4203: No), then, it is judged whether or not "P" denoted by the reference position (P, Q) indicates the seventh column (step S4205).

As a result of the judgment in the step S4205, if it is judged that "P" denoted by the reference position (P, Q) indicates the seventh column (the step S4205: Yes), the error detection is performed on the coordinate position $X_{ZD}$ in the X direction shown in FIG. 21 described later (step S4230).

On the other hand, as a result of the judgment in the step S4205, if it is judged that "P" denoted by the reference position (P, Q) does not indicate the seventh column (the step S4205: No), it is estimated that "P" denoted by the reference position (P, Q) indicates the eighth column. In this case, the error detection is performed on the coordinate position $X_{ZD}$ in the X direction shown in FIG. 22 described later (step S4240).

After the aforementioned step S4210, S4220, S4230, or S4240 is ended, it is judged whether or not "Q" denoted by the reference position (P, Q) indicates the first row (step S4251).

As a result of the judgment in the step S4251, if it is judged that "Q" denoted by the reference position (P, Q) indicates the first row (the step S4251: Yes), it is checked whether or not the coordinate position indicated by nine samples corresponding to the respective pixel positions in a range of [the (P−3)-th column to the (P−1)-th column, the sixth row to the eighth row] in the imaging range RM matches the coordinate position $Y_{ZD}$ in the Y direction extracted in the coordinate extracting process B (step S4252).

On the other hand, as a result of the judgment in the step S4251, if it is judged that "Q" denoted by the reference position (P, Q) does not indicate the first row (the step S4251: No), then, it is judged whether or not "Q" denoted by the reference position (P, Q) indicates the second row (step S4253).

As a result of the judgment in the step S4253, if it is judged that "Q" denoted by the reference position (P, Q) indicates the second row (the step S4253: Yes), it is checked whether or not the coordinate position indicated by three samples corresponding to the respective pixel positions in a range of [the (P−3)-th column to the (P−1)-th column, the first row] in the imaging range RM matches the coordinate position one before the coordinate position $Y_{ZD}$ (i.e. $Y_{ZD}$−1) in the Y direction extracted in the coordinate extracting process B (step S4254). Moreover, it is checked whether or not the coordinate position indicated by six samples corresponding to the respective pixel positions in a range of [the (P−3)-th column to the (P−1)-th column, the seventh row to the eighth row] in the imaging range RM matches the coordinate position $Y_{ZD}$ in the Y direction extracted in the coordinate extracting process B (step S4254).

On the other hand, as a result of the judgment in the step S4253, if it is judged that "Q" denoted by the reference position (P, Q) does not indicate the second row (the step S4253: No), then, it is judged whether or not "Q" denoted by the reference position (P, Q) indicates the third row (step S4255).

As a result of the judgment in the step S4255, if it is judged that "Q" denoted by the reference position (P, Q) indicates the third row (the step S4255:Yes), it is checked whether or not the coordinate position indicated by six samples corresponding to the respective pixel positions in a range of [the (P−3)-th column to the (P−1)-th column, the first row to the second row] in the imaging range RM matches the coordinate position one before the coordinate position $Y_{ZD}$ (i.e. $Y_{ZD}$−1) in the Y direction extracted in the coordinate extracting process B (step S4256). Moreover, it is checked whether or not the coordinate position indicated by three samples corresponding to the respective pixel positions in a range of [the (P−3)-th column to the (P−1)-th column, the eighth row] in the imaging range RM matches the coordinate position $Y_{ZD}$ in the Y direction extracted in the coordinate extracting process B (step S4256).

On the other hand, as a result of the judgment in the step S4255, if it is judged that "Q" denoted by the reference position (P, Q) does not indicate the third row (the step S4255: No), it can be estimated that "Q" denoted by the reference position (P, Q) indicates the fourth row. In this case, it is checked whether or not the coordinate position indicated by nine samples corresponding to the respective pixel positions in a range of [the (P−3)-th column to the (P−1)-th column, the first row to the third row] in the imaging range RM matches the coordinate position one before the coordinate position $Y_{ZD}$ (i.e. $Y_{ZD}$−1) in the Y direction extracted in the coordinate extracting process B (step S4257).

Next, with reference to FIG. 19, an explanation will be given on the error detection on the coordinate position $X_{ZD}$ in the X direction in the step S4210 in FIG. 18. FIG. 19 is a flowchart conceptually showing a flow of the error detecting operation for the coordinate position $X_{ZD}$ in the X direction in the step S4210 in FIG. 18.

As shown in FIG. 19, it is judged whether or not "Q" denoted by the reference position (P, Q) indicates the first row (step S4211).

As a result of the judgment in the step S4211, if it is judged that "Q" denoted by the reference position (P, Q) indicates the first row (the step S4211:Yes), it is checked whether or not the coordinate position indicated by nine samples corresponding to the respective pixel positions in a range of [the sixth column to the eighth column, the sixth row to the eighth row] in the imaging range RM matches the coordinate position one after the coordinate position $X_{ZD}$ (i.e. $X_{ZD}$+1) in the X direction extracted in the coordinate extracting process B (step S4212).

On the other hand, as a result of the judgment in the step S4211, if it is judged that "Q" denoted by the reference position (P, Q) does not indicate the first row (the step S4211: No), then, it is judged whether or not "Q" denoted by the reference position (P, Q) indicates the second row (step S4213).

As a result of the judgment in the step S4213, if it is judged that "Q" denoted by the reference position (P, Q) indicates the second row (the step S4213:Yes), it is checked whether or not the coordinate position indicated by nine samples corresponding to the respective pixel positions in a range of [the sixth column to the eighth column, the first row] and [the sixth column to the eighth column, the seventh row to the eighth row] in the imaging range RM matches the coordinate position one after the coordinate position $X_{ZD}$ (i.e. $X_{ZD}+1$) in the X direction extracted in the coordinate extracting process B (step S4214).

On the other hand, as a result of the judgment in the step S4213, if it is judged that "Q" denoted by the reference position (P, Q) does not indicate the second row (the step S4213: No), then, it is judged whether or not "Q" denoted by the reference position (P, Q) indicates the third row (step S4215).

As a result of the judgment in the step S4215, if it is judged that "Q" denoted by the reference position (P, Q) indicates the third row (the step S4215: Yes), it is checked whether or not the coordinate position indicated by nine samples corresponding to the respective pixel positions in a range of [the sixth column to the eighth column, the first row to the second row] and [the sixth column to the eighth column, the eighth row] in the imaging range RM matches the coordinate position one after the coordinate position $X_{ZD}$ (i.e. $X_{ZD}+1$) in the X direction extracted in the coordinate extracting process B (step S4216).

On the other hand, as a result of the judgment in the step S4215, if it is judged that "Q" denoted by the reference position (P, Q) does not indicate the third row (the step S4215: No), it can be estimated that "Q" denoted by the reference position (P, Q) indicates the fourth row. In this case, it is checked whether or not the coordinate position indicated by nine samples corresponding to the respective pixel positions in a range of [the sixth column to the eighth column, the first row to the third row] in the imaging range RM matches the coordinate position one after the coordinate position $X_{ZD}$ (i.e. $X_{ZD}+1$) in the X direction extracted in the coordinate extracting process B (step S4217).

Next, with reference to FIG. 20, an explanation will be given on the error detection on the coordinate position $X_{ZD}$ in the X direction in the step S4220 in FIG. 18. FIG. 20 is a flowchart conceptually showing a flow of the error detecting operation for the coordinate position $X_{ZD}$ in the X direction in the step S4220 in FIG. 18.

As shown in FIG. 20, it is judged whether or not "Q" denoted by the reference position (P, Q) indicates the first row (step S4221).

As a result of the judgment in the step S4221, if it is judged that "Q" denoted by the reference position (P, Q) indicates the first row (the step S4221: Yes), it is checked whether or not the coordinate position indicated by three samples corresponding to the respective pixel positions in a range of [the first column, the sixth row to the eighth row] in the imaging range RM matches the coordinate position $X_{ZD}$ in the X direction extracted in the coordinate extracting process B (step S4222). Moreover, it is checked whether or not the coordinate position indicated by six samples corresponding to the respective pixel positions in a range of [the seventh column to the eighth column, the sixth row to the eighth row] in the imaging range RM matches the coordinate position one after the coordinate position $X_{ZD}$ (i.e. $X_{ZD}+1$) in the X direction extracted in the coordinate extracting process B (step S4222).

On the other hand, as a result of the judgment in the step S4221, if it is judged that "Q" denoted by the reference position (P, Q) does not indicate the first row (the step S4221: No), then, it is judged whether or not "Q" denoted by the reference position (P, Q) indicates the second row (step S4223).

As a result of the judgment in the step S4223, if it is judged that "Q" denoted by the reference position (P, Q) indicates the second row (the step S4223: Yes), it is checked whether or not the coordinate position indicated by three samples corresponding to the respective pixel positions in a range of [the first column, the first row] and [the first column, the seventh row to the eighth row] in the imaging range RM matches the coordinate position $X_{ZD}$ in the X direction extracted in the coordinate extracting process B (step S4224). Moreover, it is checked whether or not the coordinate position indicated by six samples corresponding to the respective pixel positions in a range of [the seventh column to the eighth column, the first row] and [the seventh column to the eighth column, the seventh row to the eighth row] in the imaging range RM matches the coordinate position one after the coordinate position $X_{ZD}$ (i.e. $X_{ZD}+1$) in the X direction extracted in the coordinate extracting process B (step S4224).

On the other hand, as a result of the judgment in the step S4223, if it is judged that "Q" denoted by the reference position (P, Q) does not indicate the second row (the step S4223: No), then, it is judged whether or not "Q" denoted by the reference position (P, Q) indicates the third row (step S4225).

As a result of the judgment in the step S4225, if it is judged that "Q" denoted by the reference position (P, Q) indicates the third row (the step S4225: Yes), it is checked whether or not the coordinate position indicated by three samples corresponding to the respective pixel positions in a range of [the first column, the first row to the second row] and [the first column, the eighth row] in the imaging range RM matches the coordinate position $X_{ZD}$ in the X direction extracted in the coordinate extracting process B (step S4226). Moreover, it is checked whether or not the coordinate position indicated by six samples corresponding to the respective pixel positions in a range of [the seventh column to the eighth column, the first row to the second row] and [the seventh column to the eighth column, the eighth row] in the imaging range RM matches the coordinate position one after the coordinate position $X_{ZD}$ (i.e. $X_{ZD}+1$) in the X direction extracted in the coordinate extracting process B (step S4226).

On the other hand, as a result of the judgment in the step S4225, if it is judged that "Q" denoted by the reference position (P, Q) does not indicate the third row (the step S4225: No), it can be estimated that "Q" denoted by the reference position (P, Q) indicates the fourth row. In this case, it is checked whether or not the coordinate position indicated by three samples corresponding to the respective pixel positions in a range of [the first column, the first row to the third row] in the imaging range RM matches the coordinate position $X_{ZD}$ in the X direction extracted in the coordinate extracting process B (step S4227). Moreover, it is checked whether or not the coordinate position indicated by six samples corresponding to the respective pixel positions in a range of [the seventh column to the eighth column, the first row to the third row] in the imaging range RM matches the coordinate position one after the coordinate position $X_{ZD}$ (i.e. $X_{ZD}+1$) in the X direction extracted in the coordinate extracting process B (step S4227).

Next, with reference to FIG. 21, an explanation will be given on the error detection on the coordinate position $X_{ZD}$ in the X direction in the step S4230 in FIG. 18. FIG. 21 is a flowchart conceptually showing a flow of the error detecting operation for the coordinate position $X_{ZD}$ in the X direction in the step S4230 in FIG. 18

As shown in FIG. 21, it is judged whether or not "Q" denoted by the reference position (P Q) indicates the first row (step S4231).

As a result of the judgment in the step S4231, if it is judged that "Q" denoted by the reference position (P, Q) indicates the first row (the step S4231: Yes), it is checked whether or not the coordinate position indicated by six samples corresponding to the respective pixel positions in a range of [the first column to the second column, the sixth row to the eighth row] in the imaging range RM matches the coordinate position $X_{ZD}$ in the X direction extracted in the coordinate extracting process B (step S4232). Moreover, it is checked whether or not the coordinate position indicated by three samples corresponding to the respective pixel positions in a range of [the eighth column, the sixth row to the eighth row] in the imaging range RM matches the coordinate position one after the coordinate position $X_{ZD}$ (i.e. $X_{ZD}$+1) in the X direction extracted in the coordinate extracting process B (step S4232).

On the other hand, as a result of the judgment in the step S4231, if it is judged that "Q" denoted by the reference position (P, Q) does not indicate the first row (the step S4231: No), then, it is judged whether or not "Q" denoted by the reference position (P, Q) indicates the second row (step S4233).

As a result of the judgment in the step S4233, if it is judged that "Q" denoted by the reference position (P, Q) indicates the second row (the step S4233: Yes), it is checked whether or not the coordinate position indicated by six samples corresponding to the respective pixel positions in a range of [the first column to the second column, the first row] and [the first column to the second column, the seventh row to the eighth row] in the imaging range RM matches the coordinate position $X_{ZD}$ in the X direction extracted in the coordinate extracting process B (step S4234). Moreover, it is checked whether or not the coordinate position indicated by three samples corresponding to the respective pixel positions in a range of [the eighth column, the first row] and [the eighth column, the seventh row to the eighth row] in the imaging range RM matches the coordinate position one after the coordinate position $X_{ZD}$ (i.e. $X_{ZD}$+1) in the X direction extracted in the coordinate extracting process B (step S4234).

On the other hand, as a result of the judgment in the step S4233, if it is judged that "Q" denoted by the reference position (P, Q) does not indicate the second row (the step S4233: No), then, it is judged whether or not "Q" denoted by the reference position (P, Q) indicates the third row (step S4235).

As a result of the judgment in the step S4235, if it is judged that "Q" denoted by the reference position (P, Q) indicates the third row (the step S4235: Yes), it is checked whether or not the coordinate position indicated by six samples corresponding to the respective pixel positions in a range of [the first column to the second column, the first row to the second row] and [the first column to the second column, the eighth row] in the imaging range RM matches the coordinate position $X_{ZD}$ in the X direction extracted in the coordinate extracting process B (step S4236). Moreover, it is checked whether or not the coordinate position indicated by three samples corresponding to the respective pixel positions in a range of [the eighth column, the first row to the second row] and [the eighth column, the eighth row] in the imaging range RM matches the coordinate position one after the coordinate position $X_{ZD}$ (i.e. $X_{ZD}$+1) in the X direction extracted in the coordinate extracting process B (step S4236).

On the other hand, as a result of the judgment in the step S4235, if it is judged that "Q" denoted by the reference position (P, Q) does not indicate the third row (the step S4235: No), it can be estimated that "Q" denoted by the reference position (P, Q) indicates the fourth row. In this case, it is checked whether or not the coordinate position indicated by six samples corresponding to the respective pixel positions in a range of [the first column to the second column, the first row to the third row] in the imaging range RM matches the coordinate position $X_{ZD}$ in the X direction extracted in the coordinate extracting process B (step S4237). Moreover, it is checked whether or not the coordinate position indicated by three samples corresponding to the respective pixel positions in a range of [the eighth column, the first row to the third row] in the imaging range RM matches the coordinate position one after the coordinate position $X_{ZD}$ (i.e. $X_{ZD}$+1) in the X direction extracted in the coordinate extracting process B (step S4237).

Next, with reference to FIG. 22, an explanation will be given on the error detection on the coordinate position $X_{ZD}$ in the X direction in the step S4240 in FIG. 18. FIG. 22 is a flowchart conceptually showing a flow of the error detecting operation for the coordinate position $X_{ZD}$ in the X direction in the step S4240 in FIG. 18.

As shown in FIG. 22, firstly, it is judged whether or not "Q" denoted by the reference position (P, Q) indicates the first row (step S4241).

As a result of the judgment in the step S4241, if it is judged that "Q" denoted by the reference position (P, Q) indicates the first row (the step S4241: Yes), it is checked whether or not the coordinate position indicated by nine samples corresponding to the respective pixel positions in a range of [the first column to the third column, the sixth row to the eighth row] in the imaging range RM matches the coordinate position $X_{ZD}$ in the X direction extracted in the coordinate extracting process B (step S4242).

On the other hand, as a result of the judgment in the step S4241, if it is judged that "Q" denoted by the reference position (P, Q) does not indicate the first row (the step S4241: No), then, it is judged whether or not "Q" denoted by the reference position (P, Q) indicates the second row (step S4243).

As a result of the judgment in the step S4243, if it is judged that "Q" denoted by the reference position (P, Q) indicates the second row (the step S4243: Yes), it is checked whether or not the coordinate position indicated by nine samples corresponding to the respective pixel positions in a range of [the first column to the third column, the first row] and [the first column to the third column, the seventh row to the eighth row] in the imaging range RM matches the coordinate position $X_{ZD}$ in the X direction extracted in the coordinate extracting process B (step S4244).

On the other hand, as a result of the judgment in the step S4243, if it is judged that "Q" denoted by the reference position (P, Q) does not indicate the second row (the step S4243: No), then, it is judged whether or not "Q" denoted by the reference position (P, Q) indicates the third row (step S4245).

As a result of the judgment in the step S4245, if it is judged that "Q" denoted by the reference position (P, Q) indicates the third row (the step S4245: Yes), it is checked whether or not the coordinate position indicated by nine samples corresponding to the respective pixel positions in a range of [the first column to the third column, the first row to the second row] and [the first column to the third column, the eighth row] in the imaging range RM matches the coordinate position $X_{ZD}$ in the X direction extracted in the coordinate extracting process B (step S4246).

On the other hand, as a result of the judgment in the step S4245, if it is judged that "Q" denoted by the reference position (P, Q) does not indicate the third row (the step S4245: No), it can be estimated that "Q" denoted by the reference position (P, Q) indicates the fourth row. In this case, it is checked whether or not the coordinate position indicated by nine samples corresponding to the respective pixel positions in a range of [the first column to the third column, the first row to the third row] in the imaging range RM matches the coordinate position $X_{ZD}$ in the X direction extracted in the coordinate extracting process B (step S4247).

(2-3) Case in which Reference Position (P, Q) is Included in Area C in Imaging Range RM Next, with reference to FIG. 23 and FIG. 24, an explanation will be given on the coordinate data extracting process C and the error detecting process C in the case where the reference position (P, Q) is included in the area C in the imaging range RM. FIG. 23 is a flowchart conceptually showing a flow of the operations of the coordinate data extracting process C in the case where the reference position (P, Q) is included in the area C in the imaging range RM. FIG. 24 is a flowchart conceptually showing a flow of the operations of the error detecting process C in the case where the reference position (P, Q) is included in the area C in the imaging range RM.

Firstly, the coordinate data extracting process C will be described. As shown in FIG. 23, firstly, it is judged whether or not "Q" denoted by the reference position (P, Q) indicates the fifth row (step S5101).

As a result of the judgment in the step S5101, if it is judged that "Q" denoted by the reference position (P, Q) indicates the fifth row (the step S5101: Yes), nine samples corresponding to the respective pixel positions in a range of [the (P−3)-th column to the (P−1)-th column, the sixth row to the eighth row] in the imaging range RM are extracted from the rotation-corrected image (step S5102). The extracted nine samples are stored into the X-coordinate register not illustrated, as bits X1 to X9 which indicate the coordinate position in the X direction (step S5102).

On the other hand, as a result of the judgment in the step S5101, if it is judged that "Q" denoted by the reference position (P, Q) does not indicate the fifth column (the step S5101: No), then, it is judged whether or not "Q" denoted by the reference position (P, Q) indicates the sixth row (step S5103).

As a result of the judgment in the step S5103, if it is judged that "Q" denoted by the reference position (P, Q) indicates the sixth row (the step S5103: Yes), nine samples corresponding to the respective pixel positions in a range of [the (P−3)-th column to the (P−1)-th column, the first row] and [the (P−3)-th column to the (P−1)-th column, the seventh row to the eighth row] in the imaging range RM are extracted from the rotation-corrected image (step S5104). The extracted nine samples are stored into the X-coordinate register not illustrated, as bits X1 to X9 which indicate the coordinate position in the X direction (step S5104).

On the other hand, as a result of the judgment in the step S5103, if it is judged that "Q" denoted by the reference position (P, Q) does not indicate the sixth row (the step S5103: No), then, it is judged whether or not "Q" denoted by the reference position (P, Q) indicates the seventh row (step S5105).

As a result of the judgment in the step S5105, if it is judged that "Q" denoted by the reference position (P, Q) indicates the seventh row (the step S5105: Yes), nine samples corresponding to the respective pixel positions in a range of [the (P−3)-th column to the (P−1)-th column, the first row to the second row] and [the (P−3)-th column to the (P−1)-th column, the eighth row] in the imaging range RM are extracted from the rotation-corrected image (step S5106). The extracted nine samples are stored into the X-coordinate register not illustrated, as bits X1 to X9 which indicate the coordinate position in the X direction (step S5106).

On the other hand, as a result of the judgment in the step S5105, if it is judged that "Q" denoted by the reference position (P, Q) does not indicate the seventh row (the step S5105: No), it is estimated that "Q" denoted by the reference position (P, Q) indicates the eighth row. In this case, nine samples corresponding to the respective pixel positions in a range of [the (P−3)-th column to the (P−1)-th column, the first row to the third row] in the imaging range RM are extracted from the rotation-corrected image (step S5107). The extracted nine samples are stored into the X-coordinate register not illustrated, as bits X1 to X9 which indicate the coordinate position in the X direction (step S5107).

In this manner, in the case where the reference position (P, Q) is included in the area C in the imaging range RM, the X coordinate of the imaged pixel block PB is extracted.

After the aforementioned step S5102, S5104, S5106, or S5107 is ended, eight samples corresponding to the respective pixel positions in a range of [the (P−1)-th column to the (P−3)-th column, the (Q−3)-th row to the (Q−1)-th row] in the imaging range RM are extracted from the rotation-corrected image (step S5108). The extracted eight samples are stored into the Y-coordinate register not illustrated, as bits Y1 to Y8 which indicate the coordinate position in the Y direction (step S5108). In this manner, the Y-coordinate of the imaged pixel block PB is extracted in the case where the reference position (P, Q) is included in the area C in the imaging area RM.

Then, the coordinate data ZD is outputted to the error detection device 97, wherein the coordinate data ZD indicates the bits X1 to X9 stored in the X-coordinate register as a coordinate position $X_{ZD}$ in the X direction (or horizontal direction) on the display surface of the PDP 100, and it indicates the bits Y1 to Y8 stored in the Y-coordinate register as a coordinate position $Y_{ZD}$ in the Y direction (or vertical direction) on the display surface of the PDP 100 (step S5109).

Next, the error detecting process C will be described. As shown in FIG. 24, firstly, it is judged whether or not "P" denoted by the reference position (P, Q) indicates the fifth column (step S5201).

As a result of the judgment in the step S5201, if it is judged that "P" denoted by the reference position (P, Q) indicates the fifth column (the step S5201: Yes), it is checked whether or not the coordinate position indicated by nine samples corresponding to the respective pixel positions in a range of [the sixth column to the eighth column, the (Q−3)-th row to the (Q−1)-th row] in the imaging range RM matches the coordinate position one after the coordinate position $X_{ZD}$ (i.e. $X_{ZD}+1$) in the X direction extracted in the coordinate extracting process C (step S5202). Then, the error detection is performed on the coordinate position $Y_{ZD}$ in the Y direction shown in FIG. 25 described later (step S5210).

On the other hand, as a result of the judgment in the step S5201, if it is judged that "P" denoted by the reference position (P, Q) does not indicate the fifth column (the step S5201: No), then, it is judged whether or not "P" denoted by the reference position (P, Q) indicates the sixth column (step S5203).

As a result of the judgment in the step S5203, if it is judged that "P" denoted by the reference position (P, Q) indicates the sixth column (the step S5203: Yes), it is checked whether or not the coordinate position indicated by three samples corresponding to the respective pixel positions in a range of [the first column, the (Q−3)-th row to the (Q−1)-th row] in the imaging range RM matches the coordinate position $X_{ZD}$ in the X direction extracted in the coordinate extracting process C (step S5204). Moreover, it is checked whether or not the coordinate position indicated by six samples corresponding to the respective pixel positions in a range of [the seventh column to the eighth column, the (Q−3)-th row to the (Q−1)-th row] in the imaging range RM matches the coordinate position one after the coordinate position $X_{ZD}$ (i.e. $X_{ZD}+1$) in the X direction extracted in the coordinate extracting process C (step S5204). Then, the error detection is performed on the coordinate position $Y_{ZD}$ in the Y direction shown in FIG. 26 described later (step S5220).

On the other hand, as a result of the judgment in the step S5203, if it is judged that "P" denoted by the reference position (P, Q) does not indicate the sixth column (the step S5203: No), then, it is judged whether or not "P" denoted by the reference position (P, Q) indicates the seventh column (step S5205).

As a result of the judgment in the step S5205, if it is judged that "P" denoted by the reference position (P, Q) indicates the seventh column (the step S5205: Yes), it is checked whether or not the coordinate position indicated by six samples corresponding to the respective pixel positions in a range of [the first column to the second column, the (Q−3)-th row to the (Q−1)-th row] in the imaging range RM matches the coordinate position $X_{ZD}$ in the X direction extracted in the coordinate extracting process C (step S5206). Moreover, it is checked whether or Dot the coordinate position indicated by three samples corresponding to the respective pixel positions in a range of [the eighth column, the (Q−3)-th row to the (Q−1)-th row] in the imaging range RM matches the coordinate position one after the coordinate position $X_{ZD}$ (i.e. $X_{ZD}+1$) in the X direction extracted in the coordinate extracting process C (step S5206), Then, the error detection is performed on the coordinate position $Y_{ZD}$ in the Y direction shown in FIG. 27 described later (step S5230).

On the other hand, as a result of the judgment in the step S5205, if it is judged that "P" denoted by the reference position (P, Q) does not indicate the seventh column (the step S5205: No), it is estimated that "P" denoted by the reference position (P, Q) indicates the eighth column. In this case, it is checked whether or not the coordinate position indicated by nine samples corresponding to the respective pixel positions in a range of [the first column to the third column, the (Q−3)-th row to the (Q−1)-th row] in the imaging range RM matches the coordinate position $X_{ZD}$ in the X direction extracted in the coordinate extracting process C (step S5207). Then, the error detection is performed on the coordinate position $Y_{ZD}$ in the Y direction shown in FIG. 28 described later (step S5240).

Next, with reference to FIG. 25, an explanation will be given on the error detection on the coordinate position $Y_{ZD}$ in the Y direction in the step S521.0 in FIG. 24. FIG. 25 is a flowchart conceptually showing a flow of the error detecting operation for the coordinate position $Y_{ZD}$ in the Y direction in the step S5210 in FIG. 24.

As shown in FIG. 25, firstly, it is judged whether or not "Q" denoted by the reference position (P, Q) indicates the fifth row (step S5211).

As a result of the judgment in the step S5211, if it is judged that "Q" denoted by the reference position (P, Q) indicates the fifth row (the step S5211: Yes), it is checked whether or not the coordinate position indicated by nine samples corresponding to the respective pixel positions in a range of [the sixth column to the eighth column, the sixth row to the eighth row] in the imaging range RM matches the coordinate position one after the coordinate position $Y_{ZD}$ (i.e. $Y_{ZD}+1$) in the Y direction extracted in the coordinate extracting process C (step S5212).

On the other hand, as a result of the judgment in the step S5211, if it is judged that "Q" denoted by the reference position (P, Q) does not indicate the fifth row (the step S5211: No), then, it is judged whether or not "Q" denoted by the reference position (P, Q) indicates the sixth row (step S5213).

As a result of the judgment in the step S5213, if it is judged that "Q" denoted by the reference position (P, Q) indicates the sixth row (the step S5213: Yes), it is checked whether or not the coordinate position indicated by three samples corresponding to the respective pixel positions in a range of [the sixth column to the eighth column, the first row] in the imaging range RM matches the coordinate position $Y_{ZD}$ in the Y direction extracted in the coordinate extracting process C (step S5214). Moreover, it is checked whether or not the coordinate position indicated by six samples corresponding to the respective pixel positions in a range of [the sixth column to the eighth column, the seventh row to the eighth row] in the imaging range RM matches the coordinate position one after the coordinate position $Y_{ZD}$ (i.e. $Y_{ZD}+1$) in the Y direction extracted in the coordinate extracting process C (step S5214).

On the other hand, as a result of the judgment in the step S5213, if it is judged that "Q" denoted by the reference position (P, Q) does not indicate the sixth row (the step S5213: No), then, it is judged whether or not "Q" denoted by the reference position (P, Q) indicates the seventh row (step S5215).

As a result of the judgment in the step S5215, if it is judged that "Q" denoted by the reference position (P, Q) indicates the seventh row (the step S5215: Yes), it is checked whether or not the coordinate position indicated by six samples corresponding to the respective pixel positions in a range of [the sixth column to the eighth column, the first row to the second row] in the imaging range RM matches the coordinate position $Y_{ZD}$ in the Y direction extracted in the coordinate extracting process C (step S5216). Moreover, it is checked whether or not the coordinate position indicated by three samples corresponding to the respective pixel positions in a range of [the sixth column to the eighth column, the eighth row] in the imaging range RM matches the coordinate position one after the coordinate position $Y_{ZD}$ (i.e. $Y_{ZD}+1$) in the Y direction extracted in the coordinate extracting process C (step S5216).

On the other hand, as a result of the judgment in the step S5215, if it is judged that "Q" denoted by the reference position (P, Q) does not indicate the seventh row (the step S5215: No), it can be estimated that "Q" denoted by the reference position (P, Q) indicates the eighth row. In this case, it is checked whether or not the coordinate position indicated by nine samples corresponding to the respective pixel positions in a range of [the sixth column to the eighth column, the first row to the third row] in the imaging range RM matches the coordinate position $Y_{ZD}$ in the Y direction extracted in the coordinate extracting process C (step S5217).

Next, with reference to FIG. 26, an explanation will be given on the error detection on the coordinate position $Y_{ZD}$ in the Y direction in the step S5220 in FIG. 24. FIG. 26 is a flowchart conceptually showing a flow of the error detecting operation for the coordinate position $Y_{ZD}$ in the Y direction in the step S5220 in FIG. 24.

As shown in FIG. 26, firstly, it is judged whether or not "Q" denoted by the reference position (P, Q) indicates the fifth row (step S5221).

As a result of the judgment in the step S5221, if it is judged that "Q" denoted by the reference position (P, Q) indicates the fifth row (the step S5221: Yes), it is checked whether or not the coordinate position indicated by nine samples corresponding to the respective pixel positions in a range of [the first column, the sixth row to the eighth row] and [the seventh column to the eighth column, the sixth row to the eighth row] in the imaging range RM matches the coordinate position one after the coordinate position $Y_{ZD}$ (i.e. $Y_{ZD}+1$) in the Y direction extracted in the coordinate extracting process C (step S5222).

On the other hand, as a result of the judgment in the step S5221, if it is judged that "Q" denoted by the reference position (P, Q) does not indicate the fifth row (the step S5221: No), then, it is judged whether or not "Q" denoted by the reference position (P, Q) indicates the sixth row (step S5223).

As a result of the judgment in the step S5223, if it is judged that "Q" denoted by the reference position (P, Q) indicates the sixth row (the step S5223: Yes), it is checked whether or not the coordinate position indicated by three samples corresponding to the respective pixel positions in a range of [the first column, the first row] and [the seventh column to the eighth column, the first row] in the imaging range RM matches the coordinate position $Y_{ZD}$ in the Y direction extracted in the coordinate extracting process C (step S5224). Moreover, it is checked whether or not the coordinate position indicated by six samples corresponding to the respective pixel positions in a range of [the first column, the seventh row to the eighth row] and [the seventh column to the eighth column, the seventh row to the eighth row] in the imaging range RM matches the coordinate position one after the coordinate position $Y_{ZD}$ (i.e. $Y_{ZD}+1$) in the Y direction extracted in the coordinate extracting process C (step S5224).

On the other hand, as a result of the judgment in the step S5223, if it is judged that "Q" denoted by the reference position (P, Q) does not indicate the sixth row (the step S5223: No), then, it is judged whether or not "Q" denoted by the reference position (P, Q) indicates the seventh row (step S5225).

As a result of the judgment in the step S5225, if it is judged that "Q" denoted by the reference position (P, Q) indicates the seventh row (the step S5225: Yes), it is checked whether or not the coordinate position indicated by six samples corresponding to the respective pixel positions in a range of [the first column, the first row to the second row] and [the seventh column to the eighth column, the first row to the second row] in the imaging range RM matches the coordinate position $Y_{ZD}$ in the Y direction extracted in the coordinate extracting process C (step S5226). Moreover, it is checked whether or not the coordinate position indicated by three samples corresponding to the respective pixel positions in a range of [the first column, the eighth row] and [the seventh column to the eighth column, the eighth row] in the imaging range RM matches the coordinate position one after the coordinate position $Y_{ZD}$ (i.e. $Y_{ZD}+1$) in the Y direction extracted in the coordinate extracting process C (step S5226).

On the other hand, as a result of the judgment in the step S5225, if it is judged that "Q" denoted by the reference position (P, Q) does not indicate the seventh row (the step S5225: No), it can be estimated that "Q" denoted by the reference position (P, Q) indicates the eighth row. In this case, it is checked whether or not the coordinate position indicated by nine samples corresponding to the respective pixel positions in a range of [the first column, the first row to the third row] and [the seventh column to the eighth column, the first row to the third row] in the imaging range RM matches the coordinate position $Y_{ZD}$ in the Y direction extracted in the coordinate extracting process C (step S5227).

Next, with reference to FIG. 27, an explanation will be given on the error detection on the coordinate position $Y_{ZD}$ in the Y direction in the step S5230 in FIG. 24. FIG. 27 is a flowchart conceptually showing a flow of the error detecting operation for the coordinate position $Y_{ZD}$ in the Y direction in the step S5230 in FIG. 24.

As shown in FIG. 27, it is judged whether or not "Q" denoted by the reference position (P, Q) indicates the fifth row (step S5231).

As a result of the judgment in the step S5231, if it is judged that "Q" denoted by the reference position (P, Q) indicates the fifth row (the step S5231: Yes), it is checked whether or not the coordinate position indicated by nine samples corresponding to the respective pixel positions in a range of [the first column to the second column, the sixth row to the eighth row] and [the eighth column, the sixth row to the eighth row] in the imaging range RM matches the coordinate position one after the coordinate position $Y_{ZD}$ (i.e. $Y_{ZD}+1$) in the Y direction extracted in the coordinate extracting process C (step S5232).

On the other hand, as a result of the judgment in the step S5231, if it is judged that "Q" denoted by the reference position (P, Q) does not indicate the fifth row (the step S5231: No), then, it is judged whether or not "Q" denoted by the reference position (P, Q) indicates the sixth row (step S5233).

As a result of the judgment in the step S5233, if it is judged that "Q" denoted by the reference position (P, Q) indicates the sixth row (the step S5233: Yes), it is checked whether or not the coordinate position indicated by three samples corresponding to the respective pixel positions in a range of [the first column to the second column, the first row] and [the eighth column, the first row] in the imaging range RM matches the coordinate position $Y_{ZD}$ in the Y direction extracted in the coordinate extracting process C (step S5234). Moreover, it is checked whether or not the coordinate position indicated by six samples corresponding to the respective pixel positions in a range of [the first column to the second column, the seventh row to the eighth row] and [the eighth column, the seventh row to the eighth row] in the imaging range RM matches the coordinate position one after the coordinate position $Y_{ZD}$ (i.e. $Y_{ZD}+1$) in the Y direction extracted in the coordinate extracting process C (step S5234).

On the other hand, as a result of the judgment in the step S5233, if it is judged that "Q" denoted by the reference position (P, Q) does not indicate the sixth row (the step S5233: No), then, it is judged whether or not "Q" denoted by the reference position (P, Q) indicates the seventh row (step S5235).

As a result of the judgment in the step S5235, if it is judged that "Q" denoted by the reference position (P, Q) indicates the seventh row (the step S5235: Yes), it is checked whether or not the coordinate position indicated by six samples corresponding to the respective pixel positions in a range of [the first column to the second column, the first row to the second row] and [the eighth column, the first row to the second row] in the imaging range RM matches the coordinate position $Y_{ZD}$ in the Y direction extracted in the coordinate extracting process C (step S5236). Moreover, it is checked whether or not the coordinate position indicated by three samples corresponding to the respective pixel positions in a range of [the first column to the second column, the eighth row] and [the eighth column, the eighth row] in the imaging range RM matches the coordinate position one after the coordinate position $Y_{ZD}$ (i.e. $Y_{ZD}+1$) in the Y direction extracted in the coordinate extracting process C (step S5236).

On the other hand, as a result of the judgment in the step S5235, if it is judged that "Q" denoted by the reference position (P, Q) does not indicate the seventh row (the step S5235: No), it can be estimated that "Q" denoted by the reference position (P, Q) indicates the eighth row. In this case, it is checked whether or not the coordinate position indicated by nine samples corresponding to the respective pixel positions in a range of [the first column to the second column, the first row to the third row] and [the eighth column, the first row to the third row] in the imaging range RM matches the coordinate position $Y_{ZD}$ in the Y direction extracted in the coordinate extracting process C (step S5237).

Next, with reference to FIG. 28, an explanation will be given on the error detection on the coordinate position $Y_{ZD}$ in the Y direction in the step S5240 in FIG. 24. FIG. 28 is a flowchart conceptually showing a flow of the error detecting operation for the coordinate position $Y_{ZD}$ in the Y direction in the step S5240 in FIG. 24.

As shown in FIG. 28, firstly, it is judged whether or not "Q" denoted by the reference position (P, Q) indicates the fifth row (step S5241).

As a result of the judgment in the step S5241, if it is judged that "Q" denoted by the reference position (P, Q) indicates the fifth row (the step S5241: Yes), it is checked whether or not the coordinate position indicated by nine samples corresponding to the respective pixel positions in a range of [the first column to the third column, the sixth row to the eighth row] in the imaging range RM matches the coordinate position one after the coordinate position $Y_{ZD}$ (i.e. $Y_{ZD}+1$) in the Y direction extracted in the coordinate extracting process C (step S5242).

On the other hand, as a result of the judgment in the step S5241, if it is judged that "Q" denoted by the reference position (P, Q) does not indicate the fifth row (the step S5241: No), then, it is judged whether or not "Q" denoted by the reference position (P, Q) indicates the sixth row (step S5243).

As a result of the judgment in the step S5243, if it is judged that "Q" denoted by the reference position (P, Q) indicates the sixth row (the step S5243: Yes), it is checked whether or not the coordinate position indicated by three samples corresponding to the respective pixel positions in a range of [the first column to the third column, the first row] in the imaging range RM matches the coordinate position $Y_{ZD}$ in the Y direction extracted in the coordinate extracting process C (step S5244). Moreover, it is checked whether or not the coordinate position indicated by six samples corresponding to the respective pixel positions in a range of [the first column to the third column, the seventh row to the eighth row] in the imaging range RM matches the coordinate position one after the coordinate position $Y_{ZD}$ (i.e. $Y_{ZD}+1$) in the Y direction extracted in the coordinate extracting process C (step S5244).

On the other hand, as a result of the judgment in the step S5243, if it is judged that "Q" denoted by the reference position (P, Q) does not indicate the sixth row (the step S5243: No), then, it is judged whether or not "Q" denoted by the reference position (P, Q) indicates the seventh row (step S5245).

As a result of the judgment in the step S5245, if it is judged that "Q" denoted by the reference position (P, Q) indicates the seventh row (the step S5245: Yes), it is checked whether or not the coordinate position indicated by six samples corresponding to the respective pixel positions in a range of [the first column to the third column, the first row to the second row] in the imaging range RM matches the coordinate position $Y_{ZD}$ in the Y direction extracted in the coordinate extracting process C (step S5246). Moreover, it is checked whether or not the coordinate position indicated by three samples corresponding to the respective pixel positions in a range of [the first column to the third column, the eighth row] in the imaging range RM matches the coordinate position one after the coordinate position $Y_{ZD}$ (i.e. $Y_{ZD}+1$) in the Y direction extracted in the coordinate extracting process C (step S5246).

On the other hand, as a result of the judgment in the step S5245, if it is judged that "Q" denoted by the reference position (P, Q) does not indicate the seventh row (the step S5245: No), it can be estimated that "Q" denoted by the reference position (P, Q) indicates the eighth row. In this case, it is checked whether or not the coordinate position indicated by nine samples corresponding to the respective pixel positions in a range of [the first column to the third column, the first row to the third row] in the imaging range RM matches the coordinate position $Y_{ZD}$ in the Y direction extracted in the coordinate extracting process C (step S5247).

(2-4) Case in which Reference Position (P, Q) is Included in Area D in Imaging Range RM Next, with reference to FIG. 29 and FIG. 30, an explanation will be given on the coordinate data extracting process D and the error detecting process D in the case where the reference position (P, Q) is included in the area D in the imaging range RM. FIG. 29 is a flowchart conceptually showing a flow of the operations of the coordinate data extracting process D in the case where f the reference position (P, Q) is included in the area D in the imaging range RM. FIG. 30 is a flowchart conceptually showing a flow of the operations of the error detecting process D in the case where the reference position (P, Q) is included in the area D in the imaging range RM.

Firstly, the coordinate data extracting process D will be described. As shown in FIG. 29, firstly, nine samples corresponding to the respective pixel positions in a range of [the (P+1)-th column to the (P+3)-th column, the (Q−3)-th row to the (Q−1)-th row] in the imaging range RM are extracted from the rotation-corrected image (step S6101). The extracted nine samples are stored into the X-coordinate register not illustrated, as bits X1 to X9 which indicate the coordinate position in the X direction (step S6101). In this manner, the X coordinate of the imaged pixel block PB is extracted in the case where the reference position (P, Q) is included in the area D in the imaging range RM.

Then, it is judged whether or not "P" denoted by (P, Q) indicates the first column (step S6102).

As a result of the judgment in the step S6102, if it is judged that "P" denoted by (P, Q) indicates the first column (the step S6102: Yes), eight samples corresponding to the respective pixel positions in a range of [the sixth column to the eighth column, the (Q−3)-th row to the (Q−1)-th row] in the imaging range RM are extracted from the rotation-corrected image (step S6103). The extracted eight samples are stored into the Y-coordinate register not illustrated, as bits Y1 to Y8 which indicate the coordinate position in the Y direction (step S6103).

On the other hand, as a result of the judgment in the step S6102, if it is judged that "P" denoted by the reference position (P, Q) does not indicate the first column (the step S6102: No), then, it is judged whether or not "P" denoted by the reference position (P, Q) indicates the second column (step S6104).

As a result of the judgment in the step S6104, if it is judged that "P" denoted by the reference position (P, Q) indicates the second column (the step S6104: Yes), eight samples corresponding to the respective pixel positions in a range of [the first column, the (Q−3)-th row to the (Q−1)-th row] and [the seventh column to the eighth column, the (Q−3)-th row to the (Q−1)-th row] in the imaging range RM are extracted from the rotation-corrected image (step S6105). The extracted eight samples are stored into the Y-coordinate register not illustrated, as bits Y1 to Y8 which indicate the coordinate position in the Y direction (step S6105).

On the other hand, as a result of the judgment in the step S6104, if it is judged that "P" denoted by the reference position (P, Q) does not indicate the second column (the step S6104: No), then, it is judged whether or not "P" denoted by the reference position (P, Q) indicates the third column (step S6106).

As a result of the judgment in the step S6106, if it is judged that "P" denoted by the reference position (P, Q) indicates the third column (the step S6106: Yes), eight samples corresponding to the respective pixel positions in a range of [the first column to the second column, the (Q−3)-th row to the (Q−1)-th row] and [the eighth column, the (Q−3)-th row to the (Q−1)-th row] in the imaging range RM are extracted from the rotation-corrected image (step S6107). The extracted eight samples are stored into the Y-coordinate register not illustrated, as bits Y1 to Y8 which indicate the coordinate position in the Y direction (step S6107).

On the other hand, as a result of the judgment in the step S6107, if it is judged that "P" denoted by the reference position (P, Q) does not indicate the third column (the step S6107: No), it is estimated that "P" denoted by the reference position (P, Q) indicates the fourth column. In this case, eight samples corresponding to the respective pixel positions in a range of [the first column to the third column, the (Q−3)-th row to the (Q−1)-th row] in the imaging range RM are extracted from the rotation-corrected image (step S6108). The extracted eight samples are stored into the Y-coordinate register not illustrated, as bits Y1 to Y8 which indicate the coordinate position in the Y direction (step S6108).

In this manner, the Y-coordinate of the imaged pixel block PB is extracted in the case where the reference position (P, Q) is included in the area D in the imaging area RM.

Then, the coordinate data ZD is outputted to the error detection device 97, wherein the coordinate data ZD indicates the bits X1 to X9 stored in the X-coordinate register as a coordinate position $X_{ZD}$ in the X direction (or horizontal direction) on the display surface of the PDP 100, and it indicates the bits Y1 to Y8 stored in the Y-coordinate register as a coordinate position $Y_{ZD}$ in the Y direction (or vertical direction) on the display surface of the PDP 100 (step S6109).

Next, the error detecting process D will be described. As shown in FIG. 30, firstly, it is judged whether or not "P" denoted by the reference position (P, Q) indicates the first column (step S6201).

As a result of the judgment in the step S6201, if it is judged that "P" denoted by the reference position (P, Q) indicates the first column (the step S6201: Yes), the error detection is performed on the coordinate position $X_{ZD}$ in the X direction shown in FIG. 31 described later (step S6210).

On the other hand, as a result of the judgment in the step S6201, if it is judged that "P" denoted by the reference position (P, Q) does not indicate the first column (the step S6201: No), then, it is judged whether or not "P" denoted by the reference position (P, Q) indicates the second column (step S6203).

As a result of the judgment in the step S6203, if it is judged that "P" denoted by the reference position (P, Q) indicates the second column (the step S6203: Yes), the error detection is performed on the coordinate position $X_{ZD}$ in the X direction shown in FIG. 32 described later (step S6220).

On the other hand, as a result of the judgment in the step S6203, if it is judged that "P" denoted by the reference position (P, Q) does not indicate the second column (the step S6203: No), then, it is judged whether or not "P" denoted by the reference position (P, Q) indicates the third column (step S6205).

As a result of the judgment in the step S6205, if it is judged that "P" denoted by the reference position (P, Q) indicates the third column (the step S6205: Yes), the error detection is performed on the coordinate position $X_{ZD}$ in the X direction shown in FIG. 33 described later (step S6230).

On the other hand, as a result of the judgment in the step S6205, if it is judged that "P" denoted by the reference position (P, Q) does not indicate the third column (the step S6205: No), it is estimated that "P" denoted by the reference position (P, Q) indicates the fourth column. In this case, the error detection is performed on the coordinate position $X_{ZD}$ in the X direction shown in FIG. 34 described later (step S6240).

After the aforementioned step S6210, S6220, S6230, or S6240 is ended, it is judged whether or not "Q" denoted by the reference position (P, Q) indicates the fifth row (step S6251).

As a result of the judgment in the step S6251, if it is judged that "Q" denoted by the reference position (P, Q) indicates the fifth row (the step S6251: Yes), it is checked whether or not the coordinate position indicated by nine samples corresponding to the respective pixel positions in a range of [the (P+1)-th column to the (P+3)-th column, the sixth row to the eighth row] in the imaging range RM matches the coordinate position one after the coordinate position $Y_{ZD}$ (i.e. $Y_{ZD}$+1) in the Y direction extracted in the coordinate extracting process D (step S5252).

On the other hand, as a result of the judgment in the step S6251, if it is judged that "Q" denoted by the reference position (P, Q) does not indicate the fifth row (the step S6251: No), then, it is judged whether or not "Q" denoted by the reference position (P, Q) indicates the sixth row (step S6253).

As a result of the judgment in the step S6253, if it is judged that "Q" denoted by the reference position (P, Q) indicates the sixth row (the step S6253: Yes), it is checked whether or not the coordinate position indicated by three samples corresponding to the respective pixel positions in a range of [the (P+1)-th column to the (P+3)-th column, the first row] in the imaging range RM matches the coordinate position $Y_{ZD}$ in the Y direction extracted in the coordinate extracting process D (step S6254). Moreover, it is checked whether or not the coordinate position indicated by six samples corresponding to the respective pixel positions in a range of [the (P+1)-th column to the (P+3)-th column, the seventh row to the eighth row] in the imaging range RM matches the coordinate position one after the coordinate position $Y_{ZD}$ (i.e. $Y_{ZD}$+1) in the Y direction extracted in the coordinate extracting process D (step S6254).

On the other hand, as a result of the judgment in the step S6253, if it is judged that "Q" denoted by the reference position (P, Q) does not indicate the sixth row (the step S6253: No), then, it is judged whether or not "Q" denoted by the reference position (P, Q) indicates the seventh row (step S6255).

As a result of the judgment in the step S6255, if it is judged that "Q" denoted by the reference position (P, Q) indicates the seventh row (the step S6255: Yes), it is checked whether or not the coordinate position indicated by six samples corresponding to the respective pixel positions in a range of [the (P+1)-th column to the (P+3)-th column, the first row to the second row] in the imaging range RM matches the coordinate position $Y_{ZD}$ in the Y direction extracted in the coordinate extracting process D (step S6256). Moreover, it is checked whether or not the coordinate position indicated by three samples corresponding to the respective pixel positions in a range of [the (P+1)-th column to the (P+3)-th column, the eighth row] in the imaging range RM matches the coordinate position one after the coordinate position $Y_{ZD}$ (i.e. $Y_{ZD}$+1) in the Y direction extracted in the coordinate extracting process D (step S6256).

On the other hand, as a result of the judgment in the step S6255, if it is judged that "Q" denoted by the reference position (P, Q) does not indicate the seventh row (the step S6255: No), it can be estimated that "Q" denoted by the reference position (P, Q) indicates the eighth row. In this case, it is checked whether or not the coordinate position indicated by nine samples corresponding to the respective pixel positions in a range of [the (P+1)-th column to the (P+3)-th column, the first row to the third row] in the imaging range RM matches the coordinate position $Y_{ZD}$ in the Y direction extracted in the coordinate extracting process D (step S6257).

Next, with reference to FIG. 31, an explanation will be given on the error detection on the coordinate position $X_{ZD}$ in the X direction in the step S6210 in FIG. 30. FIG. 31 is a flowchart conceptually showing a flow of the error detecting operation for the coordinate position $X_{ZD}$ in the X direction in the step S6210 in FIG. 30.

As shown in FIG. 31, it is judged whether or not "Q" denoted by the reference position (P, Q) indicates the fifth row (step S6211).

As a result of the judgment in the step S6211, if it is judged that "Q" denoted by the reference position (P, Q) indicates the fifth row (the step S6211: Yes), it is checked whether or not the coordinate position indicated by nine samples corresponding to the respective pixel positions in a range of [the sixth column to the eighth column, the sixth row to the eighth row] in the imaging range RM matches the coordinate position $X_{ZD}$ in the X direction extracted in the coordinate extracting process D (step S6212).

On the other hand, as a result of the judgment in the step S6211, if it is judged that "Q" denoted by the reference position (P, Q) does not indicate the fifth row (the step S6211: No), then, it is judged whether or not "Q" denoted by the reference position (P, Q) indicates the sixth row (step S6213).

As a result of the judgment in the step S6213, if it is judged that "Q" denoted by the reference position (P, Q) indicates the sixth row (the step S6213: Yes), it is checked whether or not the coordinate position indicated by nine samples corresponding to the respective pixel positions in a range of [the sixth column to the eighth column, the first row] and [the sixth column to the eighth column, the seventh row to the eighth row] in the imaging range RM matches the coordinate position $X_{ZD}$ in the X direction extracted in the coordinate extracting process D (step S6214).

On the other hand, as a result of the judgment in the step S6213, if it is judged that "Q" denoted by the reference position (P, Q) does not indicate the sixth row (the step S6213: No), then, it is judged whether or not "Q" denoted by the reference position (P, Q) indicates the seventh row (step S6215).

As a result of the judgment in the step S6215, if it is judged that "Q" denoted by the reference position (P, Q) indicates the seventh row (the step S6215: Yes), it is checked whether or not the coordinate position indicated by nine samples corresponding to the respective pixel positions in a range of [the sixth column to the eighth column, the first row to the second row] and [the sixth column to the eighth column, the eighth row] in the imaging range RM matches the coordinate position $X_{ZD}$ in the X direction extracted in the coordinate extracting process D (step S6216).

On the other hand, as a result of the judgment in the step S6215, if it is judged that "Q" denoted by the reference position (P, Q) does not indicate the seventh row (the step S6215: No), it can be estimated that "Q" denoted by the reference position (P, Q) indicates the eighth row. In this case, it is checked whether or not the coordinate position indicated by nine samples corresponding to the respective pixel positions in a range of [the sixth column to the eighth column, the first row to the third row] in the imaging range RM matches the coordinate position $X_{ZD}$ in the X direction extracted in the coordinate extracting process D (step S6217).

Next, with reference to FIG. 32, an explanation will be given on the error detection on the coordinate position $X_{ZD}$ in the X direction in the step S6220 in FIG. 30. FIG. 32 is a flowchart conceptually showing a flow of the error detecting operation for the coordinate position $X_{ZD}$ in the X direction in the step S6220 in FIG. 30.

As shown in FIG. 32, it is judged whether or not "Q" denoted by the reference position (P, Q) indicates the fifth row (step S6221).

As a result of the judgment in the step S6221, if it is judged that "Q" denoted by the reference position (P, Q) indicates the fifth row (the step S6221: Yes), it is checked whether or not the coordinate position indicated by three samples corresponding to the respective pixel positions in a range of [the first column, the sixth row to the eighth row] in the imaging range RM matches the coordinate position one before the coordinate position $X_{ZD}$ (i.e. $X_{ZD}-1$) in the X direction extracted in the coordinate extracting process D (step S6222). Moreover, it is checked whether or not the coordinate position indicated by six samples corresponding to the respective pixel positions in a range of [the seventh column to the eighth column, the sixth row to the eighth row] in the imaging range RM matches the coordinate position $X_{ZD}$ in the X direction extracted in the coordinate extracting process D (step S6222).

On the other hand, as a result of the judgment in the step S6221, if it is judged that "Q" denoted by the reference position (P, Q) does not indicate the fifth row (the step S6221: No), then, it is judged whether or not "Q" denoted by the reference position (P, Q) indicates the sixth row (step S6223).

As a result of the judgment in the step 86223, if it is judged that "Q" denoted by the reference position (P, Q) indicates the sixth row (the step S6223: Yes), it is checked whether or not the coordinate position indicated by three samples corresponding to the respective pixel positions in a range of [the first column, the first row] and [the first column, the seventh row to the eighth row] in the imaging range RM matches the coordinate position one before the coordinate position $X_{ZD}$ (i.e. $X_{ZD}-1$) in the X direction extracted in the coordinate extracting process D (step S6224). Moreover, it is checked whether or not the coordinate position indicated by six samples corresponding to the respective pixel positions in a range of [the seventh column to the eighth column, the first row] and [the seventh column to the eighth column, the seventh row to the eighth row] in the imaging range RM matches the coordinate position $X_{ZD}$ in the X direction extracted in the coordinate extracting process D (step S6224).

On the other hand, as a result of the judgment in the step S6223, if it is judged that "Q" denoted by the reference position (P, Q) does not indicate the sixth row (the step S6223: No), then, it is judged whether or not "Q" denoted by the reference position (P, Q) indicates the seventh row (step S6225).

As a result of the judgment in the step S6225, if it is judged that "Q" denoted by the reference position (P, Q) indicates the seventh row (the step S6225: Yes), it is checked whether or not the coordinate position indicated by three samples corresponding to the respective pixel positions in a range of [the first column, the first row to the second row] and [the first column, the eighth row] in the imaging range RM matches the coordinate position one before the coordinate position $X_{ZD}$ (i.e. $X_{ZD}-1$) in the X direction extracted in the coordinate extracting process D (step S6226). Moreover, it is checked whether or not the coordinate position indicated by six samples corresponding to the respective pixel positions in a range of [the seventh column to the eighth column, the first row to the second row] and [the seventh column to the eighth column, the eighth row] in the imaging range RM matches the coordinate position $X_{ZD}$ in the X direction extracted in the coordinate extracting process D (step S6226).

On the other hand, as a result of the judgment in the step S6225, if it is judged that "Q" denoted by the reference position (P, Q) does not indicate the seventh row (the step S6225: No), it can be estimated that "Q" denoted by the reference position (P, Q) indicates the eighth row. In this case, it is checked whether or not the coordinate position indicated by three samples corresponding to the respective pixel positions in a range of [the first column, the first row to the third row] in the imaging range RM matches the coordinate position one before the coordinate position $X_{ZD}$ (i.e. $X_{ZD}-1$) in the X direction extracted in the coordinate extracting process D (step S6227). Moreover, it is checked whether or not the coordinate position indicated by six samples corresponding to the respective pixel positions in a range of [the seventh column to the eighth column, the first row to the third row] in the imaging range RM matches the coordinate position $X_{ZD}$ in the X direction extracted in the coordinate extracting process D (step S6227).

Next, with reference to FIG. 33, an explanation will be given on the error detection on the coordinate position $X_{ZD}$ in the X direction in the step S6230 in FIG. 30. FIG. 33 is a flowchart conceptually showing a flow of the error detecting operation for the coordinate position $X_{ZD}$ in the X direction in the step S6230 in FIG. 30.

As shown in FIG. 33, it is judged whether or not "Q" denoted by the reference position (P, Q) indicates the fifth row (step S6231).

As a result of the judgment in the step S6231, if it is judged that "Q" denoted by the reference position (P, Q) indicates the fifth row (the step S6231: Yes), it is checked whether or not the coordinate position indicated by six samples corresponding to the respective pixel positions in a range of [the first column to the second column, the sixth row to the eighth row] in the imaging range RM matches the coordinate position one before the coordinate position $X_{ZD}$ (i.e. $X_{ZD}-1$) in the X direction extracted in the coordinate extracting process D (step S6232). Moreover, it is checked whether or not the coordinate position indicated by three samples corresponding to the respective pixel positions in a range of [the eighth column, the sixth row to the eighth row] in the imaging range RM matches the coordinate position $X_{ZD}$ in the X direction extracted in the coordinate extracting process D (step S6232).

On the other hand, as a result of the judgment in the step S6231, if it is judged that "Q" denoted by the reference position (P, Q) does not indicate the fifth row (the step S6231: No), then, it is judged whether or not "Q" denoted by the reference position (P, Q) indicates the sixth row (step S6233).

As a result of the judgment in the step S6233, if it is judged that "Q" denoted by the reference position (P, Q) indicates the sixth row (the step S6233: Yes), it is checked whether or not the coordinate position indicated by six samples corresponding to the respective pixel positions in a range of [the first column to the second column, the first row] and [the first column to the second column, the seventh row to the eighth row] in the imaging range RM matches the coordinate position one before the coordinate position $X_{ZD}$ (i.e. $X_{ZD}-1$) in the X direction extracted in the coordinate extracting process D (step S6234). Moreover, it is checked whether or not the coordinate position indicated by three samples corresponding to the respective pixel positions in a range of [the eighth column, the first row] and [the eighth column, the seventh row to the eighth row] in the imaging range RM matches the coordinate position $X_{ZD}$ in the X direction extracted in the coordinate extracting process D (step S6234).

On the other hand, as a result of the judgment in the step S6233, if it is judged that "Q" denoted by the reference position (P, Q) does not indicate the sixth row (the step S6233: No), then, it is judged whether or not "Q" denoted by the reference position (P, Q) indicates the seventh row (step S6235).

As a result of the judgment in the step S6235, if it is judged that "Q" denoted by the reference position (P, Q) indicates the seventh row (the step S6235: Yes), it is checked whether or not the coordinate position indicated by six samples corresponding to the respective pixel positions in a range of [the first column to the second column, the first row to the second row] and [the first column to the second column, the eighth row] in the imaging range RM matches the coordinate position one before the coordinate position $X_{ZD}$ (i.e. $X_{ZD}-1$) in the X direction extracted in the coordinate extracting process D (step S6236). Moreover, it is checked whether or not the coordinate position indicated by three samples corresponding to the respective pixel positions in a range of [the eighth column, the first row to the second row] and [the eighth column, the eighth row] in the imaging range RM matches the coordinate position $X_{ZD}$ in the X direction extracted in the coordinate extracting process D (step S6236).

On the other hand, as a result of the judgment in the step S6235, if it is judged that "Q" denoted by the reference position (P, Q) does not indicate the seventh row (the step S6235: No), it can be estimated that "Q" denoted by the reference position (P, Q) indicates the eighth row. In this case, it is checked whether or not the coordinate position indicated by six samples corresponding to the respective pixel positions in a range of [the first column to the second column, the first row to the third row] in the imaging range RM matches the coordinate position one before the coordinate position $X_{ZD}$ (i.e. $X_{ZD}-1$) in the X direction extracted in the coordinate extracting process D (step S6237). Moreover, it is checked whether or not the coordinate position indicated by three samples corresponding to the respective pixel positions in a range of [the eighth column, the first row to the third row] in the imaging range RM matches the coordinate position $X_{ZD}$ in the X direction extracted in the coordinate extracting process D (step S6237).

Next, with reference to FIG. 34, an explanation will be given on the error detection on the coordinate position $X_{ZD}$ in the X direction in the step S6240 in FIG. 30. FIG. 34 is a flowchart conceptually showing a flow of the error detecting operation for the coordinate position $X_{ZD}$ in the X direction in the step S6240 in FIG. 30.

As shown in FIG. 34, firstly, it is judged whether or not "Q" denoted by the reference position (P, Q) indicates the fifth row (step S6241).

As a result of the judgment in the step S6241, if it is judged that "Q" denoted by the reference position (P, Q) indicates the fifth row (the step S6241: Yes), it is checked whether or not the coordinate position indicated by nine samples corresponding to the respective pixel positions in a range of [the first column to the third column, the sixth row to the eighth row] in the imaging range RM matches the coordinate position one before the coordinate position $X_{ZD}$ (i.e. $X_{ZD}-1$) in the X direction extracted in the coordinate extracting process D (step S6242).

On the other hand, as a result of the judgment in the step S6241, if it is judged that "Q" denoted by the reference position (P, Q) does not indicate the fifth row (the step S6241: No), then, it is judged whether or not "Q" denoted by the reference position (P, Q) indicates the sixth row (step S6243).

As a result of the judgment in the step S6243, if it is judged that "Q" denoted by the reference position (P, Q) indicates the sixth row (the step S6243: Yes), it is checked whether or not the coordinate position indicated by nine samples corresponding to the respective pixel positions in a range of [the first column to the third column, the first row] and [the first column to the third column, the seventh row to the eighth row] in the imaging range RM matches the coordinate position one before the coordinate position $X_{ZD}$ (i.e. $X_{ZD}$–1) in the X direction extracted in the coordinate extracting process D (step S6244).

On the other hand, as a result of the judgment in the step S6243, if it is judged that "Q" denoted by the reference position (P, Q) does not indicate the sixth row (the step S6243: No), then, it is judged whether or not "Q" denoted by the reference position (P, Q) indicates the seventh row (step S6245).

As a result of the judgment in the step S6245, if it is judged that "Q" denoted by the reference position (P, Q) indicates the seventh row (the step S6245:Yes), it is checked whether or not the coordinate position indicated by nine samples corresponding to the respective pixel positions in a range of [the first column to the third column, the first row to the second row] and [the first column to the third column, the eighth row] in the imaging range RM matches the coordinate position one before the coordinate position $X_{ZD}$ (i.e. $X_{ZD}$–1) in the X direction extracted in the coordinate extracting process D (step S6246).

On the other hand, as a result of the judgment in the step S6245, if it is judged that "Q" denoted by the reference position (P, Q) does not indicate the seventh row (the step S6245: No), it can be estimated that "Q" denoted by the reference position (P, Q) indicates the eighth row. In this case, it is checked whether or not the coordinate position indicated by nine samples corresponding to the respective pixel positions in a range of [the first column to the third column, the first row to the third row] in the imaging range RM matches the coordinate position one before the coordinate position $X_{ZD}$ (i.e. $X_{ZD}$–1) in the X direction extracted in the coordinate extracting process D (step S6247).

(2-5) Specific Operation Examples

Next, with reference to FIG. 35 to FIG. 38, an explanation will be given on specific operation examples if the reference position (P, Q) is included in the areas A, B, C, and D in the imaging area RM, respectively.

Firstly, an explanation will be given on an operation example in the case where the imaging area RM by the image sensor 91 of the electronic pen 9 is in the condition as shown in FIG. 35 (i.e. in the case where the reference position (P, Q) is included in the area A in the imaging area RM) when a user brings the electronic pen 9 to contact with the display surface of the PDP 100. FIG. 35 is a plan view conceptually showing the specific example of pixels in the imaging range RM in the case where the reference position (P, Q) is included in the area A in the imaging range RM.

As shown in FIG. 35, the reference position (P, Q) of the block reference point in the boundary pattern is (3, 3), and it is included in the area A in the imaging range RM.

In this case, the coordinate data extracting process A shown in FIG. 11 is performed; the coordinate position $X_{ZD}$ in the X direction is extracted by the step S3106 in the coordinate data extracting process A (refer to FIG. 11), and the coordinate position $Y_{ZD}$ in the Y direction is extracted by the step S3108 in the coordinate data extracting process A (refer to FIG. 11) Specifically, by the step S3106 in the coordinate data extracting process A (refer to FIG. 11), the bits X1 to X9 in a range of [the (P+1(=4))-th column to the (P+3(=6))-th column, the first row to the second row] and [the (P+1(=4))-th column to the (P+3(=6))-th column, the eighth row] in the imaging range RM shown by a dashed line in FIG. 35 (i.e. the bits X1 to X9 in a range surrounded by a thick line in FIG. 35) are extracted as the coordinate position $X_{ZD}$ in the X direction. In the same manner, by the step S3108 in the coordinate data extracting process A (refer to FIG. 11), the bits Y1 to Y8 in a range of [the (P+1(=4))-th column to the (P+3(=6))-th column, the (Q+1(=4))-th row to the (Q+3(=6))-th row] in the imaging range RM shown by the dashed line in FIG. 35 (i.e. the bits Y1 to Y8 in a range surrounded by the thick line in FIG. 35) are extracted as the coordinate position $Y_{ZD}$ in the Y direction.

Moreover, in this case, the error detecting process A shown in FIG. 12 is performed; it is judged whether or not there is an error in the extracted coordinate position $X_{ZD}$ in the X direction, by the step S3206 in the error detecting process A (refer to FIG. 12), and it is judged whether or not there is an error in the extracted coordinate position $Y_{ZD}$ in the Y direction, by the step S3236 in the error detecting process A (refer to FIG. 15). Specifically, by the step S3206 in the error detecting process A (refer to FIG. 12), it is checked whether or not the coordinate data indicated by the bits X2, X3, X5, X6, X8 and X9 in a range of [the first column to the second column, the (Q+1(=4))-th row to the (Q+3(=6))-th row] in the imaging range RM (i.e. the bits X2, X3, X5, X6, X8 and X9 in a range indicated by hatching in FIG. 35) matches the coordinate position one before the coordinate position $X_{ZD}$ (i.e. $X_{ZD}$–1) in the X direction extracted in the coordinate data extracting process A. Moreover, it is checked whether or not the coordinate data indicated by the bits X1, X4, and X7 in a range of [the eighth column, the (Q+1(=4))-th row to the (Q+3(=6))-th row] in the imaging range RM (i.e. the bits X1, X4, and X7 in a range indicated by the hatching in FIG. 35) matches the coordinate position $X_{ZD}$ in the X direction extracted in the coordinate data extracting process A. In the same manner, by the step S3236 in the error detecting process A (refer to FIG. 15), it is checked whether or not the coordinate data indicated by the bits Y4, Y5, Y6, Y7, and Y8 in a range of [the first column to the second column, the first row to the second row] and [the eighth column, the first row to the second row] in the imaging range RM (i.e. the bits Y4, Y5, Y6, Y7, and Y8 in a range indicated by the hatching in FIG. 35) matches the coordinate position one before the coordinate position $Y_{ZD}$ (i.e. $Y_{ZD}$–1) in the Y direction extracted in the coordinate data extracting process A. Moreover, it is checked whether or not the coordinate data indicated by the bits Y1, Y2, and Y3 in a range of [the first column to the second column, the eighth row] and [the eighth column, the eighth row] in the imaging range RM (i.e. the bits Y1, Y2, and Y3 in a range indicated by the hatching in FIG. 35) matches the coordinate position $Y_{ZD}$ in the Y direction extracted in the coordinate data extracting process A. As can be seen from FIG. 35, in the example, samples of pixels other than the pixels used to extract the coordinate position $X_{ZD}$ in the X direction and the coordinate position $Y_{ZD}$ in the Y direction are used in order to check the coordinate position $X_{ZD}$ in the X direction and the coordinate position $Y_{ZD}$ in the Y direction (i.e. for the error detection).

Next, an explanation will be given on an operation example in the case where the imaging area RM by the image sensor 91 of the electronic pen 9 is in the condition as shown in FIG. 36 (i.e. in the case where the reference position (P, Q) is included in the area B in the imaging area RM) when a user brings the electronic pen 9 to contact with the display surface of the PDP 100. FIG. 36 is a plan view conceptually showing the specific example of pixels in the imaging range RM in the case where the reference position (P, Q) is included in the area B in the imaging range RM.

As shown in FIG. 36, the reference position (P, Q) of the block reference point in the boundary pattern is (6, 2), and it is included in the area B in the imaging range RM.

In this case, the coordinate data extracting process B shown in FIG. 17 is performed; the coordinate position $X_{ZD}$ in the X direction is extracted by the step S4101 in the coordinate data extracting process B (refer to FIG. 17), and the coordinate position $Y_{ZD}$ in the Y direction is extracted by the step S4105 in the coordinate data extracting process B (refer to FIG. 17). Specifically, by the step S4101 in the coordinate data extracting process B (refer to FIG. 17), the bits X1 to X9 in a range of [the (P−3(=3))-th column to the (P−1(=5))-th column, the (Q+1(=3))-th row to the (Q+3(=5))-th row] in the imaging range RM shown by a dashed line in FIG. 36 (i.e. the bits X1 to X9 in a range surrounded by a thick line in FIG. 36) are extracted as the coordinate position $X_{ZD}$ in the X direction. In the same manner, by the step S4105 in the coordinate data extracting process B (refer to FIG. 17), the bits Y1 to Y8 in a range of [the first column, the (Q+1(=3))-th row to the (Q+3 (=5))-th row] and [the seventh column to the eighth column, the (Q+1(=3))-th row to the (Q+3(=5))-th row] in the imaging range RM shown by the dashed line in FIG. 36 (i.e. the bits Y1 to Y8 in a range surrounded by the thick line in FIG. 36) are extracted as the coordinate position $Y_{ZD}$ in the Y direction.

Moreover, in this case, the error detecting process B shown in FIG. 18 is performed; it is judged whether or not there is an error in the extracted coordinate position $X_{ZD}$ in the X direction, by the step S4224 in the error detecting process B (refer to FIG. 20), and it is judged whether or not there is an error in the extracted coordinate position $Y_{ZD}$ in the Y direction, by the step S4254 in the error detecting process B (refer to FIG. 18). Specifically, by the step S4224 in the error detecting process B (refer to FIG. 20), it is checked whether or not the coordinate data indicated by the bits X3, X6, and X9 in a range of [the first column, the first row] and [the first column, the seventh row to the eighth row] in the imaging range RM (i.e. the bits X3, X6, and X9 in a range indicated by hatching in FIG. 36) matches the coordinate position $X_{ZD}$ in the X direction extracted in the coordinate data extracting process B. Moreover, it is checked whether or not the coordinate data indicated by the bits X1, X2, X4, X5, X7, and X8 in a range of [the seventh column to the eighth column, the first row] and [the seventh column to the eighth column, the seventh row to the eighth row] in the imaging range RM (i.e. the bits X1, X2, X4, X5, X7, and X8 in a range indicated by the hatching in FIG. 36) matches the coordinate position one after the coordinate position $X_{ZD}$ (i.e. $X_{ZD}$+1) in the X direction extracted in the coordinate data extracting process B. In the same manner, by the step S4254 in the error detecting process B (refer to FIG. 18), it is checked whether or not the coordinate data indicated by the bits Y7 and Y8 in a range of [the (P−3(=3))-th column to the (P−1(=5))-th column, the first row] in the imaging range RM (i.e. the bits Y7 and Y8 in a range indicated by the hatching in FIG. 36) matches the coordinate position one before the coordinate position $Y_{ZD}$ (i.e. $Y_{ZD}$−1) in the Y direction extracted in the coordinate data extracting process B. Moreover, it is checked whether or not the coordinate data indicated by the bits Y1, Y2, Y3, Y4, Y5, and Y6 in a range of [the (P−3(=3))-th column to the (P−1(=5))-th column, the seventh row to the eighth row] in the imaging range RM (i.e. the bits Y1, Y2, Y3, Y4, Y5, and Y6 in a range indicated by the hatching in FIG. 36) matches the coordinate position $Y_{ZD}$ in the Y direction extracted in the coordinate data extracting process B. As can be seen from FIG. 36, in the example, samples of pixels other than the pixels used to extract the coordinate position $X_{ZD}$ in the X direction and the coordinate position $Y_{ZD}$ in the Y direction are used in order to check the coordinate position $X_{ZD}$ in the X direction and the coordinate position $Y_{ZD}$ in the Y direction (i.e. for the error detection).

Next, an explanation will be given on an operation example in the case where the imaging area RM by the image sensor 91 of the electronic pen 9 is in the condition as shown in FIG. 37 (i.e. in the case where the reference position (P, Q) is included in the area C in the imaging area RM) when a user brings the electronic pen 9 to contact with the display surface of the PDP 100. FIG. 37 is a plan view conceptually showing the specific example of pixels in the imaging range RM in the case where the reference position (P, Q) is included in the area C in the imaging range RM.

As shown in FIG. 37, the reference position (P, Q) of the block reference point in the boundary pattern is (7, 6), and it is included in the area C in the imaging range RM.

In this case, the coordinate data extracting process C shown in FIG. 23 is performed; the coordinate position $X_{ZD}$ in the X direction is extracted by the step S5104 in the coordinate data extracting process C (refer to FIG. 23), and the coordinate position $Y_{ZD}$ in the Y direction is extracted by the step S5108 in the coordinate data extracting process C (refer to FIG. 23). Specifically, by the step S5104 in the coordinate data extracting process C (refer to FIG. 23), the bits X1 to X9 in a range of [the (P−3(=4))-th column to the (P−1(=6))-th column, the first row] and [the (P−3(=4))-th column to the (P−1(=6))-th column, the seventh row to the eighth row] in the imaging range RM shown by a dashed line in FIG. 37 (i.e. the bits X1 to X9 in a range surrounded by a thick line in FIG. 37) are extracted as the coordinate position $X_{ZD}$ in the X direction. In the same manner, by the step S5108 in the coordinate data extracting process C (refer to FIG. 23), the bits Y1 to Y8 in a range of [the (P−3(=4))-th column to the (P−1(=6))-th column, the (Q−3(=3))-th row to the (Q−1(=5))-th row] in the imaging range RM shown by the dashed line in FIG. 37 (i.e. the bits Y1 to Y8 in a range surrounded by the thick line in FIG. 37) are extracted as the coordinate position $Y_{ZD}$ in the Y direction.

Moreover, in this case, the error detecting process C shown in FIG. 24 is performed; it is judged whether or not there is an error in the extracted coordinate position $X_{ZD}$ in the X direction, by the step S5206 in the error detecting process C (refer to FIG. 24), and it is judged whether or not there is an error in the extracted coordinate position $Y_{ZD}$ in the Y direction, by the step S5234 in the error detecting process C (refer to FIG. 27). Specifically, by the step S5206 in the error detecting process C (refer to FIG. 24), it is checked whether or not the coordinate data indicated by the bits X2, X3, X5, X6, X8 and X9 in a range of [the first column to the second column, the (Q−3(=3))-th row to the (Q−1(=5))-th row] in the imaging range RM (i.e. the bits X2, X3, X5, X6, X8 and X9 in a range indicated by hatching in FIG. 37) matches the coordinate position $X_{ZD}$ in the X direction extracted in the coordinate data extracting process C. Moreover, it is checked whether or not the coordinate data indicated by the bits X1, X4, and X7 in a range of [the eighth column, the (Q−3(=3))-th row to the (Q−1(=5))-th row] in the imaging range RM (i.e. the bits X1, X4, and X7 in a range indicated by the hatching in FIG. 37) matches the coordinate position one after the coordinate position $X_{ZD}$ (i.e. $X_{ZD}$+1) in the X direction extracted in the coordinate data extracting process C. In the same manner, by the step S5234 in the error detecting process C (refer to FIG. 27), it is checked whether or not the coordinate data indicated by the bits Y7 and Y8 in a range of [the first column to the second column, the first row] and [the eighth column, the first row] in the imaging range RM (i.e. the bits Y7 and Y8 in a range indicated by the hatching in FIG. 37) matches the coordinate position $Y_{ZD}$ in the Y direction extracted in the coordinate data extracting process C. Moreover, it is checked whether or not the coordinate data indicated by the bits Y1, Y2, Y3, Y4, Y5, and Y6 in a range of [the first column to the second column, the seventh row to the eighth row] and [the eighth column, the seventh row to the eighth row] in the imaging range RM (i.e. the bits Y1, Y2, Y3, Y4, Y5, and Y6 in a range indicated by the hatching in FIG. 37) matches the coordinate position one after the coordinate position $Y_{ZD}$ (i.e. $Y_{ZD}+1$) in the Y direction extracted in the coordinate data extracting process C. As can be seen from FIG. 37, in the example, samples of pixels other than the pixels used to extract the coordinate position $X_{ZD}$ in the X direction and the coordinate position $Y_{ZD}$ in the Y direction are used in order to check the coordinate position $X_{ZD}$ in the X direction and the coordinate position $Y_{ZD}$ in the Y direction (i.e. for the error detection).

Next, an explanation will be given on an operation example in the case where the imaging area RM by the image sensor 91 of the electronic pen 9 is in the condition as shown in FIG. 38 (i.e. in the condition the reference position (P, Q) is included in the area D in the imaging area RM) when a user brings the electronic pen 9 to contact with the display surface of the PDP 100. FIG. 38 is a plan view conceptually showing the specific example of pixels in the imaging range RM in the case where the reference position (P, Q) is included in the area D in the imaging range RM.

As shown in FIG. 38, the reference position (P, Q) of the block reference point in the boundary pattern is (2, 6), and it is included in the area D in the imaging range RM.

In this case, the coordinate data extracting process D shown in FIG. 29 is performed; the coordinate position $X_{ZD}$ in the X direction is extracted by the step S6101 in the coordinate data extracting process D (refer to FIG. 29), and the coordinate position $Y_{ZD}$ in the Y direction is extracted by the step S6105 in the coordinate data extracting process D (refer to FIG. 29). Specifically, by the step S6101 in the coordinate data extracting process D (refer to FIG. 29), the bits X1 to X9 in a range of [the (P+1(=3))-th column to the (P+3(=5))-th column, the (Q−3(=3))-th row to the (Q−1(=5))-th row] in the imaging range RM shown by a dashed line in FIG. 38 (i.e. the bits X1 to X9 in a range surrounded by a thick line in FIG. 38) are extracted as the coordinate position $X_{ZD}$ in the X direction. In the same manner, by the step S6105 in the coordinate data extracting process D (refer to FIG. 29), the bits Y1 to Y8 in a range of [the first column, the (Q−3(=3))-th row to the (Q−1(=5))-th row] and [the seventh column to the eighth column, the (Q−3(=3))-th row to the (Q−1(=5))-th row] in the imaging range RM shown by the dashed line in FIG. 38 (i.e. the bits Y1 to Y8 in a range surrounded by the thick line in FIG. 38) are extracted as the coordinate position $Y_{ZD}$ in the Y direction.

Moreover, in this case, the error detecting process D shown in FIG. 30 is performed; it is judged whether or not there is an error in the extracted coordinate position $X_{ZD}$ in the X direction, by the step S6224 in the error detecting process D (refer to FIG. 32), and it is judged whether or not there is an error in the extracted coordinate position $Y_{ZD}$ in the Y direction, by the step S6254 in the error detecting process D (refer to FIG. 30). Specifically, by the step S6224 in the error detecting process D (refer to FIG. 32), it is checked whether or not the coordinate data indicated by the bits X3, X6, and X9 in a range of [the first column, the first row] and [the first column, the seventh row to the eighth row] in the imaging range RM (i.e. the bits X3, X6, and X9 in a range indicated by hatching in FIG. 38) matches the coordinate position one before the coordinate position $X_{ZD}$ (i.e. $X_{ZD}-1$) in the X direction extracted in the coordinate data extracting process D. Moreover, it is checked whether or not the coordinate data indicated by the bits X1, X2, X4, X5, X7, and X8 in a range of [the seventh column to the eighth column, the first row] and [the seventh column to the eighth column, the seventh row to the eighth row] in the imaging range RM (i.e. the bits X1, X2, X4, X5, X7, and X8 in a range indicated by the hatching in FIG. 38) matches the coordinate position $X_{ZD}$ in the X direction extracted in the coordinate data extracting process D. In the same manner, by the step S6254 in the error detecting process D (refer to FIG. 30), it is checked whether or not the coordinate data indicated by the bits Y7 and Y8 in a range of [the (P+1(=3))-th column to the (P+3(=5))-th column, the first row] in the imaging range RM (i.e. the bits Y7 and Y8 in a range indicated by the hatching in FIG. 38) matches the coordinate position $Y_{ZD}$ in the Y direction extracted in the coordinate data extracting process D. Moreover, it is checked whether or not the coordinate data indicated by the bits Y1, Y2, Y3, Y4, Y5, and Y6 in a range of [the (P+1(=3))-th column to the (P+3(=5))-th column, the seventh row to the eighth row] in the imaging range RM (i.e. the bits Y1, Y2, Y3, Y4, Y5, and Y6 in a range indicated by the hatching in FIG. 38) matches the coordinate position one after the coordinate position $Y_{ZD}$ (i.e. $Y_{ZD}+1$) in the Y direction extracted in the coordinate data extracting process D. As can be seen from FIG. 38, in the example, samples of pixels other than the pixels used to extract the coordinate position $X_{ZD}$ in the X direction and the coordinate position $Y_{ZD}$ in the Y direction are used in order to check the coordinate position $X_{ZD}$ in the X direction and the coordinate position $Y_{ZD}$ in the Y direction (i.e. for the error detection).

As explained above, according to the example, with regard to the coordinate position in each coordinate reading unit block, the blocks adjacent to each other in the horizontal direction have the same coordinate position in the Y direction (or vertical direction), and the blocks adjacent to each other in the vertical direction have the same coordinate position in the X direction (or horizontal direction). Therefore, if the imaging range RM by the image sensor 91 is located to include one portion of the plurality of coordinate reading unit blocks adjacent to each other, as shown in FIG. 35 to FIG. 38, a lacked portion of the bits X1 to X9 (or Y1 to Y8) which indicate the coordinate position is compensated from the adjacent coordinate reading unit block. By this, it is possible to obtain the coordinate position information even if the imaging range RM of the image sensor 91 for imaging the display surface of the PDP 100 has a size corresponding to the coordinate reading unit block shown in FIG. 3 or even if reading is performed at any position on the display surface. Therefore, according to the example, it is unnecessary to image an area which is several times the area of the coordinate reading unit block in order to always read all portion of the coordinate reading unit blocks. This allows a reduction in the amount of data which is a processing target, compared to the construction that the coordinate position information is extracted by imaging the area which is several times the area of the coordinate reading unit block, resulting in high-speed reading.

In addition, in the example, in particular, by the operation of the error detection device 97, it can be detected whether or not there is an error at the extracted coordinate position $X_{ZD}$ in the X direction and the extracted coordinate position $Y_{ZD}$ in the Y direction, by using the samples of pixels other than the pixels used to extract the coordinate position $X_{ZD}$ in the X direction and the coordinate position $Y_{ZD}$ in the Y direction. This can be realized by using the construction that the X coordinate pattern and the Y coordinate pattern are redundantly included in one coordinate reading unit block. Moreover, such construction that, with regard to the coordinate position in each coordinate reading unit block, the blocks adjacent to each other in the horizontal direction have the same coordinate position in the Y direction (or vertical direction) and that the blocks adjacent to each other in the vertical direction have the same coordinate position in the X direction (or horizontal direction) also contributes to a preferable operation for detecting whether or not there is an error at the extracted coordinate position $X_{ZD}$ in the X direction and the extracted coordinate position $Y_{ZD}$ in the Y direction, by using the samples of pixels other than the pixels used to extract the coordinate position $X_{ZD}$ in the X direction and the coordinate position $Y_{ZD}$ in the Y direction. In other words, since each coordinate reading unit block uses the 2D code pattern disposed in accordance with predetermined criteria, it is possible to detect whether or not there is an error at the extracted coordinate position $X_{ZD}$ in the X direction and the extracted coordinate position $Y_{ZD}$ in the Y direction, by using the samples of pixels other than the pixels used to extract the coordinate position $X_{ZD}$ in the X direction and the coordinate position $Y_{ZD}$ in the Y direction. This allows more preferable detection of whether or not there is an error at the coordinate position detected by reading the 2D code pattern. Moreover, the error detection can be performed without including a peculiar pattern for performing the error detection in the 2D code pattern.

Incidentally, in the aforementioned example, the explanation was given by using the 2D code pattern including the X-coordinate pattern and the Y-coordinate pattern which indicate the coordinate position as an example; however, it may be not limited to the X-coordinate pattern and the Y-coordinate pattern which indicate the coordinate position but may be a 2D code pattern including an information pattern which indicates desired information. In this case, in a unit block corresponding to the coordinate reading unit block, the information pattern which indicates desired information is preferably redundantly (e.g. at least two patterns) recorded. Moreover, in order to perform the aforementioned error detecting operation, a predetermined table or the like indicating an information pattern layout rule is preferably stored in a memory inside the error detection device 97 (or a memory inside the electronic pen 9). In this case, in view of the relation between the adjacent unit blocks (or layout rule or the like) with reference to the table in the error detecting operation, it is possible to detect whether or not there is an error in the extracted information pattern, by using samples of pixels other than the pixels used to extract the information pattern, as in the construction to detect the coordinate position described above.

Moreover, in the aforementioned example, the coordinate position extracting operation and the error detecting operation are performed on the electronic pen 9 side; however, the coordinate position extracting operation and the error detecting operation may be performed in the constituent other than the electronic pen 9. For example, the coordinate data extraction device 96 and the error detection device 97 may be disposed between the wireless reception device 10 and the image data generation device 11 shown in FIG. 1.

Moreover, in the aforementioned example, the explanation was given by using the 2D code pattern in which the X-coordinate pattern and the Y-coordinate pattern are arranged in a checkered pattern as an example; however, obviously the X-coordinate pattern and the Y-coordinate pattern (or the information patterns) may be arranged in an aspect other than the checkered pattern. Even in this case, the X-coordinate pattern and the Y-coordinate pattern (or the information patterns) are preferably redundantly arranged in the coordinate reading unit block (or unit block corresponding to the coordinate reading unit block).

(3) Modified Examples

Next, with reference to FIG. 39 and FIG. 40, modified examples of the electronic display system 1 in the example will be described. In the modified examples, an explanation will be given on operations examples in a case where the imaging range RM of the image sensor 91 is greater than the area of the coordinate reading unit block. FIG. 39 is a plan view conceptually showing a specific example of pixels in the imaging range RM in the case where the imaging range RM of the image sensor 91 includes two intersections in the boundary pattern. FIG. 40 is a plan view conceptually showing a specific example of pixels in the imaging range RM in the case where the imaging range RM of the image sensor 91 includes four or more intersections in the boundary pattern.

As shown in FIG. 39, in the case where the imaging range RM of the image sensor 91 includes two intersections in the boundary pattern, firstly, the coordinate position $X_{ZD}$ in the X direction and the coordinate position $Y_{ZD}$ in the Y direction are extracted by reading the X-coordinate pattern and the Y-coordinate pattern located in the central direction of the imaging range RM viewed from the boundary pattern including the two intersections. For example, in the example shown in FIG. 39, the coordinate position $X_{ZD}$ in the X direction and the coordinate position $Y_{ZD}$ in the Y direction are extracted by reading the X-coordinate pattern and the Y-coordinate pattern located in the central direction of the imaging range RM viewed from the boundary pattern including the two intersections shown by darker hatching (i.e. located on the underside of the boundary pattern shown by darker hatching). Then, as in the aforementioned example, it is detected whether or not there is an error at the extracted coordinate position $X_{ZD}$ in the X direction and the extracted coordinate position $Y_{ZD}$ in the Y direction, by using the samples of pixels other than the pixels used to extract the coordinate position $X_{ZD}$ in the X direction and the coordinate position $Y_{ZD}$ in the Y direction.

As shown in FIG. 40, if the imaging range RM of the image sensor 91 includes four or more intersections in the boundary pattern, firstly, the coordinate position $X_{ZD}$ in the X direction and the coordinate position $Y_{ZD}$ in the Y direction are extracted by reading the X-coordinate pattern and the Y-coordinate pattern located in a range surrounded by the four or more intersections included in the imaging range RM. For example, in the example shown in FIG. 40, the coordinate position $X_{ZD}$ in the X direction and the coordinate position $Y_{ZD}$ in the Y direction are extracted by reading the X-coordinate pattern and the Y-coordinate pattern located in a range shown by a thick line and surrounded by the four or more intersections. Then, as in the aforementioned example, it is detected whether or not there is an error at the extracted coordinate position $X_{ZD}$ in the X direction and the extracted coordinate position $Y_{ZD}$ in the Y direction, using the samples of pixels other than the pixels used to extract the coordinate position $X_{ZD}$ in the X direction and the coordinate position $Y_{ZD}$ in the Y direction.

Incidentally, as in the example shown in FIG. 40, in the case where the imaging range RM of the image sensor 91 includes four or more intersections in the boundary pattern, it is also possible to perform an error correcting operation in addition to the error detecting operation. Hereinafter, with reference to FIG. 41, the error correcting operation will be described. FIG. 41 is a plan view conceptually showing another specific example of pixels in the imaging range RM in the case where the imaging range RM of the image sensor 91 includes four or more intersections in the boundary pattern.

As shown in FIG. 41, in the case where the imaging range RM of the image sensor 91 includes four or more intersections in the boundary pattern, there are a plurality of X-coordinate patterns which allows the extraction of the coordinate position $X_{ZD}$ in the X direction and a plurality of Y-coordinate patterns which allows the extraction of the coordinate position $Y_{ZD}$ in the Y direction, in the imaging range RM. In this case, it is assumed that there is an error in reading one of the plurality of X-coordinate patterns which allows the extraction of the coordinate position $X_{ZD}$ in the X direction (e.g. an X-coordinate pattern denoted by [2x] in FIG. 41) and that the others of the plurality of X-coordinate patterns which allows the extraction of the coordinate position $X_{ZD}$ in the X direction (e.g. X-coordinate patterns denoted by [1x], [3x], [4x], [5x], [6x], [7x], and [8x] in FIG. 41) can be accurately read. In this case, it is possible to correct the error in the one X-coordinate pattern by using the other X-coordinate patterns which can be accurately read. The same is true for the Y-coordinate pattern.

Incidentally, it may be determined whether or not the error correction is performed in accordance with the number of error-detected times. For example, if the number of error-detected times is less than a predetermined threshold value, the error detection may be not performed. On the other hand, if the number of error-detected times is greater than or equal to the predetermined threshold value, the error detection may be performed.

Moreover, the error correction may be performed in time series, using a reading result of the past (i.e. a coordinate position extraction result of the past). In other words, the error correction may be performed in accordance with whether or not there is a discrepancy between the previous coordinate position of the electronic pen 9 indicated by the reading result of the past and the current coordinate position of the electronic pen 9 indicated by the current reading result (or whether or not the transfer of the electronic pen 9 from past to present is appropriate). The time-series operation may be also adopted in the error detecting operation.

The present invention is not limited to the aforementioned embodiment, but various changes may be made, if desired, without departing from the essence or spirit of the invention which can be read from the claims and the entire specification. An error detecting apparatus and method, and a computer program, all of which involve such changes, are also intended to be within the technical scope of the present invention.

The invention claimed is:

1. An error detecting apparatus for detecting an error in reading a two-dimensional code pattern, the two-dimensional code pattern comprising a plurality of information blocks each of which includes an information pattern and a boundary pattern, the information pattern including a plurality of first pattern images each of which corresponds to first information data and a plurality of second pattern images each of which corresponds to second information data, the boundary pattern indicating a boundary position, said error detecting apparatus comprising: a reading device for obtaining an image read signal by reading the two-dimensional code pattern in each reading range corresponding to a size which is equal to or more than a size of the information block; a reference point detecting device for detecting an intersection in the boundary pattern, as a block reference point, from the image read signal; an extracting device for extracting each of the first information data and the second information data, on the basis of one portion of the plurality of first pattern images and the plurality of second pattern images which belong to an information data extraction area, the information data extraction area being determined in accordance with a position in the reading range at which the block reference point exists, the information data extraction area being referred to in order to extract each of the first information data and the second information data; and an error detecting device for detecting whether or not there is an error in at least one of the first information data and the second information data extracted by said extracting device, on the basis of another portion of the plurality of first pattern images and the plurality of second pattern images which belongs to another area other than the information data extraction area, wherein the information block is provided with pixels arranged in M rows and N columns, the information block includes the first pattern images in a first quadrant area and a third quadrant area in the information block, and the information block includes the second pattern images in a second quadrant area and a fourth quadrant area in the information block.

2. The error detecting apparatus according to claim 1, wherein said extracting device extracts the first information data on the basis of one portion of the plurality of first pattern images which belongs to the information data extraction area, and said error detecting device detects whether or not there is an error in the first information data extracted by said extracting device, on the basis of another portion of the plurality of first pattern images which belongs to another area other than the information data extraction area.

3. The error detecting apparatus according to claim 1, wherein said extracting device extracts the second information data on the basis of one portion of the plurality of second pattern images which belongs to the information data extraction area, and said error detecting device detects whether or not there is an error in the second information data extracted by said extracting device, on the basis of another portion of the plurality of second pattern images which belongs to another area other than the information data extraction area.

4. The error detecting apparatus according to claim 1, wherein said error detecting device detects whether or not there is an error in at least one of the first information data and the second information data extracted by said extracting device, by comparing one portion of the plurality of first pattern images and the plurality of second pattern images which belongs to the information data extraction area with another portion of the plurality of first pattern images and the plurality of second pattern images which belongs to another area other than the information data extraction area.

5. The error detecting apparatus according to claim 4, wherein said extracting device extracts the first information data on the basis of one portion of the plurality of first pattern images which belongs to the information data extraction area, and said error detecting device detects whether or not there is an error in the first information data extracted by said extracting device, by comparing one portion of the plurality of first pattern images which belongs to the information data extraction area with another portion of the plurality of first pattern images which belongs to another area other than the information data extraction area.

6. The error detecting apparatus according to claim 4, wherein said extracting device extracts the second information data on the basis of one portion of the plurality of second pattern images which belongs to the information data extraction area, and said error detecting device detects whether or not there is an error in the second information data extracted by said extracting device, by comparing one portion of the plurality of second pattern images which belongs to the information data extraction area with another portion of the plurality of second pattern images which belongs to another area other than the information data extraction area.

7. The error detecting apparatus according to claim 4, wherein said error detecting device detects whether or not there is an error in at least one of the first information data and the second information data extracted by said extracting device, by judging whether or not one portion of the plurality of first pattern images and the plurality of second pattern images which belongs to the information data extraction area matches another portion of the plurality of first pattern images and the plurality of second pattern images which belongs to another area other than the information data extraction area, if the one portion of the plurality of first pattern images and the plurality of second pattern images which belongs to the information data extraction area and the another portion of the plurality of first pattern images and the plurality of second pattern images which belongs to another area other than the information data extraction area are included in the same information pattern.

8. The error detecting apparatus according to claim 4, wherein said error detecting device detects whether or not there is an error in at least one of the first information data and the second information data extracted by said extracting device, by judging whether or not one portion of the plurality of first pattern images and the plurality of second pattern images which belongs to the information data extraction area and another portion of the plurality of first pattern images and the plurality of second pattern images which belongs to another area other than the information data extraction area have a predetermined correlation, if the one portion of the plurality of first pattern images and the plurality of second pattern images which belongs to the information data extraction area and the another portion of the plurality of first pattern images and the plurality of second pattern images which belongs to another area other than the information data extraction area are included in different information patterns.

9. The error detecting apparatus according to claim 8, wherein each of the first information data and the second information data indicates a coordinate position of the information block, and the predetermined correlation is a relation which indicates adjacent coordinate values.

10. The error detecting apparatus according to claim 8, wherein the predetermined correlation is a relation shown by an information pattern layout table which indicates layout of the information pattern.

11. An error detecting method of detecting an error in reading a two-dimensional code pattern, the two-dimensional code pattern comprising a plurality of information blocks each of which includes an information pattern and a boundary pattern, the information pattern including a plurality of first pattern images each of which corresponds to first information data and a plurality of second pattern images each of which corresponds to second information data, the boundary pattern indicating a boundary position, said error detecting method comprising: a reading process of obtaining an image read signal by reading the two-dimensional code pattern in each reading range corresponding to a size which is equal to or more than a size of the information block; a reference point detecting process of detecting an intersection in the boundary pattern, as a block reference point, from the image read signal; an extracting process of extracting each of the first information data and the second information data, on the basis of one portion of the plurality of first pattern images and the plurality of second pattern images which belongs to an information data extraction area, the information data extraction area being determined in accordance with a position in the reading range at which the block reference point exists, the information data extraction area being referred to in order to extract each of the first information data and the second information data; and an error detecting process of detecting whether or not there is an error in at least one of the first information data and the second information data extracted by said extracting process, on the basis of another portion of the plurality of first pattern images and the plurality of second pattern images which belongs to another area other than the information data extraction area, wherein the information block is provided with pixels arranged in M rows and N columns, the information block includes the first pattern images in a first quadrant area and a third quadrant area in the information block, and the information block includes the second pattern images in a second quadrant area and a fourth quadrant area in the information block.

12. A computer readable recording medium recording therein a computer program for controlling a computer provided for an error detecting apparatus for detecting an error in reading a two-dimensional code pattern, the two-dimensional code pattern comprising a plurality of information blocks each of which includes an information pattern and a boundary pattern, the information pattern including a plurality of first pattern images each of which corresponds to first information data and a plurality of second pattern images each of which corresponds to second information data, the boundary pattern indicating a boundary position, said error detecting apparatus comprising: a reading device for obtaining an image read signal by reading the two-dimensional code pattern in each reading range corresponding to a size which is equal to or more than a size of the information block; a reference point detecting device for detecting an intersection in the boundary pattern, as a block reference point, from the image read signal; an extracting device for extracting each of the first information data and the second information data, on the basis of one portion of the plurality of first pattern images and the plurality of second pattern images which belongs to an information data extraction area, the information data extraction area being determined in accordance with a position in the reading range at which the block reference point exists, the information data extraction area being referred to in order to extract each of the first information data and the second information data; and an error detecting device for detecting whether or not there is an error in at least one of the first information data and the second information data extracted by said extracting device, on the basis of another portion of the plurality of first pattern images and the plurality of second pattern images which belongs to another area other than the information data extraction area, wherein the information block is provided with pixels arranged in M rows and N columns, the information block includes the first pattern images in a first quadrant area and a third quadrant area in the information block, and the information block includes the second pattern images in a second quadrant area and a fourth quadrant area in the information block, said computer program making the computer function as at least one portion of said reading device, said reference point detecting device, said extracting device, and said error detecting device.

* * * * *